United States Patent [19]
Hill

[11] Patent Number: 5,970,077
[45] Date of Patent: Oct. 19, 1999

[54] APPARATUS FOR EFFICIENTLY TRANSFORMING A SINGLE FREQUENCY, LINEARLY POLARIZED LASER BEAM INTO PRINCIPALLY TWO ORTHOGONALLY POLARIZED BEAMS HAVING DIFFERENT FREQUENCIES

[75] Inventor: Henry Allen Hill, Tucson, Ariz.

[73] Assignee: Zygo Corporation, Middlefield, Conn.

[21] Appl. No.: 08/986,059

[22] Filed: Dec. 5, 1997

Related U.S. Application Data

[63] Continuation-in-part of application No. 08/960,881, Oct. 30, 1997, which is a continuation-in-part of application No. 08/838,698, Apr. 25, 1997, abandoned.

[51] Int. Cl.$^6$ ......................................................... H01S 3/10
[52] U.S. Cl. .................................. 372/23; 372/13; 372/12; 372/20; 372/21; 372/22; 372/27
[58] Field of Search ........................................ 372/9, 13, 12, 372/20, 21, 22, 23, 26, 27, 34, 92, 99

[56] References Cited

U.S. PATENT DOCUMENTS

| | | | |
|---|---|---|---|
| 3,458,259 | 7/1969 | Bagley et al. | 356/106 |
| 3,656,853 | 4/1972 | Bagley et al. | 356/106 |
| 3,662,279 | 5/1972 | Sandstrom et al. | 372/23 X |
| 3,889,207 | 6/1975 | Burgwald et al. | 372/23 X |
| 4,684,828 | 8/1987 | Sommargren | 307/425 |
| 4,687,958 | 8/1987 | Sommargren | 307/425 |
| 5,095,491 | 3/1992 | Kozlovsky et al. | 372/94 |
| 5,291,503 | 3/1994 | Geiger et al. | 372/21 |
| 5,321,718 | 6/1994 | Waarts et al. | 372/108 |
| 5,361,268 | 11/1994 | Fossey et al. | 372/23 |
| 5,379,310 | 1/1995 | Papen et al. | 372/23 |
| 5,394,414 | 2/1995 | Kozlovsky et al. | 372/22 |
| 5,485,272 | 1/1996 | Dirksen et al. | 356/349 |
| 5,640,405 | 6/1997 | Wallace et al. | 372/21 |
| 5,661,737 | 8/1997 | Hecht et al. | 372/23 |
| 5,708,672 | 1/1998 | Pessot et al. | 372/23 |
| 5,835,512 | 11/1998 | Wada et al. | 372/13 |

OTHER PUBLICATIONS

N. Bobroff, "Recent advances in displacement measuring interferometry," Meas. Sci. Technol. vol. 4, pp. 907–926, (Sep. 1993).

G. Bouwhuis, "Interferometrie Mit Gaslasers," Ned. T. Natuurk, vol. 34, pp. 225–232, (Aug. 1968).

H. Matsumoto, "Recent interferometric measurements using stabilized lasers," Precision Engineering, vol. 6, pp. 87–94, (1984).

(List continued on next page.)

*Primary Examiner*—Brian Healy
*Attorney, Agent, or Firm*—Francis J. Caufield

[57] ABSTRACT

Electro-optical devices comprising a multifaceted anisotropic acousto-optical crystal for transforming a single-frequency beam comprising two individual linearly-orthogonally, polarized input beams into an output beam having two linearly-orthogonally, polarized principal output beams having frequencies that differ from each other and the input beam where the input beam preferably is a laser of frequency, $f_L$. While the directions of propagation of the individual input beams are preferably parallel, and the directions of propagation of the principal output beams are preferably parallel, they need not be and instead the individual input beams and the principal output beams may beneficially have their own predetermined angle of divergence or convergence, respectively. The energy flux profiles of the individual input beams may be spatially separated, partially coextensive, or substantially coextensive and the energy flux profiles of the principal output beams may be spatially separated, partially coextensive, or substantially coextensive in accordance with the details of particular device embodiments and the requirements of the metrology or other contemplated application. In addition, thermal compensation may be made available through the exploitation of the principles of symmetry while power requirements may be reduced through the use of multiple pass arrangements for optical beams traveling through the interaction region of the anisotropic acousto-optical crystal.

93 Claims, 24 Drawing Sheets

OTHER PUBLICATIONS

Y. Ohtsuka and K. Itoh, "Two–frequency Laser Interferometer for Small Displacement Measurements in a Low Frequency Range," Applied Optics, vol. 18, pp. 219–224, (1979).

N. Massie et al., "Measuring Laser Flow Fields With a 64–Channel Heterodyne Interferometer," Applied Optics, vol. 22. pp. 2141–2151, (1983).

Y. Ohtsuka and M. Tsubokawa, "Dynamic Two–frequency Interferometry for Small Displacement Measurements," Optics and Laser Technology, vol. 16, pp. 25–29, (1984).

N. A. Riza and M. M. K. Howlader, "Acousto–optic system for the generation and control of tunable low–frequency signals," Opt. Eng., vol. 35, pp. 920–925, (1996).

J. B. Ferguson and R. H. Morris, "Single Mode Collapse in 6328 A HeNe Lasers," Applied Optics, vol. 17, pp. 2924–2929, (1978).

T. Baer et al., "Frequency Stabilization of a 0.633 um He–Ne–longitudinal Zeeman Laser," Applied Optics, vol. 19, pp. 3173–3177, (1980).

T. Okoshi and K. Kikuchi, "Frequency Stabilization of Semiconductor Lasers for Heterodyne–type Optical Communication Systems," Electronic Letters, vol. 16, pp. 179–181, (1980).

S. Yamagguchi and M. Suzuki, "Simultaneous Stabilization of the Frequency and Power of an AIGaAs Semicondutor Laser by Use of the Optogalvanic Effect of Krypton," IEEE Journal of Quantum Electronics, vol. QE–19, pp. 1514–1519, (1983).

R. W. Dixon, "Acoustic Diffraction of Light in Anisotropic Media," IEEE Journal of Quantum Electronics, vol. QE–3, pp. 85–93, (1967).

A. Yariv and P. Yeh, Optical Waves in Crystals (Wiley, New York), Section 9.5.1 entitled "Small–Angle Bragg Diffraction" (1984).

J. Bennett and H. Bennett, Section 7 of Chapter 10, "Double Refraction in Calcite," Hanndbook of Optics (McGraw–Hill, New York) 1978.-

APPARATUS FOR EFFICIENTLY TRANSFORMING A SINGLE FREQUENCY, LINEARLY POLARIZED LASER BEAM INTO PRINCIPALLY TWO ORTHOGONALLY POLARIZED BEAMS HAVING DIFFERENT FREQUENCIES

CROSS REFERENCE TO RELATED APPLICATION

This application is a continuation-in-part of U.S. patent application Ser. No. 08/960,881 filed on Oct. 30, 1997 in the name of Henry Allen Hill, pending, and entitled "APPARATUS FOR GENERATING ORTHOGONALLY POLARIZED BEAMS HAVING DIFFERENT FREQUENCIES" which, in turn, is a continuation-in-part of U.S. patent application Ser. No. 08/838,698 filed on Apr. 25, 1997 in the name of Henry Allen Hill for "APPARATUS FOR GENERATING ORTHOGONALLY POLARIZED, PARALLEL, COEXTENSIVE BEAMS HAVING DIFFERENT FREQUENCIES", now abandoned, both of which are commonly owned herewith.

BACKGROUND OF THE INVENTION

1. Field of the Invention

The present invention relates to apparatus for transforming with high diffraction efficiency a single frequency, linearly polarized laser beam into a beam with two frequency components that are orthogonally polarized. More particularly, the invention relates to electro-optical apparatus that are useful in a variety of optical measuring devices that perform extremely accurate measurement of changes in either length or optical length.

2. Background and Prior Art

The use of optical interferometry to measure changes in either length, distance, or optical length has grown significantly due not only to technological advances in lasers, photosensors, and microelectronics but also to an ever increasing demand for high precision, high accuracy measurements [cf. N. Bobroff, "Recent advances in displacement measuring interferometry," Meas. Sci. Technol., 4(9), 907–926 (1993)]. The prior art interferometers can be generally categorized into two types based on the signal processing technique used, i.e., either homodyne or heterodyne. The interferometers based on the heterodyne technique are generally preferred because (1) they are insensitive to low frequency drift and noise and (2) they can more readily have their resolution extended. Within the heterodyne type of interferometers, of particular interest are the ones based on the use of two optical frequencies.

In the prior art two-optical frequency heterodyne interferometers, the two optical frequencies are produced by one of the following techniques: (1) use of a Zeeman split laser, see for example, Bagley et al., U.S. Pat. No. 3,458,259, issued Jul. 29, 1969; G. Bouwhuis, "Interferometrie Mit Gaslasers," Ned. T. Natuurk, 34, 225–232 (August 1968); Bagley et al., U.S. Pat. No. 3,656,853, issued Apr. 18, 1972; and H. Matsumoto, "Recent interferometric measurements using stabilized lasers," Precision Engineering, 6(2), 87–94 (1984); (2) use of a pair of acousto-optical Bragg cells, see for example, Y. Ohtsuka and K. Itoh, "Two-frequency Laser Interferometer for Small Displacement Measurements in a Low Frequency Range," Applied Optics, 18(2), 219–224 (1979); N. Massie et al., "Measuring Laser Flow Fields With a 64-Channel Heterodyne Interferometer," Applied Optics, 22(14), 2141–2151 (1983); Y. Ohtsuka and M. Tsubokawa, "Dynamic Two-frequency Interferometry for Small Displacement Measurements," Optics and Laser Technology, 16, 25–29 (1984); H. Matsumoto, ibid; P. Dirksen, et al., U.S. Pat. No. 5,485,272, issued Jan. 16, 1996; N. A. Riza and M. M. K. Howlader, "Acousto-optic system for the generation and control of tunable low-frequency signals," Opt. Eng., 35(4), 920–925 (1996); (3) use of a single acousto-optic Bragg cell, see for example, G. E. Sommargren, commonly owned U.S. Pat. No. 4,684,828, issued Aug. 4, 1987; G. E. Sommargren, commonly owned U.S. Pat. No. 4,687,958, issued Aug. 18, 1987; P. Dirksen, et al., ibid; or (4) use of two longitudinal modes of a randomly polarized HeNe laser, see for example, J. B. Ferguson and R. H. Morris, "Single Mode Collapse in 6328 A HeNe Lasers," Applied Optics, 17(18), 2924–2929 (1978).

As for the prior art use of a Zeeman split laser to produce the two optical frequencies, this approach is only applicable to certain lasers (e.g., HeNe) and limits the frequency difference between the two optical frequencies to about 2 MHz. This imposes a limit on the maximum rate at which the length or optical length being measured can be changed. In addition, the available power from a Zeeman split laser is less than 500 microwatts, which can be a serious limitation when one laser source must be used for the measurement of multiple axes, such as three to six axes.

As for the prior art use of a single Bragg cell in the commonly owned U.S. Pat. No. 4,687,958 by Sommargren, the diffraction efficiency may be low because the optic axis of the uniaxial crystal of the Bragg cell, the direction of the input optical beam, and the direction of the acoustic beam are approximately collinear, and under these conditions, a small change in the direction of the input beam, such as caused by diffraction, will result in an unacceptable momentum mismatch. Also in commonly owned U.S. Pat. No. 4,687,958 by Sommargren, the diffraction efficiency may be low for a number of different types of uniaxial crystals because the efficiency of the dominant Bragg diffraction mode in this group of uniaxial crystals is proportional to the sine of the angle between the optic axis of the uniaxial crystal and either one or the other of the directions of the optical beam components or the direction of the acoustic beam. These two potential low diffraction efficiency problems are not encountered in the present invention because the optic axis of the uniaxial crystal and the direction of the acoustic beam are approximately orthogonal, i.e. small angle Bragg diffraction.

To compensate for the possibility of low diffraction efficiency resulting from the latter of these two reasons in U.S. Pat. No. 4,687,958, the path length in the uniaxial crystal of the Bragg cell may be increased. However, this procedure may lead to a uniaxial crystal that is inordinately long which, in turn, can result in an expensive apparatus. Also, an extended length may lead to a diffracted beam with width elongated in the plane of diffraction and an increased lateral separation, also in the diffraction plane between orthogonally polarized beam components. In addition, if the uniaxial crystal in the Bragg cell of commonly owned U.S. Pat. No. 4,687,958 is optically active (e.g., quartz), there may be an accompanying reduction in the diffraction efficiency which subsequently requires a further increase in the required path length in the uniaxial crystal for what is already an expensive apparatus.

The angle between the optic axis and acoustic beam can also be increased in commonly owned U.S. Pat. No. 4,687,958 by Sommargren in order to achieve a reduction of the momentum mismatch problem and of the required path length. However, the amount that this angle can be increased is restricted, up to approximately 27 degrees in $LiNbO_3$ for example, because the orthogonally polarized beam components generally will suffer total internal reflection at the exit face of the uniaxial crystal for larger angles, and the device would cease to function.

As for the prior art use of a single Bragg cell in commonly owned U.S. Pat. No. 4,684,828 by Sommargren, the apparatus has many parts which are separated and require more space, is sensitive to misalignment of the various parts, is more sensitive to thermal gradients in the apparatus as a result of multiple parts and the required separation of multiple parts, and is not as efficient as the present invention, i.e., approximately 50% of the input beam intensity is transformed into the output beam with the commonly owned U.S. Pat. No. 4,684,828 by Sommargren as compared to nominally 100% with the apparatus described herein.

As for the prior art use of a single Bragg cell in Dirksen, et al., ibid., the frequency difference between the two orthogonally polarized components of the exit beam is twice the frequency of the acoustic beam. Starting with a higher frequency difference, the task of resolution extension becomes more difficult and expensive. Also with the single Bragg cell apparatus in Dirksen, et al., ibid., the efficiency is limited to approximately 80%, and there are significant non uniform intensity distributions across the two orthogonally polarized exit beam components in contrast to the present invention described herein. These non-uniform intensity distributions across the width of the two orthogonally polarized exit beam components have a negative cross-correlation coefficient which further exacerbates the effect of non-uniform beam component intensities for interferometry.

There is generally polarization mixing in both of the two exit beam components from the single Bragg cell apparatus of Dirksen et al., ibid., since this apparatus uses the normal Bragg diffraction mode which limits its utility in precision interferometric measurements.

The single Bragg cell apparatus of Dirksen et al., ibid., is also relatively more complex, requiring a minimum of two optical elements in addition to the Bragg cell, and generates two desired and two undesired beam components which must be separated by external masks to occult the undesired beam components. There is more sensitivity to changes in temperature and temperature gradients because of multiple elements comprised of different materials and because of larger angles between the beam components inside the single Bragg cell aparatus of Dirksen et al., ibid., in contrast to that found in the apparatus of the present invention described herein. The angles between the beam components inside the single Bragg cell apparatus of Dirksen et al., ibid., are generally larger by design because, in part, Dirksen et al., ibid., must spatially separate the desired and undesired beam components as a result of using normal Bragg diffraction in contrast to the present invention described herein which uses anisotropic Bragg diffraction.

The Dirksen et al., ibid., single Bragg cell apparatus, which requires separation of parts, is sensitive to misalignment with additional sensitivity to thermal gradients. In addition, since the acoustic frequency for a single Bragg cell apparatus as in Dirksen et al., ibid., is one half of the frequency difference between the two orthogonally polarized components of the exit beam, the apparatus in Dirksen et al., ibid., must operate at a lower acoustical frequency by a factor of two in relation to that for the apparatus of the present invention described herein to obtain a given frequency difference between the two orthogonally polarized components of the exit beam, which leads to an additional reduction in efficiency.

As for the prior art use of two Bragg cells in the apparatus of Dirksen et al., ibid., such apparatus has more parts than the single Bragg cell apparatus of Dirksen et al., ibid., which are well separated and require more space, there is generally polarization mixing in each of two exit beam components since the two Bragg cell apparatus of Dirksen et al., ibid., uses normal Bragg diffraction mode, is sensitive to misalignment of the various parts, is more sensitive to thermal gradients in the apparatus as a result of multiple parts and the required separation of multiple parts, is not as efficient as the apparatus of the present invention described herein, i.e., approximately 60% to 80% of the input beam intensity is transformed into the output beam with the two Bragg cell apparatus of Dirksen et al., ibid., as compared to nominally 100% with the apparatus described herein, generates two desired and either two or six undesired exit beam components depending on apparatus configuration selected, has increased non uniform intensity distributions across two orthogonally polarized exit beam components, the non uniform intensity distributions across widths of two orthogonally polarized exit beam components have negative cross-correlation coefficient which further exacerbates the effect of non uniform beam component intensities, and external masks are required to occult undesired beam components.

Finally, although the prior art use of two longitudinal modes of a randomly polarized HeNe laser provides a laser beam with two orthogonally polarized frequencies in a rather convenient, cost-effective form, the frequency difference is approximately 500–600 MHz which requires complicated, expensive detection and processing electronics. Furthermore, by starting out with such a high frequency difference, the task of resolution extension becomes difficult and expensive.

It is thus an object of this invention to provide apparatus for generating orthogonally polarized beams of different frequency with a predetermined angle of divergence between them and a predetermined lateral separation between their energy flux profiles.

It is yet another object of the present invention to provide apparatus for generating orthogonally polarized, parallel beams of different frequency that have energy flux profiles that are either partially coextensive or substantially coextensive.

Other advantages and objects of the invention will, in part, be obvious and will, in part, appear hereinafter when the detailed description is read in conjunction with the drawings.

BRIEF DESCRIPTION OF THE DRAWINGS

The structure, operation, and methodology of the invention, together with other objects and advantages thereof, may best be understood by reading the detailed description in connection with the drawings in which each similar part has an assigned numeral that identifies it wherever it appears in the various drawings and wherein:

FIG. 1b diagrammatically illustrates acousto-optical apparatus 40 and the paths of the optical beams through apparatus 40 for the first embodiment;

FIG. 1c diagrammatically illustrates various angular relationships between the facets of acousto-optical crystal 47 of the first embodiment;

FIG. 1e diagrammatically illustrates acousto-optical apparatus 40 and the paths of the optical beams through apparatus 40 for the first variant of the first embodiment;

FIG. 1f diagrammatically illustrates various angular relationships between the facets of acousto-optical crystal 47 for the first variant of the first embodiment;

FIG. 2b diagrammatically illustrates acousto-optical apparatus 240 and the paths of the optical beams through apparatus 240 for the second embodiment along with various angular relationships within this embodiment;

FIG. 2e diagrammatically illustrates acousto-optical apparatus 240 and the paths of the optical beams through apparatus 40 for the second variant of the second embodiment along with various angualr relationships within this embodiment;

FIG. 4b diagrammatically illustrates acousto-optical apparatus 440 and the paths of optical beams associated with input beam 18 through apparatus 440 of the fourth embodiment along with various angular relationships among the facets thereof;

FIG. 4c diagrammatically illustrates acousto-optical apparatus 440 and the paths of optical beams associated with input beam 19 through apparatus 440 of the fourth embodiment;

FIG. 4e diagrammatically illustrates acousto-optical apparatus 440 and the paths of optical beams associated with input beam 18 through apparatus 440 of the first variant of the fourth embodiment along with various angular relatonships among the facets thereof;

FIG. 4f diagrammatically illustrates acousto-optical apparatus 440 and the paths of optical beams associated with input beam 19 through apparatus 440 of the first variant of the fourth embodiment along with various angular relationships among the facets thereof;

FIG. 4h diagrammatically illustrates acousto-optical apparatus 540 and the optical paths through apparatus 540 for the second variant of the fourth embodiment along with various angular relationships among its facets;

SUMMARY OF THE INVENTION

Figure 1A:
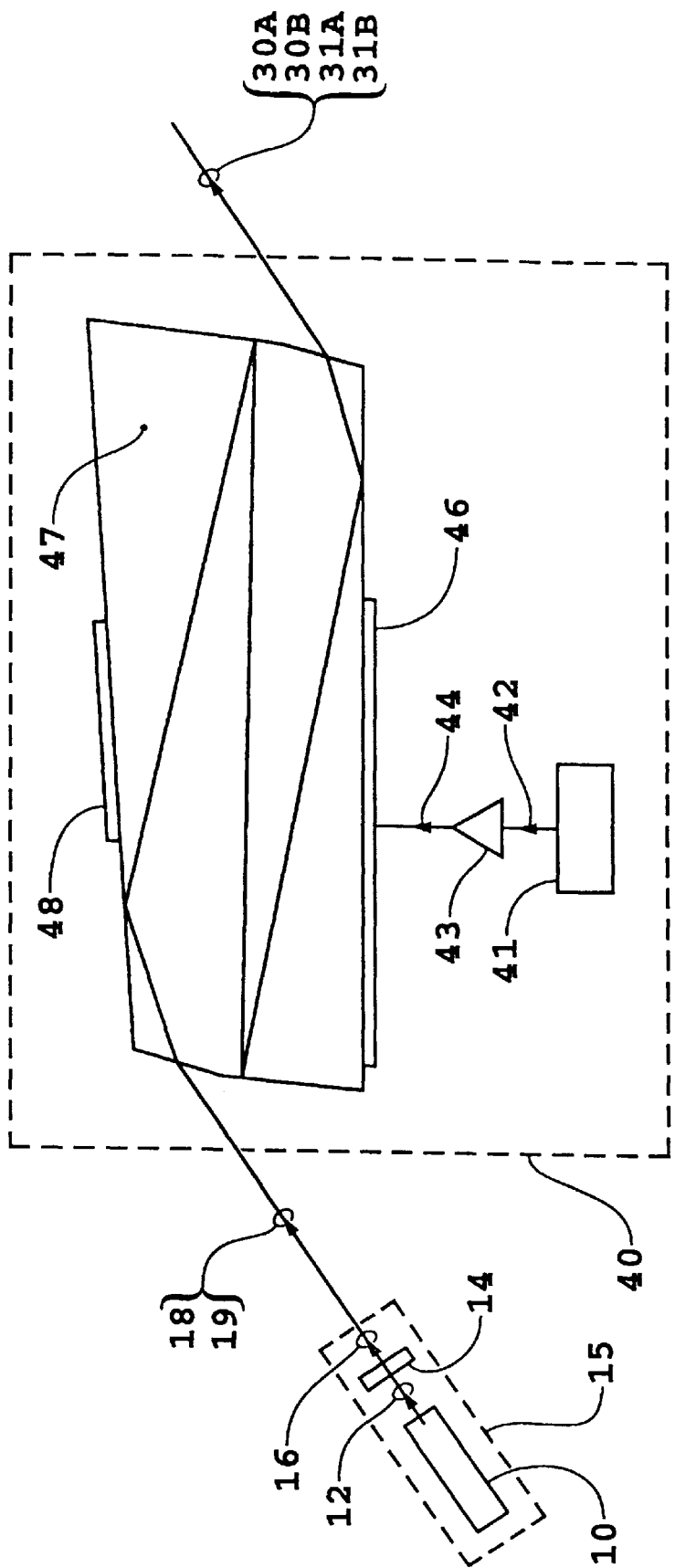
FIG. 1a–1c taken together illustrate, in diagrammatic form, the presently preferred first embodiment of the instant invention with FIG. 1a showing a source in dashed box 15 and the optical path between source 15 and acousto-optical apparatus 40.

The present invention relates to apparatus for providing linearly-orthogonally polarized light beams of different frequency for use in precision metrology applications such as in the measurement of length or length changes using interferometric techniques. The linearly-orthogonally polarized light beams are preferably parallel but may beneficially have a predetermined angle of divergence or convergence between them. A number of different embodiments of the invention are disclosed in the form of electro-optical devices for transforming a single-frequency input beam comprising individual, linearly-orthogonally polarized beams from a light source, preferably a laser of frequency, $f_L$, into an output beam having two principal, linearly-orthogonally polarized, preferably parallel output beams differing in frequency from each other and from the light source frequency, $f_L$. The energy flux profiles of the output beams may be spatially separated, partially coextensive, or substantially coextensive in accordance with the details of particular device embodiments. The input beam is introduced to a multifaceted anisotropic acousto-optical crystal for travel through an interactive region where it experiences an acoustic beam that diffracts it via small angle Bragg diffraction to form two sets of orthogonally polarized internal beam components that are separated by a small angle of divergence and subsequently become four external beams two of which, the principal ones, are available outside of the acousto-optical crystal for use in anticipated downstream applications. The remaining two of the four output beams are preferably reduced to nominally zero intensities compared to the intensity of the input laser beam so as to achieve a high efficiency conversion of the input laser beam into the principal output beams thus rendering the two output beams with reduced intensities spurious. The spurious beams do not to present deleterious feedback to the laser cavity or deleterious effects in downstream application in part because of the reduced intensities. Also, beams that travel back through the apparatus to the laser cavity generally will have been changed in frequency and so essentially do not contribute to deleterious feedback to the laser cavity. Spatial filtering may be used to further control any negative impact of the spurious beams.

In all of the embodiments, the multifaceted or multifaced anisotropic acousto-optical crystal has an optic axis, z, and a first facet that is nominally parallel to the optic axis. The acousto-optical crystal preferably is a uniaxial crystal comprising lithium niobate.

Transducer means, preferably in the form of a piezoelectric transducer, are affixed to the first acousto-optical crystal facet for generating an acoustic beam so that it propagates generally perpendicular to the optic axis to provide an interaction region within the optical crystal, where the width of the interaction region is generally coextensive with the width of the acoustic beam. The acoustic beam preferably is a shear wave.

The transducer is driven with an electrical signal at a frequency, $f_0$, from a frequency stabilized electronic oscillator and an electronic amplifier. The electrical signal is transformed to the acoustic shear wave via the transducer and propagates inside of the acousto-optical crystal to form the interactive region. The principal output beams have frequencies $f_L \pm f_0$. The angle of incidence of the input laser beam at an entrance facet of the acousto-optical crystal is chosen along with orientations of internal crystal facets so as to effect a high efficiency conversion of the input laser beam into the principal output beams. Power is used as a means of reducing the intensity of the spurious beams to nominally zero.

The input laser beam is introduced into the acousto-optical crystal so that it propagates through the interaction region at least once with a predetermined portion of each of its components converted by small angle Bragg diffraction to diffracted beams. The diffracted beams, which are derived from the initial individual linearly-orthogonally polarized input beams, are orthogonally polarized with respect to their respective individual linearly-orthogonally polarized input beams and altered in frequency by the frequency, $f_0$, of the oscillator. The remainder of the individual linearly-orthogonally polarized input beams and their respective associated diffracted beams continue to propagate through the anisotropic acousto-optical crystal along respective paths as slightly diverging orthogonally polarized emergent beams. Depending on the specific embodiment, selected ones of the emergent beams are either intercepted within the acousto-optical crystal or outside of it to be rendered preferably parallel by collimating means. The collimating means can be in the form of internal reflecting and/or integral refracting surfaces and/or external elements. However, if desired, the selected ones of the external beams can be non-parallel such that they have a predetermined angle of divergence or convergence between them.

The degree of overlap or spatial separation between the energy flux profiles of the principal, linearly-orthogonally polarized, external beams is controlled by various internal reflecting and refracting properties of the acousto-optical crystal, its birefringence, the acoustical and optical properties of the acousto-optical crystal, the length of the physical path of travel experienced by the emergent beams, and/or the use of external control elements. Thermal compensation may be provided via the use of symmetry in the design of the crystal or the arrangement of external components with respect to the crystal or some combination of both. High diffraction efficiency may be achieved via the use of multiple pass arrangements through the interaction zone to reduce input power requirements. In multiple pass arrangements, phase control is implemented via external components or the use of selective transits through the crystal.

DETAILED DESCRIPTION OF THE PREFERRED EMBODIMENTS

The present invention relates to apparatus for providing linearly-orthogonally polarized light beams for use in precision metrology applications such as in the measurement of length or length changes using interferometric techniques. A number of different embodiments of the invention are disclosed in the form of electro-optical devices for transforming a single-frequency beam comprised of two linearly-orthogonally polarized, preferably parallel input beams from a light source, preferably a laser of frequency $f_L$, into a beam comprised substantially of two linearly-orthogonally polarized, preferably parallel principal output beams differing in frequency from each other and from the frequency $f_L$ of the input beams. While the directions of propagation of the input beams are preferably parallel and the directions of propagation of the principal output beams are preferably parallel, they need not be and instead the individual beams of the input beam and the principal output beams may beneficially have their own predetermined angle of divergence or convergence, respectively. The energy flux profiles of the individual input beams may be spatially separated, partially coextensive, or substantially coextensive, and the energy flux profiles of the principal output beams may be spatially separated, partially coextensive, or substantially coextensive in accordance with the details of particular device embodiments and the requirements of the metrology or other contemplated application. In addition, thermal compensation may be made available through the exploitation of the principles of symmetry while power requirements may be reduced through the use of multiple pass arrangements for optical beams through the interaction region of an anisotropic acousto-optical crystal. In the embodiments to be described, the input beams preferably are coextensive, and the principal output beams preferably are coextensive.

Figure 1B:
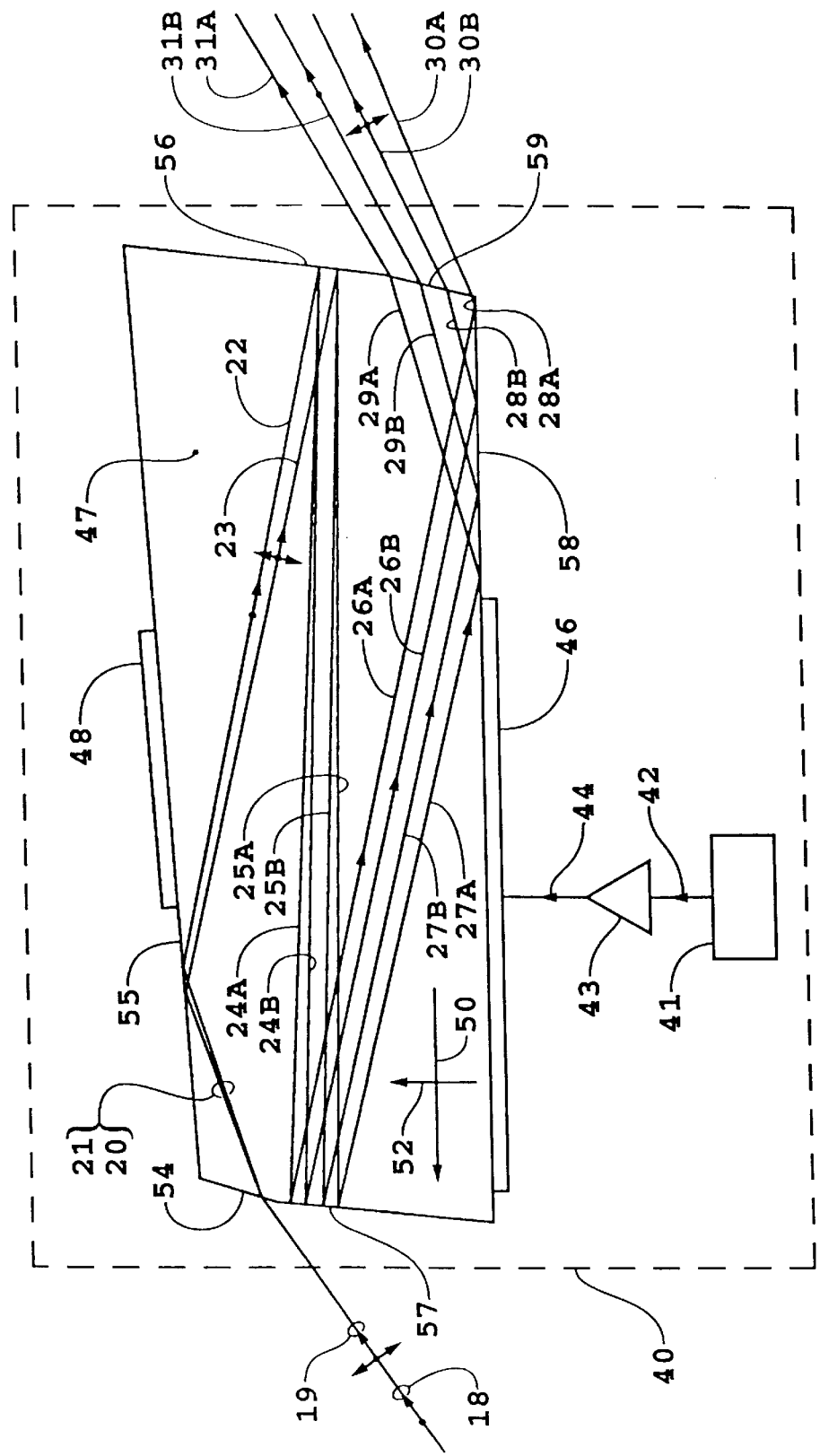
Figure 1C:
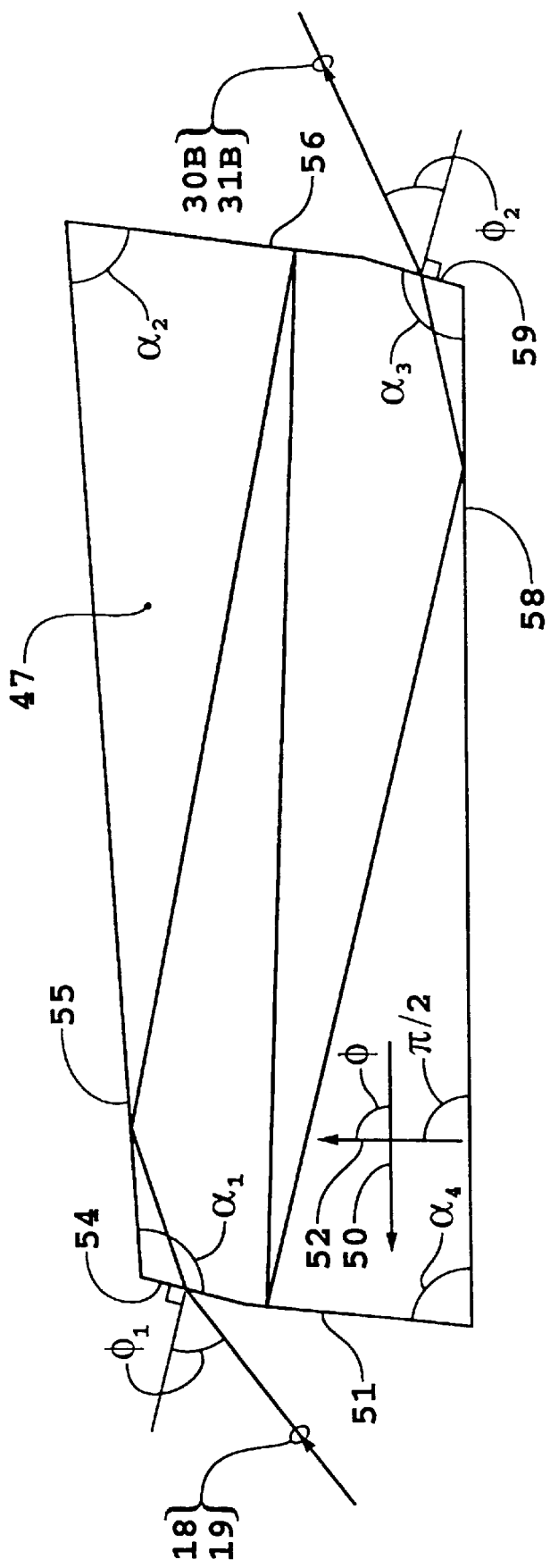

Referring to the drawings in detail, and initially to FIGS. 1a–1c, FIG. 1a depicts, in diagrammatic form, the presently first preferred embodiment of the apparatus for the present invention. While the apparatus of the present invention has application for a wide range of radiation sources, the following description is taken, by way of example, with respect to an optical measuring system. The term "optical energy" as used herein includes, but is not limited to, electromagnetic energy of all frequency ranges.

In accordance with the first embodiment of the present invention, an acousto-optical apparatus is provided that is capable of transforming a single frequency beam comprised of two linearly-orthogonally polarized input beams into a beam comprised of two principal and two spurious secondary output beams. The principal output beams are linearly-orthogonally polarized, preferably have the same directions of propagation, and preferably have coextensive energy flux profiles. The frequencies of the principal output beams are different one from the other and different from the frequency of the input beams. The intensities of the two principal output beams are substantially equal, and the combined intensities of the principal output beams is substantially equal to the combined intensities of the input beams. In addition, thermal compensation is incorporated through the exploitation of principles of symmetry and a series of internal reflections in the acousto-optical apparatus wherein the thermal compensation is with respect to the relative phase of the principal output beams.

FIG. 1b depicts in diagrammatic form the detailed propagation of input beams 18 and 19 through an anisotropic acousto-optical crystal 47 such that the nominal angle between the input beams 18 and 19 and output beams 30A, 30B, 31A, and 31B is an angle specified by the design of the acousto-optical crystal 47 to be equal to approximately 0 degrees and substantially independent of small changes in the orientation of the acousto-optical crystal 47.

A light source 10, most preferably a laser, provides a beam 12 of optical energy which has a single, stabilized frequency and is linearly polarized. Light source 10 can be any of a variety of lasers. For example, it can be a gas laser, e.g. a HeNe, stabilized in any of a variety of conventional techniques known to those skilled in the art to produce beam 12, see for example, T. Baer et al., "Frequency Stabilization of a 0.633 μm He—Ne—longitudinal Zeeman Laser," *Applied Optics,* 19, 3173–3177 (1980); Burgwald et al., U.S. Pat. No. 3,889,207, issued Jun. 10, 1975; and Sandstrom et al., U.S. Pat. No. 3,662,279, issued May 9, 1972. Alternatively, light source 10 can be a diode laser frequency stabilized in one of a variety of conventional techniques known to those skilled in the art to produce beam 12, see for example, T. Okoshi and K. Kikuchi, "Frequency Stabilization of Semiconductor Lasers for Heterodyne-type Optical Communication Systems," *Electronic Letters,* 16, 179–181 (1980) and S. Yamaqguchi and M. Suzuki, "Simultaneous Stabilization of the Frequency and Power of an AlGaAs Semiconductor Laser by Use of the Optogalvanic Effect of Krypton," *IEEE J. Quantum Electronics,* QE-19, 1514–1519 (1983).

The specific device used for source 10 will determine the diameter and divergence of beam 12. For some sources, e.g. a diode laser, it likely will be necessary to use conventional beam shaping optics 14, e.g. a conventional microscope objective, to provide beam 16 with a suitable diameter and divergence for the elements that follow. When source 10 is a HeNe laser, for example, beam shaping optics 14 may not be required. The elements 10 and 14 are shown in dashed box 15 which represents the source of beam 16. Beam 16 has one stabilized frequency $f_L$ and is linearly polarized.

The plane of polarization of beam 16 is rotated about the axis of beam 16 using techniques known to those skilled in the art, e.g. phase retardation plates, to form a beam comprised of input beams 18 and 19. The two input beams 18 and 19 are linearly polarized perpendicular to the plane of FIG. 1a and linearly polarized in the plane of FIG. 1a, respectively. Beams 18 and 19 further have the same frequency $f_L$. The relative intensities of beams 18 and 19 are adjusted by control of the degree of rotation applied to the plane of polarization of beam 16.

Beams 18 and 19 are incident on acousto-optical apparatus 40 as illustrated in FIG. 1a. The paths of beams in acousto-optical apparatus 40 originating from beams 18 and 19 are shown in FIG. 1b.

Electrical oscillator 41 (FIG. 1b) preferably provides a frequency stabilized electrical signal 42 of frequency $f_o$ to a conventional power amplifier 43. An electrical output 44 of power amplifier 43 is preferably used to drive a conventional piezoelectric transducer 46, preferably of multielement array configuration, affixed to the acousto-optical crystal 47. Piezoelectric transducer 46 is used to generate an acoustic beam, preferably of the shear wave type. Known to those skilled in the art of acousto-optical modulation, the shear wave may be generated with the piezoelectric transducer 46 affixed to acousto-optical crystal 47 as shown in FIG. 1b or by reflecting an appropriately directed longitudinal acoustic wave from an appropriately oriented surface of acousto-optical crystal 47. Conventional techniques known to those skilled in the art of acousto-optical modulation are used to absorb in a preferred distribution the acoustic beam that passes through to the walls of acousto-optical crystal 47 for the purpose of substantially reducing temperature gradients in acousto-optical crystal 47. The absorption of the acoustic beam at the walls of acousto-optical crystal 47 is by absorber 48. The distribution of absorber 48 on the surface or surfaces of acousto-optical crystal 47 is a design which permits absorber 48 to make the distribution of energy dissipation of the acoustic beam at the walls of acousto-optical crystal 47 correspond to the preferred distribution of absorption of the acoustic beam.

The presently preferred acousto-optical crystal 47 of the first embodiment is made of a uniaxial crystal [e.g., LiNbO$_3$ or potassium dihydrogen phosphate (KDP)] having an optical axis 50 in the plane of FIG. 1b which makes an angle φ (cf. FIG. 5) with the direction of propagation of the acoustic wave 52 generated by the piezoelectric transducer 46. The diagrammatic illustrated in FIG. 1b is for an acousto-optical crystal 47 comprised of a negative uniaxial crystal.

Figure 5:
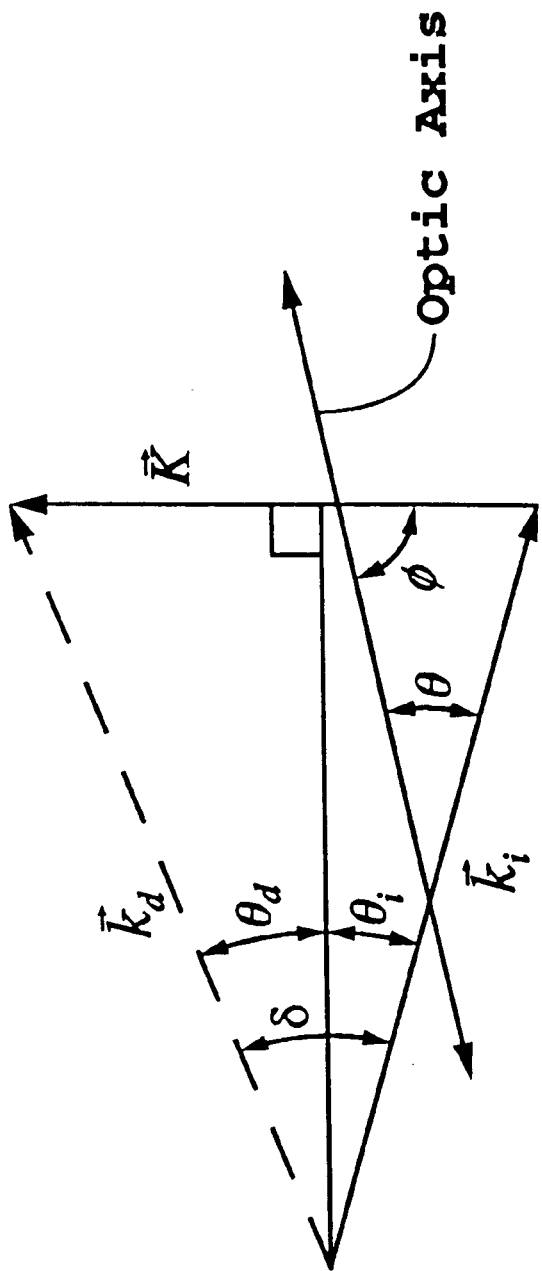
FIG. 5 depicts the relative orientations of the optical axis of acousto-optical crystals employed in the various embodiments and variants of the invention and wavevector construction describing Bragg diffraction at a frequency $v_d = v_i - f_0$ in a negative uniaxial crystal for use in the present invention when the incident wave is ordinarily polarized.

Input beam 18, such as illustrated in FIGS. 1b and 1c, preferably enters the acousto-optical crystal 47 at surface 54 with an angle of incidence $\phi_1$ (See FIG. 1c), becoming an ordinarily polarized beam 20. Beam 20 is reflected by surface 55 becoming an ordinarily polarized beam 22. Beam 22 is reflected by surface 56 becoming ordinarily polarized incident beam 24A. Due to the photoelastic interaction of incident beam 24A with the acoustic wave 52 [see for example, R. W. Dixon, "Acoustic Diffraction of Light in Anisotropic Media," *IEEE Journal of Quantum Electronics,* QE-3, 85–93 (1967); A. Yariv and P. Yeh, Optical Waves in Crystals (Wiley, N.Y.), Chap. 9,(1984)], an extraordinarily polarized beam, diffracted beam 24B, is generated by small angle Bragg diffraction when the following relationships are satisfied;

$$\sin\theta_i = \frac{\lambda_0}{2n_i v}\left[f_0 + \frac{v^2}{f_0\lambda_0^2}(n_i^2 - n_d^2)\right], \qquad (1)$$

$$\sin\theta_d = \frac{\lambda_0}{2n_d v}\left[f_0 - \frac{v^2}{f_0\lambda_0^2}(n_i^2 - n_d^2)\right] \qquad (2)$$

where $n_i$ and $n_d$ are the indices of refraction for the incident and diffracted beams, respectively, $\lambda_0$ is the optical wavelength in vacuum, and $v$ is the acoustic speed. The angles $\theta_i$ and $\theta_d$ are the angles between incident beam 24A and the normal to the acoustic K-vector and the angle between diffracted beam 24B and the normal to the acoustic K-vector, respectively. The definitions of positive $\theta_i$ and $\theta_d$ are illustrated in FIG. 5.

The index of refraction n for an extraordinarily polarized beam in a birefringent crystal is given by the expression:

$$\frac{1}{n^2} = \frac{1}{n_o^2}\cos^2\theta + \frac{1}{n_e^2}\sin^2\theta \qquad (3)$$

where the angle θ is the angle between the extraordinarily polarized beam and the optical axis of the acousto-optical crystal and $n_o$ and $n_e$ are the ordinary and extraordinary principal indices of refraction of the acousto-optical crystal, respectively.

Diffracted beam 24B propagates at a small angle to that of the non diffracted incident beam 24A, the polarization of diffracted beam 24B being orthogonal to that of incident beam 24A. In addition, the frequency of beam 24B is $f_L-f_0$ while the frequency of beam 24A is $f_L$. Beams 24A and 24B are reflected by crystal face 57 as beams 26A and 26B, respectively, beams 26A and 26B are reflected by crystal face 58 as beams 28A and 28B, respectively, and beams 28A and 28B exit acousto-optical crystal 47 at face 59 as beams 30A and 30B, respectively.

Input beam 19, such as illustrated in FIGS. 1b and 1c, preferably enters the acousto-optical crystal 47 at surface 54 with an angle of incidence $\phi_1$, becoming an extraordinarily polarized beam 21. Beam 21 is reflected by surface 55 becoming an extraordinarily polarized beam 23. Beam 23 is reflected by surface 56 becoming extraordinarily polarized incident beam 25A. Due to the photoelastic interaction of incident beam 25A with the acoustic wave 52, an ordinarily polarized, diffracted beam 25B is generated by small angle Bragg diffraction when the relationships given by Eqs. (1) and (2) are satisfied.

Diffracted beam 25B propagates at a small angle to that of non diffracted incident beam 25A, the polarization of diffracted beam 25B being orthogonal to that of incident beam 25A. In addition, the frequency of beam 25B is $f_L+f_0$ while the frequency of beam 25A is $f_L$. Beams 25A and 25B are reflected by crystal face 57 as beams 27A and 27B, respectively, beams 27A and 27B are reflected by crystal face 58 as beams 29A and 29B, respectively, and beams 29A and 29B exit acousto-optical crystal 47 at face 59 as beams 31A and 31B, respectively.

The respective angles of incidence and refraction for beams 18, 19, 20, and 21 at surface 54, the respective angles of incidence and reflection for beams 20, 21, 22, and 23 at surface 55, and the respective angles of incidence and reflection for beams 22, 23, 24A, and 25A at surface 56 are chosen such that the angle of deviation between beams 24B and 25B is $\epsilon-\delta$ where $\epsilon$ is a small angle, preferably $0 \leq \epsilon \leq \delta$, the angle of deviation between beams 24A and 24B is $\delta$, the angle of deviation between beams 25A and 25B is $-\delta$, and the angle of deviation between beams 24A and 25A is $\delta+\epsilon$ where $\delta$ is specified by the equation $$\sin\delta = \frac{\lambda_0}{n_i \Lambda}\cos\theta_d = \frac{\lambda_0}{n_d \Lambda}\cos\theta_i \quad (4)$$

and $\Lambda$ is the wavelength of the acoustic beam in acousto-optical crystal 47. These conditions with respect to relative directions of propagation of beams 24A, 24B, 25A, and 25B are obtained by choosing the apex angles $\alpha_1$ and $\alpha_2$ defined in FIG. 1c to satisfy the equation $$\delta + \varepsilon = \left[\alpha_2 - \alpha_1 + \sin^{-1}\left(\frac{\sin\phi_1}{n_o}\right)\right] - \sin^{-1}\left[\left[\frac{n_{3e}}{n'_{3e}}\sin\left(\left(\alpha_2 - \sin^{-1}\left\{\frac{n_{2e}}{n'_{2e}}\sin\left[\alpha_1 - \sin^{-1}\left(\frac{\sin\phi_1}{n'_{1e}}\right)\right]\right\}\right)\right)\right]\right] \quad (5)$$

where $n'_{1e}=n_{2e}$ are the indices of refraction for beam 21 at surfaces 54 and 55, respectively, $n'_{2e}=n_{3e}$ are the indices of refraction for beam 23 at surfaces 55 and 56, respectively, and $n'_{3e}$ is the index of refraction for beam 25A at surface 56.

The respective angles of incidence and reflection for beams 24A, 24B, 25A, 25B, 26A, 26B, 27A, and 27B at surface 57, the respective angles of incidence and reflection for beams 26A, 26B, 27A, 27B, 28A, 28B, 29A, and 29B at surface 58, and the respective angles of incidence and refraction for beams 28A, 28B, 29A, 29B, 30A, 30B, 31A, and 31B at surface 59 are chosen such that beams 30B and 31B preferably are parallel. Beams 30B and 31B preferably are spatially displaced by a minute amount, i.e. a small fraction of the beam diameters, therein being substantially coextensive. The conditions with respect to the relative directions of propagation of beams 31B and 30B are obtained by choosing the apex angles such that $$\delta - \varepsilon = \left[\alpha_4 - \alpha_3 + \sin^{-1}\left(\frac{\sin\phi_2}{n_o}\right)\right] - \sin^{-1}\left[\left[\frac{n_{6e}}{n'_{6e}}\sin\left(\left(\alpha_4 - \sin^{-1}\left\{\frac{n_{5e}}{n'_{5e}}\sin\left[\alpha_3 - \sin^{-1}\left(\frac{\sin\phi_2}{n'_{4e}}\right)\right]\right\}\right)\right)\right]\right] \quad (6)$$

where $\alpha_3$ and $\alpha_4$ are defined in FIG. 1c, $n'_{4e}=n_{5e}$ are the indices of refraction for beam 28B at surfaces 59 and 58, respectively, $n'_{5e}=n_{6e}$ are the indices of refraction for beam 26B at surfaces 58 and 57, respectively, and $n'_{6e}$ is the index of refraction for beam 24B at surface 57. Clearly, when it is desired to have the beams 30B and 31B be not parallel, i.e. $\phi_2$ for beam 30B not the same as $\phi_2$ for beam 31B, then the values of the parameters of Eqs. (5) and (6) may be chosen so that beams 30B and 31B have a predetermined angle of divergence or convergence between them. In addition, it is clear that when it is desired to have beams 18 and 19 be not parallel, i.e. $\phi_1$ for beam 18 not the same as $\phi_1$ for beam 19, then the values of the parameters of Eqs. (5) and (6) may also be chosen so that beams 18 and 19 have a predetermined angle of divergence or convergence between them.

Beams 30A and 31A are spurious secondary output beams and beams 30B and 31B comprise principal output beams. The spatial displacements between beams 30A, 30B, 31A, and 31B preferably are only small fractions of the beam diameters. If desired, however, it is clear that principal output beams 30B and 31B may be separated or partially separated, for example, through the separation or partial separation, respectively, of input beams 18 and 19. For purposes of illustration, these displacements are shown greatly exaggerated in FIG. 1b.

Preferably, the electrical output 44 of the power amplifier 43 is adjusted so that intensity of principal output beam 30B relative to the intensity of the input beam 18 is some preselected nominal value between 0% and 100%, preferably 100%. The ratio of the intensity of principal output beam 31B to the intensity of beam 19 is substantially the same as the ratio of the intensity of beam 30B to the intensity of beam 18. Further, beams 30B and 31B are orthogonally polarized and substantially coextensive. The frequencies of principal output beams 30B and 31B are different by $2f_0$ and different from the frequency of beam 16 by $\mp f_0$, respectively.

The ratio of the intensity of principal output beam 30B to the sum of the intensities of principal output beams 30B and 31B is adjusted to some preselected nominal value between 0% and 100%, preferably 50%, through the rotation of the polarization of beam 16.

Spurious secondary output beams 30A and 31A are orthogonally polarized beams with frequencies the same as the frequency of beam 16. The directions of propagation of secondary output beams 30A and 31A deviate from the direction of propagation of principal output beams 30B and 31B by approximately $-n_o\epsilon$ and $n_o\epsilon$, respectively. The intensities of the secondary output beams 30A and 31A preferably have nominal values of 0% of the intensities of principal output beams 30B and 31B, respectively, a consequence of the adjustment of electrical output 44 of the power amplifier 43 so that intensity of either principal output beam 30B relative to the intensity of the input beam 18 or principal output beam 31B relative to the intensity of the input beam 19 preferably is the nominal value of 100%.

An important feature of the first embodiment is an intrinsically low level of contamination of the output beams with non frequency shifted components having directions of propagation substantially parallel with the direction of propagation of the principal output beams 30B and 31B. The low level of contamination in the inventive apparatus is a consequence of using non normal Bragg diffraction, Bragg diffraction in an uniaxial crystal, instead of normal Bragg diffraction and the absence of additional optical elements such as those comprised of birefringent crystals that would otherwise be required in the path of the output beams to make a pair of output beams parallel. The orientation of the polarization states of the principal output beams when using non normal Bragg diffraction are determined by a plane and a normal to the plane, the plane being defined by the optical axis of the acousto-optical crystal 47 and the direction of propagation of the incident beams 24A and 25A in the acousto-optical crystal 47. In a normal Bragg diffraction process, however, the orientation of the polarization state of the diffracted component of an output beam is the same as the polarization state of the progenitor incident beam. This feature of a normal Bragg diffraction process generally leads to a requirement for an additional birefringent optical element to follow the acousto-optical apparatus and render, if desired, the components of an output beam parallel. An additional birefringent optical element is a potential generator of output beam contamination, the output beam contamination arising from a misalignment of the additional birefringent optical element with respect to the acousto-optical apparatus.

Three objectives in the design of the acousto-optical crystal 47 are to select the orientations for faces 54, 55, 56, 57, 58, and 59 so that Eqs. (5) and (6) are satisfied; to produce an acousto-optical apparatus which is temperature compensated with respect to temperature induced phase shifts between principal output beams 30B and 31B relative to the phase of the acoustic beam; and to effectively isolate laser beam source 15 with respect to coupling between the laser beam source 15 and return beams, the return beams being backscattered and/or reflected portions of beams 30A, 30B, 31A, and 31B passing back through the inventive apparatus and entering laser beam source 15. For the configuration of acousto-optical crystal 47 shown in FIG. 1b, the design parameters and their concomitant effects relevant to the three cited objectives are highly decoupled: the conditions expressed by Eqs. (5) and (6) are satisfied primarily through the adjustment of one parameter such as the orientation of face 55; the conditions required for the temperature compensation are satisfied primarily through the exploitation of the principles of symmetry and additionally through the adjustment of a second independent parameter such as the orientation of face 54; and the condition required for isolation of the laser source 15 is met through adjustment of the acoustic power generated by the piezoelectric transducer 46. This feature with respect to a decoupling of the adjustments used to obtain the three cited objectives makes for a robust design of an acousto-optical apparatus amenable to production and to use in non laboratory environments.

Temperature induced phase shifts between principal output beams 30B and 31B relative to the phase of the acoustic beam arise primarily from two effects, the change with temperature in the difference between the ordinary and extraordinary principal indices of refraction of acousto-optical crystal 47 and the change with temperature in the speed of the acoustic beam in the acousto-optical crystal 47. The temperature coefficient for the difference in effective indices of refraction of the beams 30B and 31B arising from a change with temperature in the ordinary and extraordinary principal indices of refraction in acousto-optical crystal 47 is very low in the inventive apparatus, of the order of or less than $10^{-8}$/(deg C.).

The low effective temperature coefficient is the result of a combination of two factors, the first factor being a $\sin^2\theta$ that appears in the expression $(n_o-n_e)\sin^2\theta$ for the difference in indices of refraction for ordinarily and extraordinarily polarized beams where $\theta$ is the angle between the direction of propagation of the extraordinarily polarized beam and the optical axis of the acousto-optical crystal. The second factor follows from the high level of symmetry in the design of the acousto-optical apparatus. The $\sin^2\theta$ factor for the first embodiment is typically less than or of the order of 0.015. For beams 24B and 25B in particular, the $\sin^2\theta$ factor is of the order of $3\times10^{-4}$.

In regard to the second factor, progenitors of beam 30B are ordinarily polarized beams 20 and 22 and extraordinarily polarized beams 26B and 28B while the progenitors of beam 31B are extraordinarily polarized beams 21 and 23 and ordinarily polarized beams 27B and 29B. Thus for beams 30B and 31B, they are each individually compensated to a high level for temperature induced changes in $n_o$ and $n_e$ as a result of substantially equal paths of respective progenitor beams as ordinarily and as extraordinarily polarized beams. The combination of the individual compensations, the $\sin^2\theta$ factor, and a $[d(n_e-n_o)/dT]=34\times10^{-6}$ per deg C. in $LiNbO_3$ yield the effective temperature coefficient of the order of or less than $10^{-8}$/(deg C.).

The change with temperature in the speed of the acoustic beam in the acousto-optical crystal 47 if not compensated will give rise to a temperature induced change in the phase between beams 30B and 31B relative to the phase of the acoustic beam of the order of 0.02 rad/ (deg C.). This effect in the inventive apparatus may be compensated for example by changing $\alpha_3$ by an angle of the order of 10 min. of arc consistent with satisfying Eqs. (5) and (6) so as to use the temperature induced change in $(n_e-n_o)$ to compensate for the phase shift caused by a temperature induced change in the speed of the acoustic beam.

The preferred mode of operation of the first embodiment with respect to conversion of nominally 100% of beams 18 and 19 into beams 30B and 31B is also a mode wherein the first embodiment is an effective isolator of laser beam source 15 with respect to coupling between the laser beam source 15 and the return beams. The acousto-optical apparatus 40 transforms components of the return beam in a manner analogous to the transformations experienced by beams 18 and 19 except for a reversal in the direction of frequency shifts (cf. R. W. Dixon, ibid.). Consequently, the primary components of the return beam that emerge from the acousto-optical apparatus 40 in a direction opposite to and substantially parallel to input beams 18 and 19 will be frequency shifted with respect to the frequency of source 10 by either $\pm f_0$ or $\pm 2f_0$ depending on the progenitors of the return beam components and on the direction of propagation of the return beam components on entering the acousto-optical apparatus 40. Also, any component of the return beam that emerges from the acousto-optical apparatus 40 in a direction opposite to and substantially parallel to input beams 18 and 19 and frequency shifted by $\pm f_0$ with respect to the frequency of source 10 will have a nominal intensity of 0% of the intensities of input beams 18 and 19.

The components of a return beam that couple into a laser mode of laser source 15 will be those components that have the same frequency as beams 18 and 19 and therefore the same frequency of the laser mode. The intensity $I_{R_c}$ of a component of a return beam component having the same frequency as the laser mode can be expressed as $$I_{Rc} = \eta^2 R I_I \qquad (7)$$

where $I_I$ is the intensity of the progenitor input beam, either input beam 18 or 19, R is the reflection coefficient giving the fraction of the progenitor spurious secondary output beam, either beam 30A or 31A or both, that became the non frequency shifted return beam component, and $\eta$ is the fraction of beams 18 and 19 that become non frequency shifted beams 30A and 31A, respectively. In the preferred mode of operation of the first embodiment, the intensities of secondary output beams 30A and 31A preferably have nominal values of 0% of the intensities of principal output beams 30B and 31B, a consequence of the adjustment of the electrical output 44 of the power amplifier 43 so that intensities of beams 30B and 31B relative to the intensities of the input beams 18 and 19, respectively, are preferably nominal values of 100%. Thus in the preferred of operation, a typical value for $\eta$ may be $$\eta \leq 10^{-2}. \qquad (8)$$

Therefore, the first embodiment of the present invention improves the isolation of laser source 15 with respect to non frequency shifted return beam components typically by a factor of $\leq (10^{-2})^2 = 10^{-4}$ over prior art two frequency generators, the effect of the factor R being omitted as a consequence of the effect of the factor R being common to both the first embodiment of the present invention and prior art two frequency generators.

The angle $\epsilon$ may be made either larger than or smaller than the value of $\delta$ in order to either increase or decrease the deviation between the respective directions of propagation of secondary output beams 30A and 31A and the directions of propagation of principal output beams 30B and 31B. A change in the size of $\epsilon$ relative to the size of $\delta$ may be effectively achieved for example by altering the design of the acousto-optical crystal 47 shown in FIG. 1b so that reflecting surface 58 is not orthogonal to acoustic wave vector 52.

However, there is a restriction on the range of values of $\epsilon$ that can be used. The restriction arises from consideration of the diffraction efficiency of the acousto-optical apparatus which is discussed further in a subsequent description of the seventh preferred embodiment and variants thereof depicted in FIGS. 7a–7i.

The deviation of the energy flux vector from the wave front vector for an optical beam propagating in a birefringent crystal, a well known property of birefringent crystals, causes a relative displacement of a beam from the path of the optical wave vector. The net relative displacements for beams 30B and 31B are compensated to a high level in the first embodiment. The net relative displacement for beam 30B is substantially equal only to the sum of the relative displacements experienced by beams 26B and 28B, the relative displacements of ordinarily polarized beams 20 and 22 being zero. The net relative displacement for beam 31B is substantially equal only to the sum of the relative displacements experienced by beams 21 and 23, the relative displacements of ordinarily polarized beams 27B and 29B being zero. Because of the high level of symmetry in the design of the acousto-optical apparatus with respect to the propagation of beams 21 and 23 and of beams 26B and 28B in acousto-optical crystal 47, the sum of the relative displacements of beams 21 and 23 and the sum of the relative displacements of beams 26B and 28B are substantially equal both in sign and magnitude. The symmetry referenced in this paragraph is in regard to both the angle of propagation of a beam relative to the optical axis 50 as well as the sign of the direction of propagation.

The relative displacements of beams 24A, 24B, 25A, and 25B further contribute to an improvement in the performance of the apparatus of the first embodiment. For the acousto-optical apparatus shown in FIG. 1b, the angle r between the energy flux vector of a beam and the optical axis is $$\tan r = \frac{n_o^2}{n_e^2} \tan\theta \qquad (9)$$

where $\theta$ is the angle between the normal to the wave front and the optical axis [cf. Section 7 of Chapter 10 by J. Bennett and H. Bennett, "Double Refraction in Calcite," *Handbook of Optics* (McGraw-Hill, New York) 1978]. By mathematical manipulation of Eq. (9) and using Eqs. (1) and (2), the difference (r–θ) can be expressed as $$\sin(r - \theta)\left[\frac{2\lambda_0}{n_d\Lambda}(\cos r)\right]\left(1 - \frac{\lambda_0}{2n_d\Lambda}\frac{1}{\sin\theta}\right). \qquad (10)$$

Comparison of sin δ given by Eq. (4) and sin(r–θ) given by Eq. (10) shows that to a good approximation for a wide range of applications in which θ<<1, $$r - \theta = 2\delta. \qquad (11)$$

The angle of deviation between beams 24A and 25A given by Eq. (5) is δ+ε where $\delta \leq \delta + \epsilon \leq 2\delta$ for the preferred mode of $0 \leq \epsilon \leq \delta$ and is of the opposite sign as that of the displacement (r–θ). Therefore the deviation by δ+ε between the normals to the wavefronts of beams 25A and 24A is partially offset by the displacement r–θ=2δ leading to improved properties in the present invention of the first embodiment.

In summary, the relative displacements in the first embodiment produced by the deviation of the energy flux vector from the wave front vector of an optical beam propagating in a birefringent crystal are both substantially compensated in and used to improve the performance of the present invention of the first embodiment.

The direction of the optical axis 50 or z axis of acousto-optical crystal 47 is chosen so as to improve the effective length of the photoelastic interaction path for a given geometry of acousto-optical crystal 47. It is generally known that the energy flux vector deviates from the wave normal for an acoustic beam propagating in a anisotropic crystal. This property is sometimes referred to as "walkoff" (cf. I. C. Chang, "Tunable Acousto-Optical Filter Utilizing Acoustic Beam Walkoff In Crystal Quartz," *Appl. Phy. Lett.* 25(6), 323–324, 1974). In $LiNbO_3$ for example, the deviation is approximately 7 degrees in the (y,z) plane for an acoustic shear wave propagating in the y direction with a shear displacement in the x direction (S. H. Harris and R. W. Wallace, "Acousto-Optic Tunable Filter," *JOSA* 59(6), 744–747, 1969). The effective length of the photoelastic interaction path is optimized by choosing the direction of the optical axis 50 so that the deviation of the energy flux vector of acoustic beam 52 is away from instead of towards surface 54.

The acousto-optical apparatus of the first embodiment also has the feature that the directions of propagation of the principal output beams 30B and 31B are substantially unaffected by tilts of the inventive apparatus. This property is a consequence of an even number of reflections executed by a beam in passing through the acousto-optical apparatus. The sensitivity to tilts that is present arises primarily from a difference between the angle of incidence at surface 54 and the angle of refraction at surface 59 of acousto-optical crystal 47 for beams 18 and 30B, respectively, and a corresponding difference for beams 19 and 31B. It will be apparent to those skilled in the art that the differences between angles of incidence at surface 54 and respective angles of refraction at surface 59 can be substantially eliminated for example by adjusting the orientation of surface 59. This option can also be used to introduce an additional parameter that can be of value in achieving an improved compensation for temperature induced changes in the phase between beams 30B and 31B relative to the phase of the acoustic beam.

Figure 1D:
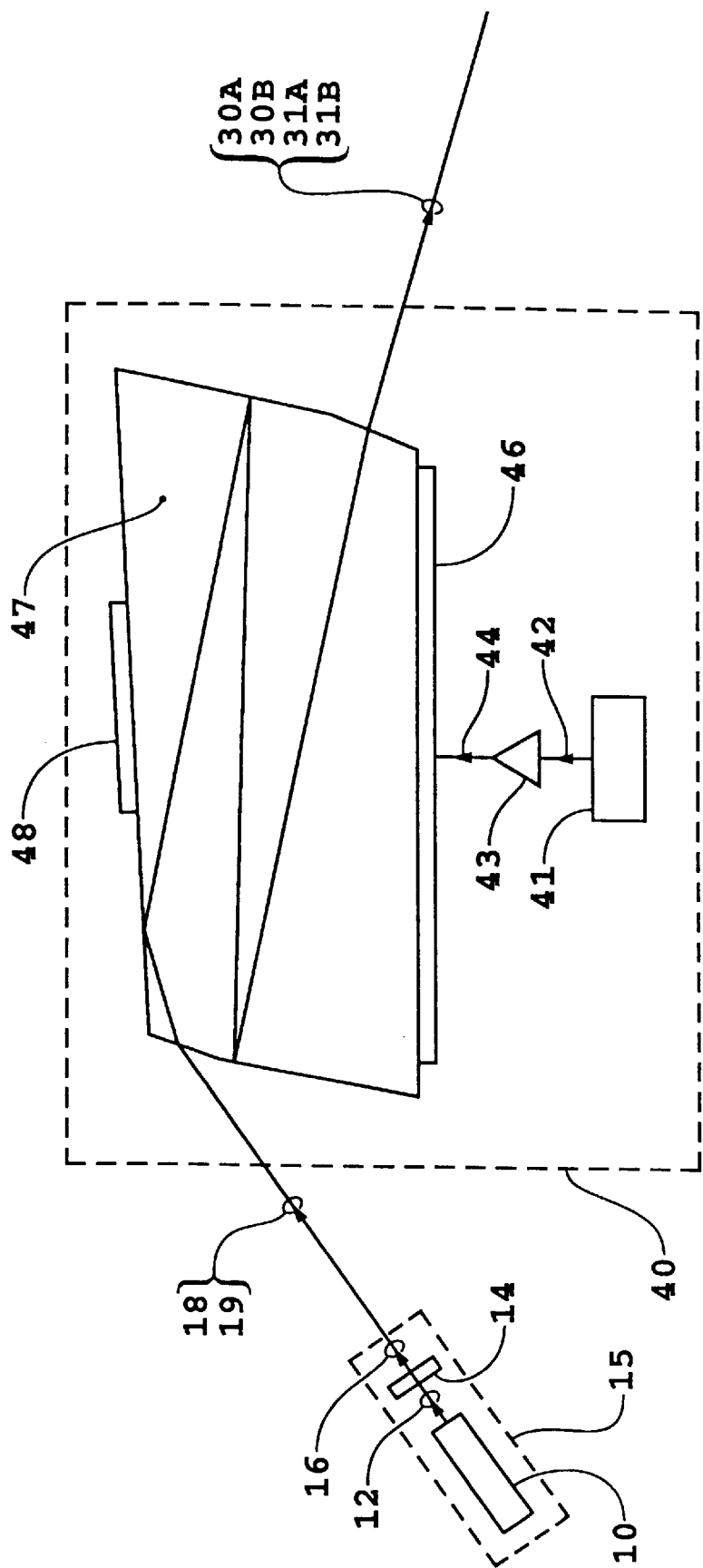
FIG. 1d–1f taken together illustrate, in diagrammatic form, the presently preferred first variant of the first embodiment of the instant invention with FIG. 1d showing source 15 and the optical path between source 15 and acousto-optical apparatus 40.
Figure 1E:
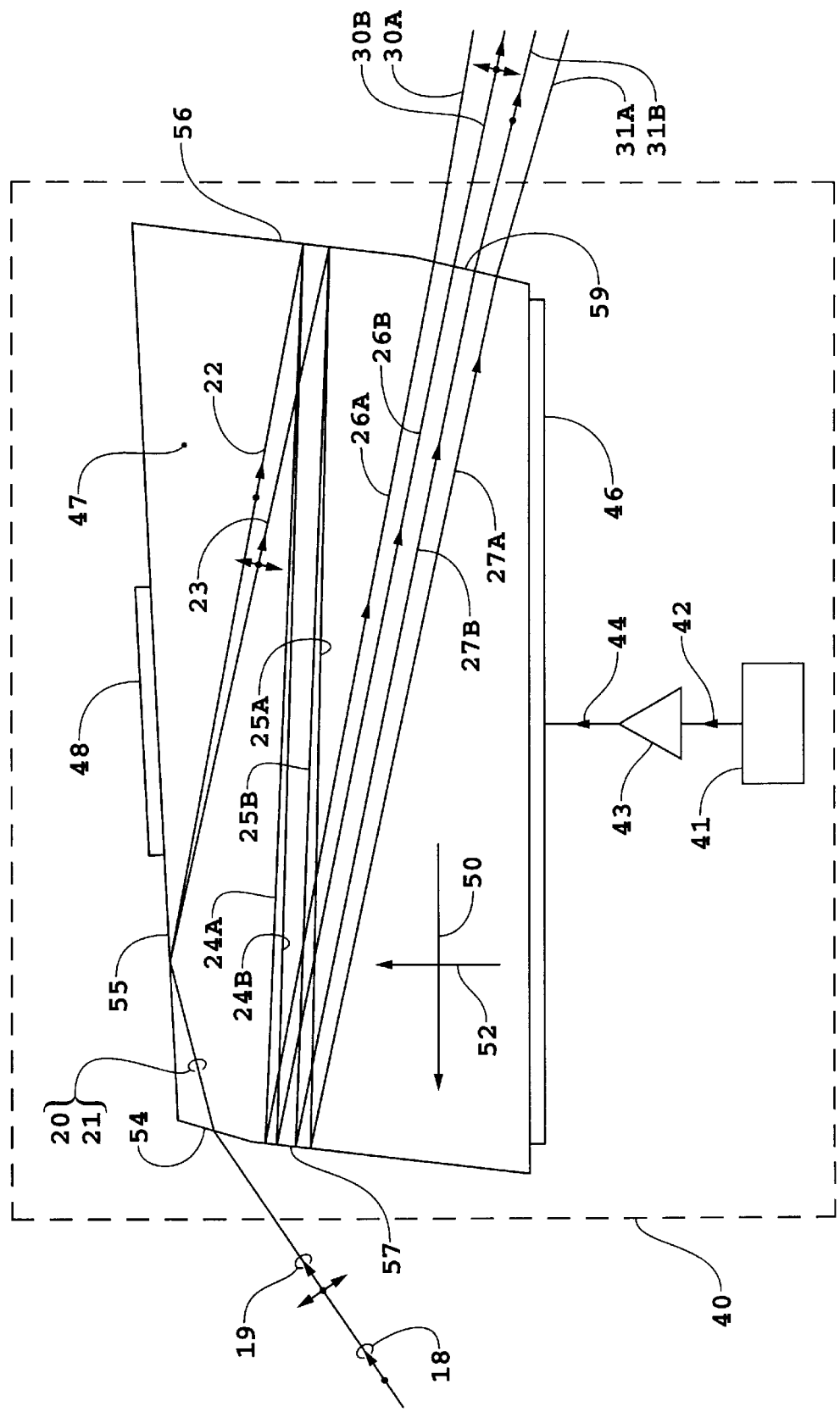
Figure 1F:
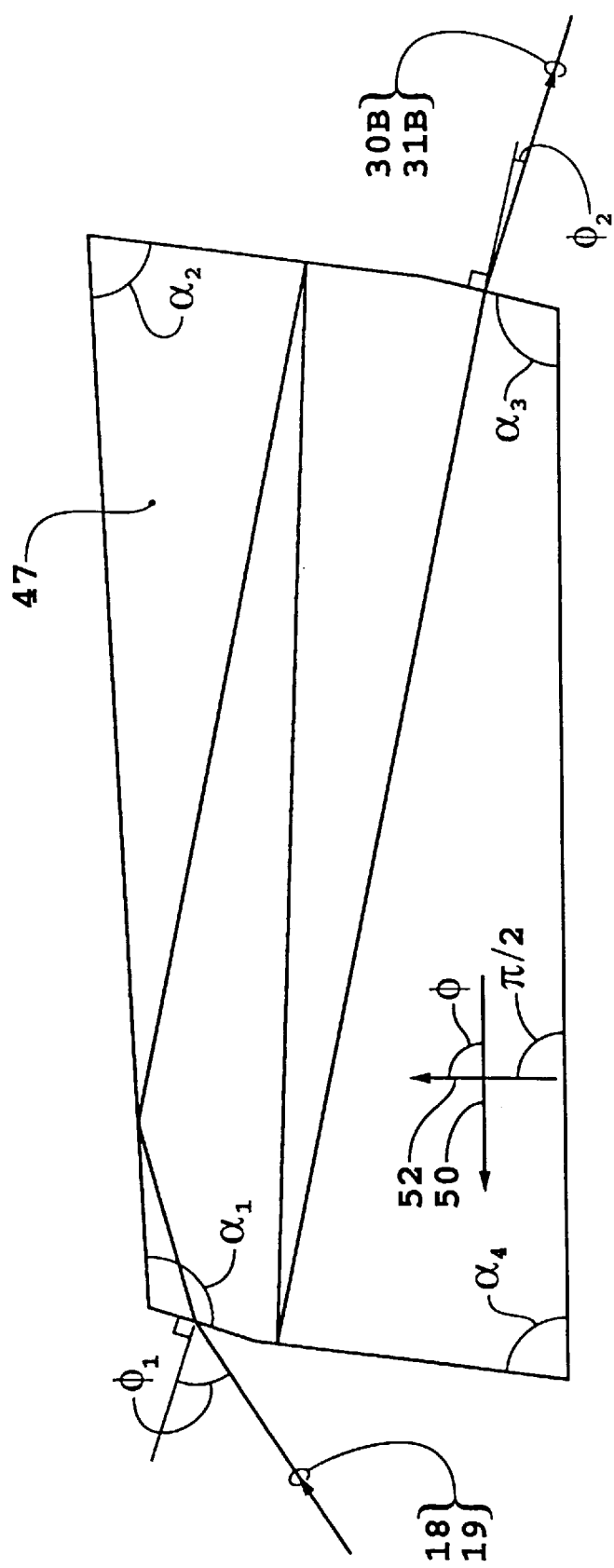

Referring now to FIGS. 1d–1f, FIGS. 1d–1f depict a first variant of the first preferred embodiment wherein the length of the piezoelectric transducer 46 has been increased relative to the length of acousto-optical crystal 47. The apparatus of the first variant in FIGS. 1d–1f comprises substantially the same elements as the first embodiment in FIGS. 1a–1c, elements of the first variant of the first embodiment performing like operations as like denoted elements in the first embodiment, wherein the dimension of acousto-optical crystal 47 in direction 52, the direction of propagation of acoustic beam, has been increased and reflection surface 58 of the first embodiment is not used.

With respect to the fraction of the intensity of input beams 18 and 19 which are transformed into principal output beams 30B and 31B, respectively, for a given input acoustic power, the first variant of the first embodiment has improved efficiency in relation to the first embodiment. However, the first variant of the first embodiment is relatively more sensitive in first order to tilts of the acousto-optical apparatus as a consequence of an odd number of reflections executed by a beam in passing through the acousto-optical apparatus.

Referring to FIG. 1e, the respective angles of incidence and refraction for beams 18, 19, 20, and 21 at surface 54, the respective angles of incidence and reflection for beams 20, 21, 22, and 23 at surface 55, and the respective angles of incidence and reflection for beams 22, 23, 24A, and 25A at surface 56 are chosen such that the angle of deviation between beams 24B and 25B is $\epsilon-\delta$ where $\epsilon$ is a small angle, preferably $\epsilon \cong \delta$ for the first variant of the first embodiment, and $\delta$ is specified by the Eq. (4). The angle of deviation between beams 24A and 24B is $\delta$, the angle of deviation between beams 25A and 25B is $-\delta$, and the angle of deviation between beams 24A and 25A is $\delta+\epsilon$. These conditions respect to relative directions of propagation of beams 24A, 24B, 25A, and 25B are obtained by choosing the apex angles $\alpha_1$ and $\alpha_2$ defined in FIG. 1f to satisfy Eq. (5).

The respective angles of incidence and reflection for beams 24A, 24B, 25A, 25B, 26A, 26B, 27A, and 27B at surface 57 and the respective angles of incidence and refraction for beams 26A, 26B, 27A, 27B, 30A, 30B, 31A, and 31B at surface 59 are chosen such that beams 30B and 31B preferably are parallel. Beams 30B and 31B are spatially displaced by a minute amount, i.e., a small fraction of the beam diameters. The conditions with respect to the relative directions of propagation of beams 31B and 30B are obtained by choosing the apex angles such that $$\delta - \varepsilon = \left[ \alpha_4 + \alpha_3 - \pi + \sin^{-1}\left(\frac{\sin\phi_2}{n_o}\right) \right] - \qquad (12)$$

$$\sin^{-1}\left\{ \frac{n_{5e}}{n'_{5e}} \sin\left[ \alpha_4 + \alpha_3 - \pi + \sin^{-1}\left(\frac{\sin\phi_2}{n'_{4e}}\right) \right] \right\}$$

where $\alpha_3$ and $\alpha_4$ are defined in FIG. 1f, $n'_{4e}=n_{5e}$ are the indices of refraction for beam 26B at surfaces 59 and 57, respectively, and $n'_{5e}$ is the index of refraction for beam 24B at surface 57. Again, when it is desired to have the beams 30B and 31B be not parallel, i.e. $\phi_2$ for beam 30B not the same as $\phi_2$ for beam 31B, then the values of the parameters of Eqs. (5) and (12) may be chosen so that beams 30B and 31B have a predetermined angle of divergence or convergence between them. In addition, it is clear that when it is desired to have the beams 18 and 19 be not parallel, i.e. $\phi_1$ for beam 18 not the same as $\phi_1$ for beam 19, then the values of the parameters of Eqs. (5) and (12) may also be chosen so that beams 18 and 19 have a predetermined angle of divergence or convergence between them.

Beams 30A and 31A are spurious secondary output beams, and beams 30B and 31B comprise principal output beams. The spatial displacements between beams 30A, 30B, 31A, and 31B preferably are only small fractions of the beam diameters. If desired, however, it is clear that principal output beams 30B and 31B may be separated or partially separated, for example, through the separation or partial separation, respectively, of input beams 18 and 19. For purposes of illustration, these displacements are shown greatly exaggerated in FIG. 1e.

It will be apparent to those skilled in the art that differences in the angle of incidence at surface 54 and the angle of refraction at surface 59 for beams 18 and 30B, respectively, and for beams 19 and 31B, respectively, may be substantially eliminated by adjusting, for example, the orientation of surface 59. This option can alternatively be used to introduce an additional parameter that can be of value in achieving an improved compensation for temperature induced changes in the phase between principal output beams 30B and 31B relative to the phase of the acoustic beam.

The remainder of the description for the first variant of the first embodiment is preferably the same as the corresponding portions of the description presented for the first preferred embodiment illustrated in FIGS. 1a–1c.

Figure 1G:
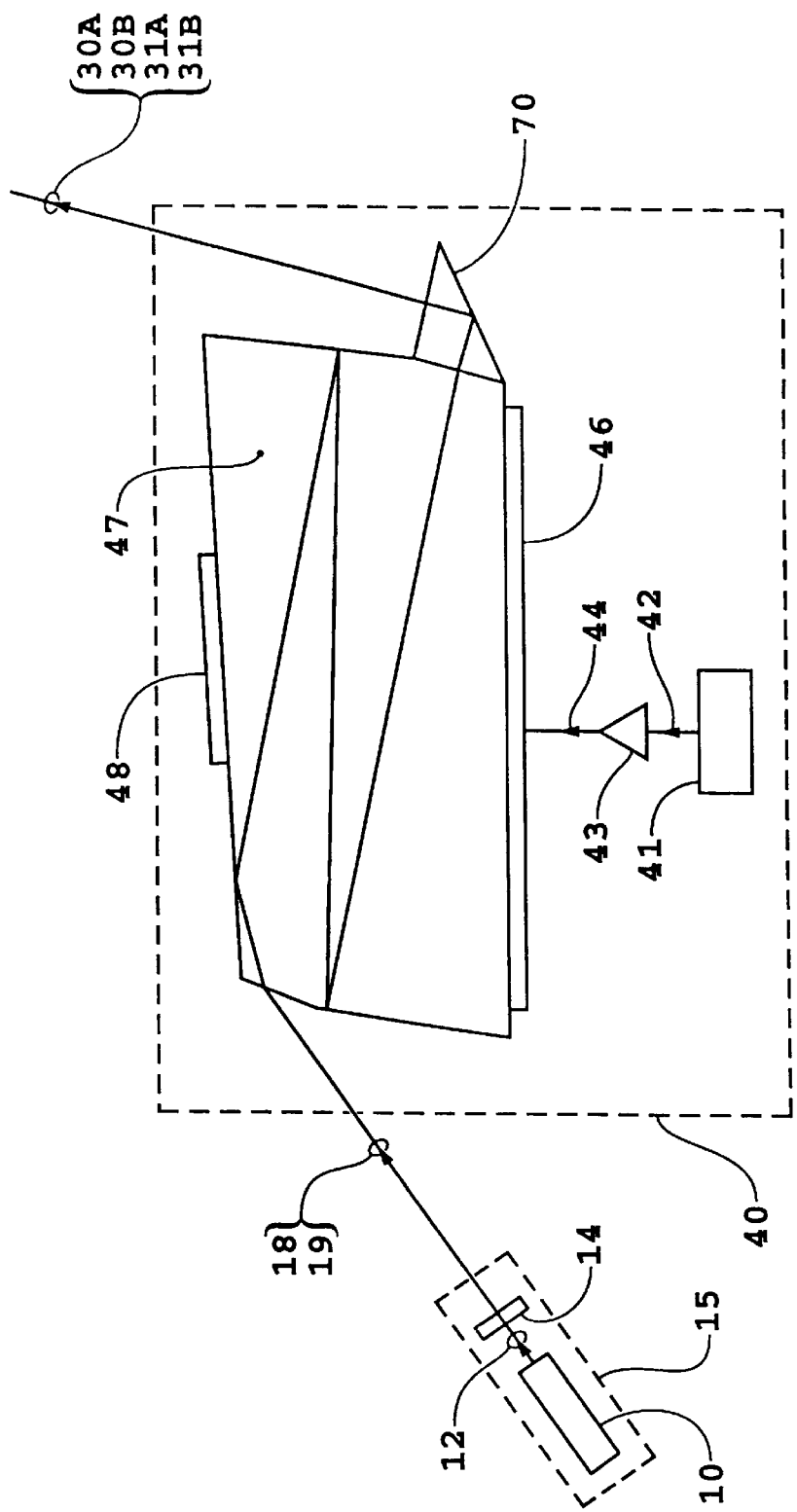
FIG. 1g illustrates, in diagrammatic form, the presently preferred second variant of the first embodiment of the instant invention with FIG. 1g showing source 15 and the optical path between source 15 and acousto-optical apparatus 40.

FIGS. 1g depicts a second variant of the first preferred embodiment depicted in FIGS. 1a–1c wherein the length of the piezoelectric transducer 46 has been increased relative to the length of acousto-optical crystal 47 in comparison to that of the first embodiment, and there is an even number of reflections experienced by a beam passing through the acousto-optical apparatus. The apparatus of the second variant depicted in FIG. 1g comprises substantially the same elements as the first variant of the first embodiment, elements of the second variant in FIG. 1g performing like operations as like denoted elements in the first variant in FIGS. 1d–1f, with an additional an optical means, preferably a non-birefringent prism 70 as shown in FIG. 1g, to reflect the beams transmitted through surface 59 of acousto-optical crystal 47. Prism 70 may be affixed to acousto-optical crystal 47 as shown in FIG. 1g.

With respect to the fraction of the intensities of input beams 18 and 19 which are transformed into principal output beams 30B and 31B, respectively, for a given input acoustic power, the second variant of the first embodiment has the improved efficiency of the first variant of the first embodiment in relation to the first embodiment. However, the acousto-optical apparatus of the second variant of the first embodiment has the following feature in common with the first embodiment, i.e., the direction of the principal output beams 30B and 31B are substantially unaffected by tilts of the inventive apparatus. This property is a consequence of an even number of reflections executed by a beam in passing through the acousto-optical apparatus.

It will be apparent to those skilled in the art that the optical element 70 in FIG. 1g may be orientated to reflect beams 30A, 30B, 31A, and 31B in a clockwise direction in the plane of FIG. 1g instead of in the counter clockwise direction as shown in FIG. 1g without departing from the spirit and the scope of the second variant of the first embodiment.

The remainder of the description for the second variant of the first embodiment is substantially the same as the corresponding portions of the description for the first variant of the first embodiment illustrated in FIGS. 1d–1f.

An unusual and inventive characteristic of acousto-optical apparatus 40 of the first preferred embodiment and variants thereof is the compensation for changes in temperature of the acousto-optical apparatus. In the inventive apparatus, temperature induced changes between optical path lengths of ordinarily and extraordinarily polarized beams, beams which are progenitors of the principal output beams in a birefringent acousto-optical apparatus, are compensated by exploiting the principles of symmetry in the layout of the optical path configurations in the birefringent acousto-optical apparatus. Also in the inventive apparatus, temperature induced changes between the optical path lengths of ordinarily and extraordinarily polarized beams in a birefringent acousto-optical apparatus are combined with the temperature induced change in the speed of the acoustic beam in the acousto-optical apparatus to produce orthogonally polarized output beams for which the relative phase shift between two principal output beams relative to the phase of the acoustic beam is compensated for changes in temperature of the acousto-optical apparatus. The utilization of the principals of symmetry and of the respective temperature sensitivities to produce orthogonally polarized principal output beams wherein the relative phase shift between the two principal output beams relative to the phase of the acoustic beam is compensated for changes in temperature of the acousto-optical apparatus is believed to be taught herein for the first time.

Another unusual and inventive characteristic of acousto-optical apparatus 40 of the first preferred embodiment and variants thereof is the utilization of the difference between an energy flux vector and an optical wavefront vector of an optical beam produced when propagating in a birefringent crystal, at angles either not orthogonal to or not parallel to the optical axis of the birefringent crystal, to compensate for the effects of different directions of wavefront propagation of non diffracted and diffracted beams in a acousto-optical apparatus. The difference between the energy flux vector and the optical wavefront vector produced by propagating in a birefringent crystal is known in the art as double refraction in birefringent crystals and is used for example as a means to spatially separate orthogonally polarized beams. A difference between optical wavefront vectors due to different directions of propagation of non-diffracted and diffracted beams in a acousto-optical apparatus is known in the art as a mechanism which separates the energy flux profiles and distorts the energy flux profiles across the wavefront of a beam generated by Bragg diffraction. However, the inventive combination of the difference between the energy flux vector and the optical wavefront vector produced by propagating in a birefringent crystal and of a difference between wavefront vectors due to different directions of propagation of non-diffracted and Bragg diffracted beams in the acousto-optical apparatus to effectively compensate one with the other is believed to be taught herein for the first time in the art.

Another unusual and inventive characteristic of acousto-optical apparatus 40 of the first preferred embodiment and variants thereof is the isolation of the laser source from a return beam comprised in part of non-frequency-shifted components of portions of the output beams of the inventive apparatus which are scattered and/or reflected back through the acousto-optical apparatus 40. The properties of an acousto-optical apparatus which incorporates non-normal Bragg diffraction are known in the art. However, the inventive combination of these properties for the transformation of an input beam into an output beam and subsequently the transformation of the return beam so as to effectively not couple to the modes of the laser source is believed to be taught herein for the first time in the art.

In accordance with a second preferred embodiment of the present invention, an acousto-optical apparatus is provided that is capable of transforming a single frequency beam comprised of two linearly-orthogonally polarized input beams into an output beam comprised of two principal and two spurious secondary output beams. The principal output beams are linearly-orthogonally polarized, preferably have the same directions of propagation, and preferably have coextensive energy flux profiles. The frequencies of the principal output beams are different one from the other and different from the frequency of the input beams. The intensities of the two principal output beams are substantially equal and the combined intensities of the principal output beams are substantially equal to the combined intensities of the input beams. In addition, thermal compensation is incorporated through the exploitation of the principles of symmetry and a pair of external birefringent prisms wherein the thermal compensation is with respect to the relative phase of the principal output beams.

Figure 2A:
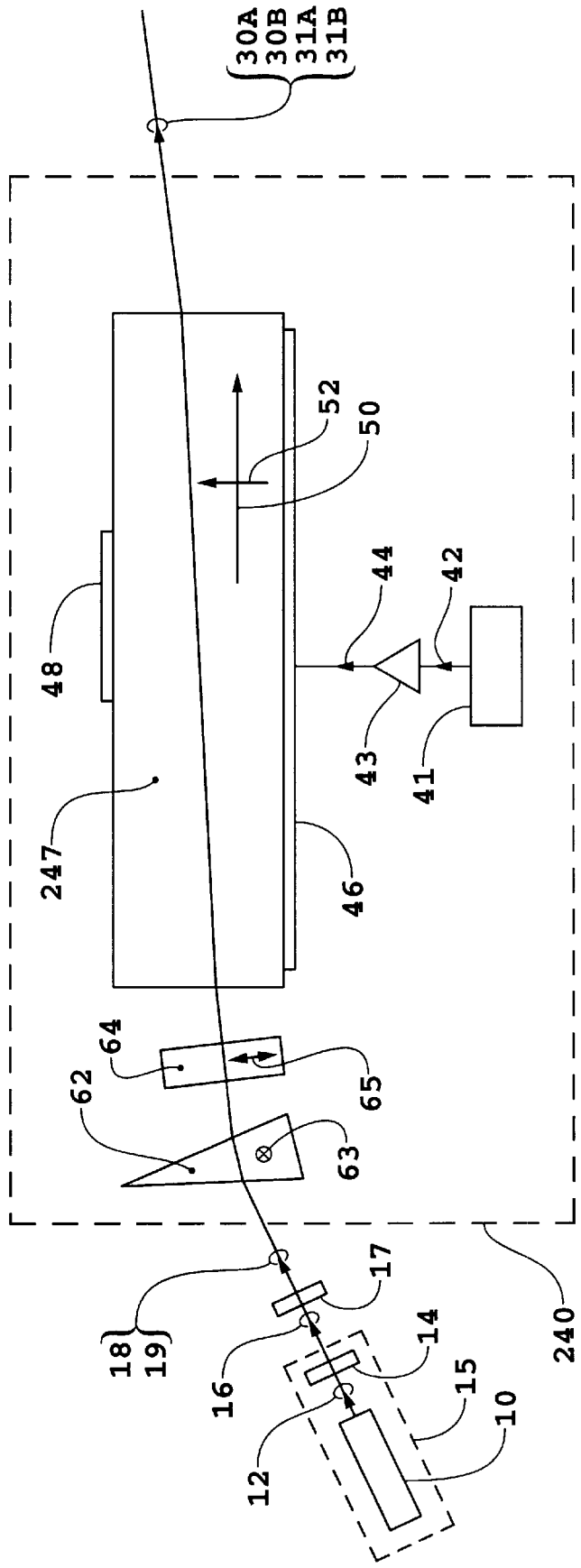
FIG. 2a–2b taken together illustrate, in diagrammatic form, the presently preferred second embodiment of the instant invention with FIG. 2a showing source 15 and the optical paths between source 15 and acousto-optical apparatus 240
Figure 2B:
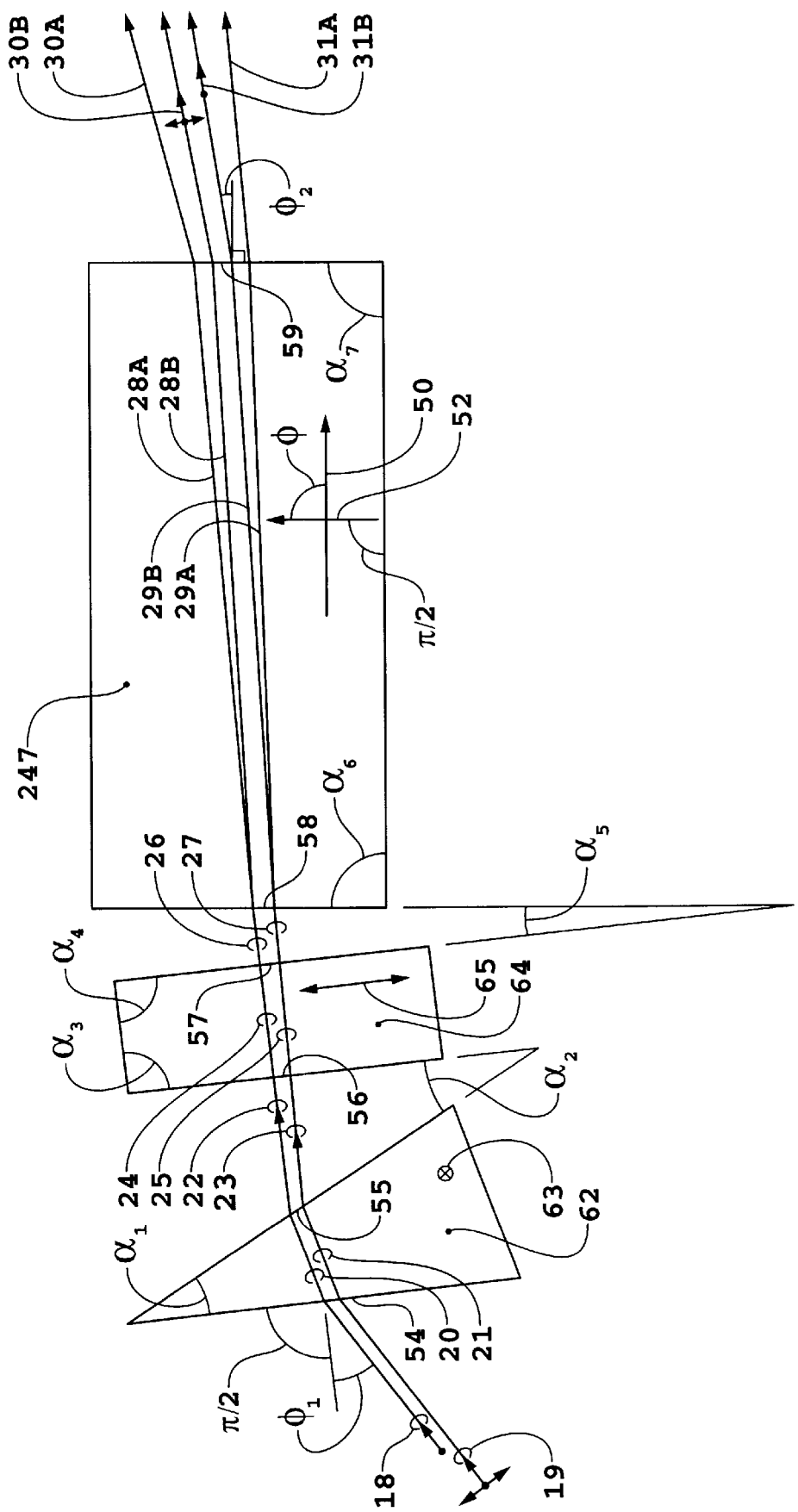

FIGS. 2a–2b depict in diagrammatic form the second embodiment of the present invention with similar elements of the second embodiment performing like operations as like denoted elements in the FIGS. 1a–1b of the first preferred embodiment. The source of beams 18 and 19 as shown in FIG. 2a are the elements in dashed box 15.

Beams 18 and 19 are incident on acousto-optical apparatus 240. The paths of beams in acousto-optical apparatus 240 originating from beams 18 and 19 are shown in FIG. 2b. The description of elements 41, 42, 43, 44, 46, and 48 of the second embodiment is the same as the description presented for like numbered elements of the first preferred embodiment.

The presently preferred acousto-optical crystal 247 of the second embodiment is made of a uniaxial crystal (e.g., $LiNbO_3$) having an optical axis 50 in the plane of FIG. 2b which makes an angle $\phi$ (c.f. FIG. 5) with the direction of propagation of the acoustic wave 52 generated by the piezoelectric transducer 46. The schematic illustrated in FIG. 2b is for a acousto-optical crystal 247 comprised of a negative uniaxial crystal.

Input beam 18, such as illustrated in FIG. 2b, preferably enters birefringent prism 62 at surface 54 with an angle of incidence $\phi_1$, becoming an extraordinarily polarized beam 20. The optical axis 63 of birefringent prism 62, preferably made of the same birefringent material as acousto-optical crystal 247, is parallel to the edge of prism 62 associated with apex angle $\alpha_1$ defined in FIG. 2b and perpendicular to the plane of FIGS. 2a and 2b. The function of birefringent prism 62 is to change the relative directions of propagation of orthogonally polarized beams such as used in commonly owned U.S. Pat. No. 4,684,828 in the name of G. Sommargren issued August 1987 for "Apparatus To Transform A Single Frequency, Linearly Polarized Laser Beam Into A Beam With Two, Orthogonally Polarized Frequencies", and incorporated herein by reference.

Beam 20 exits birefringent prism 62 at surface 55 becoming beam 22. Beam 22 enters birefringent truncated prism 64 at surface 56 becoming an ordinarily polarized beam 24. The angle $\alpha_2$ is the angle between the surfaces 55 and 56. The optical axis 65 of birefringent truncated prism 64, preferably made of the same birefringent material as acousto-optical crystal 247, is nominally perpendicular to the direction of propagation of beam 24 and parallel to the planes of FIGS. 2a and 2b. The edges corresponding to angles $\alpha_3$ and $\alpha_4$ of truncated prism 64 are orthogonal to the planes of FIGS. 2a and 2b. Beam 24 exits truncated prism 64 at surface 57 becoming beam 26.

Beam 26 enters acousto-optical crystal 247 at surface 58 (cf. FIG. 2b) becoming incident beam 28A, incident beam 28A being ordinarily polarized. Due to the photoelastic interaction of incident beam 28A with the acoustic wave 52, an extraordinarily polarized beam, diffracted beam 28B, is generated by small angle Bragg diffraction when Eqs. (1) and (2) are satisfied. The optical axis in acousto-optical crystal 247 is shown in FIG. 2b at 50.

Diffracted beam 28B propagates at a small angle to that of the non-diffracted incident beam 28A, the polarization of the diffracted beam 28B being orthogonal to that of incident beam 28A. In addition, the frequency of beam 28B is $f_L - f_0$ while the frequency of beam 28A is $f_L$. Beams 28A and 28B exit acousto-optical crystal 247 at surface 59 as beams 30A and 30B, respectively.

Input beam 19, such as illustrated in FIG. 2b, preferably enters the birefringent prism 62 at surface 54 with an angle of incidence $\phi_1$, becoming an ordinarily polarized beam 21. Beam 21 exits birefringent prism 62 at surface 55 as beam 23. Beam 23 enters truncated prism 64 at surface 56 becoming an extraordinarily polarized beam 25. Beam 25 exits truncated prism 64 at surface 57 becoming beam 27. Beam 27 enters acousto-optical crystal 247 at surface 58 becoming incident beam 29A, incident beam 29A being extraordinarily polarized.

Due to the photoelastic interaction of incident beam 29A with the acoustic beam 52, an ordinarily polarized beam, diffracted beam 29B, is generated by small angle Bragg diffraction when the relationships given by Eqs. (1) and (2) are satisfied.

Diffracted beam 29B propagates at a small angle to that of non-diffracted incident beam 29A, the polarization of diffracted beam 29B being orthogonal to that of incident beam 29A. In addition, the frequency of beam 29B is $f_L + f_0$ while the frequency of beam 29A is $f_L$. Beams 29A and 29B exit acousto-optical crystal 247 at surface 59 as beams 31A and 31B, respectively.

The respective angles of incidence and refraction for beams 18, 19, 20, and 21 at surface 54; the respective angles of incidence and refraction for beams 20, 21, 22, and 23 at surface 55; the respective angles of incidence and refraction for beams 22, 23, 24, and 25 at surface 56; the respective angles of incidence and refraction for beams 24, 25, 26, and 27 at surface 57; and the respective angles of incidence and refraction for beams 26, 27, 28A, 28B, 29A, and 29B at surface 58 are chosen such that the angle of deviation between beams 28B and 29B is $\epsilon - \delta$ where $\epsilon$ is some small angle, preferably $\epsilon \cong \delta$ for the second embodiment, the angle of deviation between beams 28A and 28B is $\delta$, the angle of deviation between beams 29A and 29B is $-\delta$, and the angle of deviation between beams 28A and 29A is $\delta + \epsilon$ where $\delta$ is specified by Eq. (4). The conditions with respect to relative directions of propagation of beams 28A, 28B, 29A, and 29B are obtained by choosing the angles $\alpha_1$, $\alpha_2$, $\alpha_3$, $\alpha_4$, and $\alpha_5$ defined in FIG. 2b to satisfy the equation $$\delta + \varepsilon = \sin^{-1}\left[\left[\frac{1}{n_o}\sin\left(\left(\alpha_5 - \sin^{-1}\left\{n_o\sin\left[\alpha_4 + \alpha_3 - \pi - \sin^{-1}\left(\frac{\sin\phi'_2}{n_o}\right)\right]\right\}\right)\right)\right]\right] - \sin^{-1}\left[\left[\frac{1}{n'_{5e}}\sin\left(\left(\alpha_5 - \sin^{-1}\left\{n_e\sin\left[\alpha_4 + \alpha_3 - \pi - \sin^{-1}\left(\frac{1}{n_e}\sin\phi''_2\right)\right]\right\}\right)\right)\right]\right], \quad (13)$$

$$\phi'_2 = \left(\alpha_2 - \sin^{-1}\left\{n_e\sin\left[\alpha_1 - \sin^{-1}\left(\frac{\sin\phi_1}{n_e}\right)\right]\right\}\right), \quad (14)$$

$$\phi''_2 = \left(\alpha_2 - \sin^{-1}\left\{n_o\sin\left[\alpha_1 - \sin^{-1}\left(\frac{\sin\phi_1}{n_o}\right)\right]\right\}\right), \quad (15)$$

where $n'_{5e}$ in the index of refraction for beam 29A at surface 58.

The treatment of the propagation of the beams after the photoelastic interaction region in the second embodiment is such that the respective angles of incidence and refraction for beams 28A, 28B, 29A, 29B, 30A, 30B, 31A, and 31B at surface 59 are chosen such that beams 30B and 31B preferably are parallel. Beams 30B and 31B are spatially displaced by a minute amount, preferably a small fraction of the beam diameters. The conditions with respect to the relative directions of propagation of beams 30B and 31B are obtained by choosing the orientation of surface 59 such that $$\varepsilon - \delta = \sin^{-1}\left(\frac{\sin\phi_2}{n'_{1e}}\right) - \sin^{-1}\left(\frac{\sin\phi_2}{n_o}\right) \quad (16)$$

where $n'_{1e}$ is the index of refraction for beam 28B at surface 59. When it is desired to have beams 30B and 31B be not parallel, i.e. $\phi_2$ for beam 30B not the same as $\phi_2$ for beam 31B, then the values of the parameters of Eqs. (13), (14), (15), and (16) may be chosen so that beams 30B and 31B have a predetermined angle of divergence or convergence between them. Also, it is clear that when it is desired to have the beams 18 and 19 be not parallel, i.e. $\phi_1$ for beam 18 not be the same as $\phi_1$ for beam 19, then the values of the parameters of Eqs. (13), (14), (15), and (16) may also be chosen so that beams 18 and 19 have a predetermined angle of divergence or convergence between them.

Beams 30A and 31A are spurious secondary output beams, and beams 30B and 31B comprise principal output beams. The spatial displacements between the energy flux profiles of beams 30A, 30B, 31A, and 31B preferably are only small fractions of the beam diameters. If desired, however, it is clear that principal output beams 30B and 31B may be separated or partially separated, for example, through the separation or partial separation, respectively, of input beams 18 and 19. For purposes of illustration, these displacements are shown greatly exaggerated in FIG. 2b.

Three objectives in the design of the acousto-optical crystal 247 are to select the orientations for faces 54, 55, 56, 57, 58, and 59 so that Eqs. (13), (14), (15), and (16) are satisfied; to produce an acousto-optical apparatus which is temperature compensated with respect to temperature induced phase shifts between principal output beams 30B and 31B relative to the phase of the acoustic beam; and to effectively isolate laser beam source 15 with respect to coupling between the laser beam source 15 and return beams, the return beams being backscattered and/or reflected portions of beams 30A, 30B, 31A, and 31B passing back through the inventive apparatus and entering laser beam source 15. For the configuration of acousto-optical crystal 247 shown in FIG. 2b, the design parameters relevant to the three cited objectives are highly decoupled: the conditions expressed by Eqs. (13), (14), (15), and (16) are satisfied primarily through the adjustment of one set of parameters, the angles $\alpha_i$, i=1, . . . ,5; the conditions required for the temperature compensation are satisfied primarily through the adjustment of a second set of independent parameters, the thickness of prism 62 relative to the thickness of truncated prism 64, and the application of principals of symmetry; and the condition required for isolation of the laser source 15 met through adjustment of the acoustic power generated by the piezoelectric transducer 46. This feature with respect to decoupling the adjustments used to obtain the three cited primary objectives makes for a robust design of an acousto-optical apparatus amenable to production and to use in non laboratory environments.

Temperature induced changes between optical path lengths of ordinarily and extraordinarily polarized beams, beams which are progenitors of the principal output beams 30B and 31B in birefringent acousto-optical apparatus 40, are compensated wherein optical path configurations in the birefringent acousto-optical apparatus 40 are designed by way of application of principals of symmetry. The principals of symmetry as applied in the second embodiment are accommodated by arranging the optical axes of prisms 62 and 64 to be orthogonal and by prisms 62 and 64 having substantially the same thickness at the optical beam path locations, the two progenitors of principal output beam 30B in prisms 62 and 64 being extraordinarily and ordinarily polarized, respectively, and the two progenitors of principal output beam 31B in prisms 62 and 64 being ordinarily and extraordinarily polarized, respectively.

Also in the second embodiment, the change with temperature in the speed of the acoustic beam in the acousto-optical crystal 247, if not compensated, will give rise to a temperature induced change in the phase between principal output beams 30B and 31B relative to the phase of the acoustic beam of the order of 0.02 rad/ (deg C.). This is compensated in the second embodiment by adjusting the thickness of prism 62 relative to the thickness of truncated prism 64, consistent with the temperature compensation of prism 62 by prism 64 as seen by principal output beams 30B and 31B, so as to use the temperature induced change in $(n_e - n_o)$ to compensate for the phase shift between principal output beams 30B and 31B relative to the phase of the acoustic beam caused by a temperature induced change in the speed of the acoustic beam.

The remainder of the description for the second embodiment depicted in FIGS. 2a–2b is substantially the same as corresponding portions of the description for the first preferred embodiment illustrated in FIGS. 1a–1e.

Figure 2C:
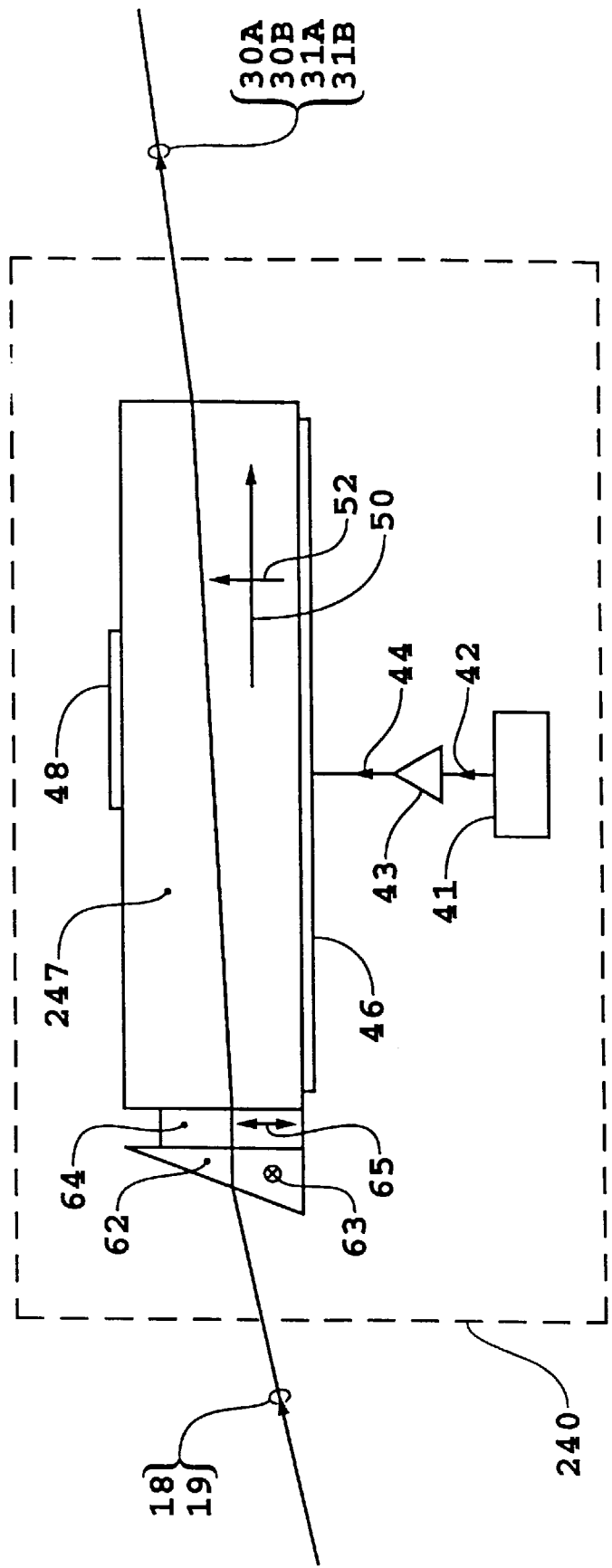
FIG. 2c illustrates, in diagrammatic form, acousto-optical apparatus 240 and the paths of the optical beams through apparatus 240 for the presently preferred first variant of the second embodiment of the instant invention.

It will be appreciated by those skilled in the art that prism 62 may be affixed to truncated prism 64 and/or truncated prism 64 may be affixed to acousto-optical crystal 247 without departing from the spirit and the scope of the second embodiment. A first variant of the second preferred embodiment is depicted in FIG. 2c wherein prism 62 is affixed to truncated prism 64 and truncated prism 64 is affixed to acousto-optical crystal 247. The temperature compensation in the second embodiment and in the first variant of the second embodiment for temperature induced phase shifts between principal output beams 30B and 31B relative to the phase of the acoustic beam requires that the acousto-optical crystal 247, prism 62, and truncated prism 64 be maintained at substantially the same temperature. This requirement is more easily met in the first variant of the second embodiment where elements 62, 64, and 247 are thermally coupled by way of element 62 being affixed to element 64 and element 64 being affixed to element 247.

The remainder of the description for the first variant of the second embodiment is substantially the same as corresponding portions of the description for the second preferred embodiment illustrated in FIGS. 2a–2b.

Figure 2D:
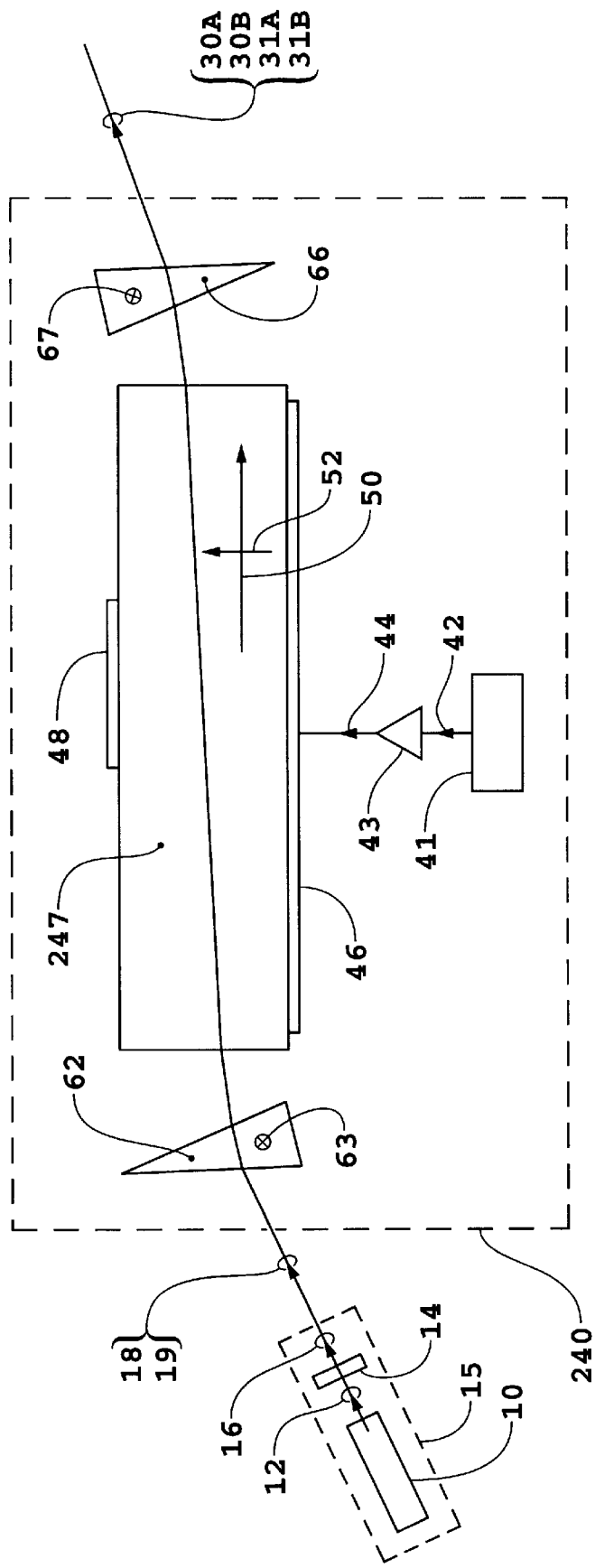
FIGS. 2d–2e taken together illustrate, in diagrammatic form, the presently preferred second variant of the second embodiment of the instant invention with FIG. 2d showing source 15 and the optical paths between source 15 and acousto-optical apparatus 240.
Figure 2E:
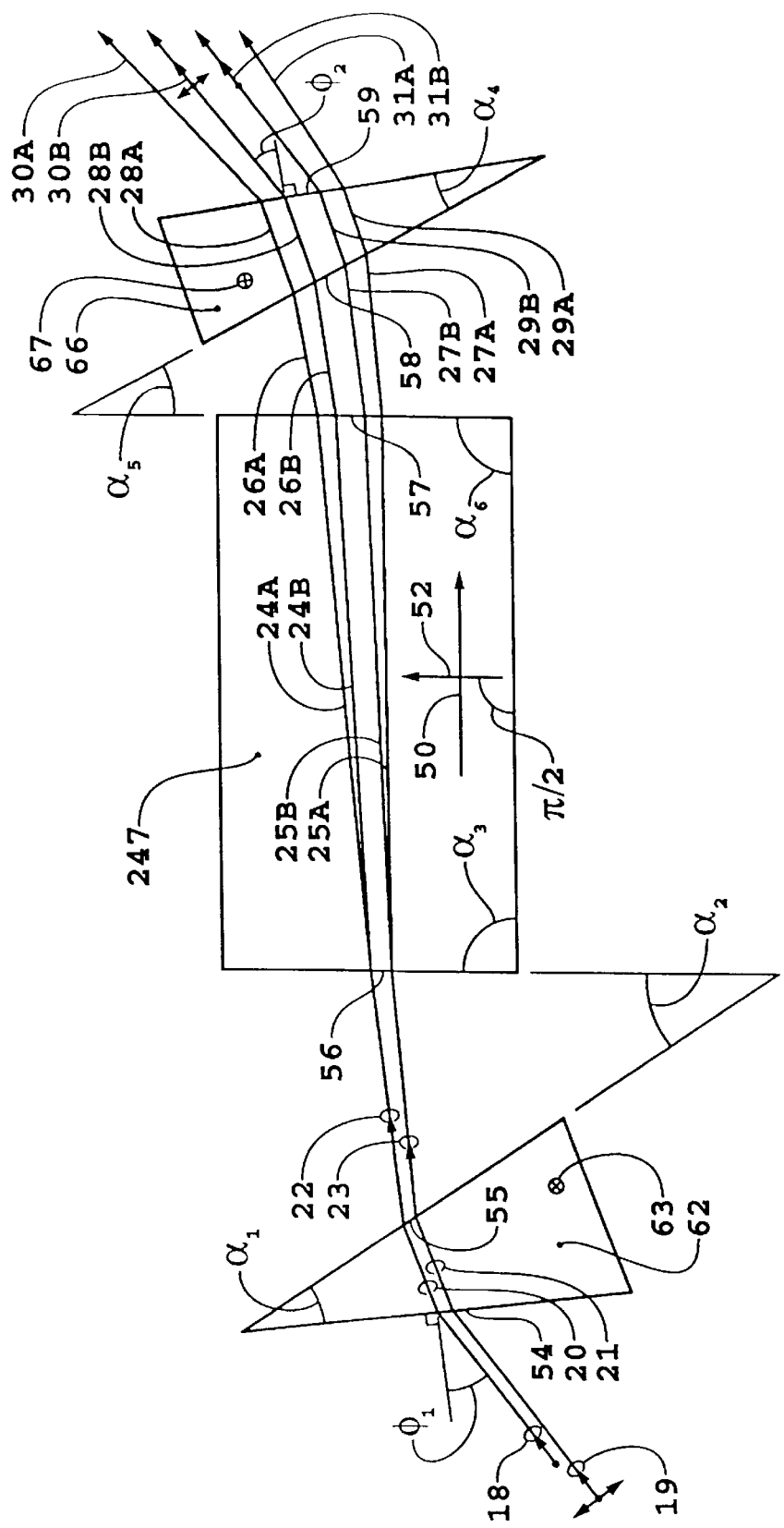

FIGS. 2d–2e show in diagrammatic form a second variant of the second preferred embodiment. As shown in FIGS. 2d–2e, the second variant of the second embodiment comprises the same elements as the second embodiment except for the omission of truncated prism 64 of the second embodiment and the addition of prism 66, similar elements of the second variant of the second embodiment performing like operations as like denoted elements in the second embodiment depicted in FIGS. 2a–2b.

Input beam 18, such as illustrated in FIG. 2e, preferably enters birefringent prism 62 at surface 54 with an angle of incidence $\phi_1$, becoming an extraordinarily polarized beam 20. Beam 20 exits birefringent prism 62 at surface 55 becoming beam 22. Beam 22 enters acousto-optical crystal 247 at surface 56 becoming incident beam 24A, incident beam 24A being ordinarily polarized.

Due to the photoelastic interaction of incident beam 24A with the acoustic wave 52, an extraordinarily polarized beam, diffracted beam 24B, is generated by small angle Bragg diffraction when Eqs. (1) and (2) are satisfied.

Diffracted beam 24B propagates at a small angle to that of the non-diffracted incident beam 24A, the polarization of the diffracted beam 24B being orthogonal to that of incident beam 24A. In addition, the frequency of beam 24B is $f_L - f_0$ while the frequency of beam 24A is $f_L$.

Beams 24A and 24B exit acousto-optical crystal 247 at surface 57 as beams 26A and 26B, respectively. Beams 26A and 26B enter prism 66 at surface 58 becoming an extraordinarily and ordinarily polarized beams 28A and 28B, respectively. The optical axis of prism 67 of birefringent prism 66, preferably made of the same birefringent material as acousto-optical crystal 247, is parallel to the edge of prism 66 with apex angle $\alpha_4$ and perpendicular to the planes of FIGS. 2d and 2e. Beams 28A and 28B exit prism 66 at surface 59 becoming beams 30A and 30B, respectively.

Input beam 19, such as illustrated in FIG. 2e, preferably enters the birefringent prism 62 at surface 54 with an angle of incidence $\phi_1$, becoming an ordinarily polarized beam 21. Beam 21 exits birefringent prism 62 at surface 55 as beam 23. Beam 23 enters acousto-optical crystal 247 at surface 56 becoming incident beam 25A, incident beam 25A being extraordinarily polarized. Due to the photoelastic interaction of incident beam 25A with the acoustic beam 52, an ordinarily polarized beam, diffracted beam 25B, is generated by small angle Bragg diffraction when the relationships given by Eqs. (1) and (2) are satisfied.

Diffracted beam 25B propagates at a small angle to that of non-diffracted incident beam 25A, the polarization of diffracted beam 25B being orthogonal to that of incident beam 25A. In addition, the frequency of beam 25B is $f_L + f_0$ while the frequency of beam 25A is $f_L$.

Beams 25A and 25B exit acousto-optical crystal 247 at surface 57 as beams 27A and 27B, respectively. Beams 27A and 27B enter prism 66 at surface 58 becoming an ordinarily and extraordinarily polarized beams 29A and 29B, respectively. Beams 29A and 29B exit prism 66 at surface 59 becoming beams 31A and 31B, respectively.

The respective angles of incidence and refraction for beams 18, 19, 20, and 21 at surface 54; the respective angles of incidence and refraction for beams 20, 21, 22, and 23 at surface 55; and the respective angles of incidence and refraction for beams 22, 23, 24A, 24B, 25A, and 25B at surface 56 are chosen such that the angle of deviation between beams 24B and 25B is $\epsilon-\delta$ where $\epsilon$ is some small angle, preferably $0 \leq \epsilon \cong \delta$, for the second variant of the second embodiment, the angle of deviation between beams 24A and 24B is $\delta$, the angle of deviation between beams 25A and 25B is $-\delta$, and the angle of deviation between beams 24A and 25A is $\delta+\epsilon$ where $\delta$ is specified by Eq. (4). The conditions with respect to relative directions of propagation of beams 24A, 24B, 25A, and 25B are obtained by choosing the angles $\alpha_1$ and $\alpha_2$, defined in FIG. 2e to satisfy the equation $$\delta + \varepsilon = \sin^{-1}\left[\left[\frac{1}{n_o}\sin\left(\left(\alpha_2 - \sin^{-1}\left\{n_e\sin\left[\alpha_1 - \sin^{-1}\left(\frac{\sin\phi_1}{n_e}\right)\right]\right\}\right)\right)\right]\right] - \quad (17)$$

$$\sin^{-1}\left[\left[\frac{1}{n'_{3e}}\sin\left(\left(\alpha_2 - \sin^{-1}\left\{n_o\sin\left[\alpha_1 - \sin^{-1}\left(\frac{1}{n_o}\sin\right)\right]\right\}\right)\right)\right]\right],$$

where $n'_{3e}$ is the index of refraction for beam 24B at surface 56.

The treatment of the propagation of the beams after the photoelastic interaction region in the second embodiment is such that the respective angles of incidence and refraction for beams 24A, 24B, 25A, 25B, 26A, 26B, 27A, and 27B at surface 57; the respective angles of incidence and refraction for beams 26A, 26B, 27A, 27B, 28A, 28B, 29A, and 29B at surface 58; and the respective angles of incidence and refraction for beams 28A, 28B, 29A, 29B, 30A, 30B, 31A, and 31B at surface 59 are chosen such that beams 30B and 31B preferably are parallel. The energy flux profiles of beams 30B and 31B are spatially displaced by a minute amount, preferably a fraction of the beam diameters. The conditions with respect to the relative directions of propagation of beams 31B and 30B are obtained by choosing the apex angles $\alpha_4$ and $\alpha_5$ such that $$\delta - \varepsilon = \sin^{-1}\left[\left[\frac{1}{n_o}\sin\left(\left(\alpha_5 - \sin^{-1}\left\{n_e\sin\left[\alpha_4 - \sin^{-1}\left(\frac{\sin\phi_2}{n_e}\right)\right]\right\}\right)\right)\right]\right] - \quad (18)$$

$$\sin^{-1}\left[\left[\frac{1}{n'_{6e}}\sin\left(\left(\alpha_5 - \sin^{-1}\left\{n_o\sin\left[\alpha_4 - \sin^{-1}\left(\frac{\sin\phi_2}{n_o}\right)\right]\right\}\right)\right)\right]\right]$$

where $n'_{6e} = n'_{3e}$ is the index of refraction for beam 24B at surface 57. Also, when it is desired to have beams 30B and 31B be not parallel, i.e. $\phi_2$ for beam 30B not the same as $\phi_2$ for beam 31B, then the values of the parameters of Eqs. (17) and (18) may be chosen so that beams 30B and 31B have a predetermined angle of divergence or convergence between them. It is further clear that if when is desired to have beams 18 and 19 be not parallel, i.e. $\phi_1$ for beam 18 not be the same as $\phi_1$ for beam 19, then the values of the parameters of Eqs. (17) and (18) may also be chosen so that beams 18 and 19 have a predetermined angle of divergence or convergence between them.

Beams 30A and 31A are spurious secondary output beams, and beams 30B and 31B comprise principal output beams. The spatial displacements between the energy flux profiles of beams 30A, 30B, 31A, and 31B preferably are only small fractions of the beam diameters. If desired, however, it is clear that principal output beams 30B and 31B may be separated or partially separated, for example, through the separation or partial separation, respectively, of input beams 18 and 19. For purposes of illustration, these displacements are shown greatly exaggerated in FIG. 2e.

Temperature induced changes between optical path lengths of ordinarily and extraordinarily polarized beams, beams which are progenitors of the principal output beams 30B and 31B in birefringent acousto-optical apparatus 240, are compensated in the second variant of the second embodiment wherein optical path configurations in the birefringent acousto-optical apparatus 240 are designed by way of application of principals of symmetry. The principals of symmetry as applied in the second variant of the second embodiment are accommodated by optical axes of prisms 62 and 66 having parallel orientations, prisms 62 and 66 having substantially the same thickness at the optical beam path locations, the two progenitors of principal output beam 30B being extraordinarily and ordinarily polarized in prisms 62 and 66, respectively, and the two progenitors of principal output beam 31B being ordinarily and extraordinarily polarized in prisms 62 and 66, respectively.

Also in the second variant of the second embodiment, the change with temperature in the speed of the acoustic beam in the acousto-optical crystal 247, if not compensated, will give rise to a temperature induced change in the phase between principal output beams 30B and 31B relative to the phase of the acoustic beam of the order of 0.02 rad/(deg C.). This is compensated in the second variant of the second embodiment by adjusting the thickness of prism 62 relative to the thickness of prism 66, consistent with the temperature compensation of prism 62 by prism 66 as seen by principal output beams 30B and 31B, so as to use the temperature induced change in $(n_e-n_o)$ to compensate for the phase shift between principal output beams 30B and 31B relative to the phase of the acoustic beam caused by a temperature induced change in the speed of the acoustic beam.

The remainder of the description for the second variant of the second embodiment depicted in FIGS. 2d–2e is substantially the same as the corresponding portion of the description for the second preferred embodiment illustrated in FIGS. 2a–2b.

The temperature compensation in the second variant of the second embodiment for temperature induced phase shifts between principal output beams 30B and 31B relative to the phase of the acoustic beam requires that the acousto-optical crystal 247, prism 62, and prism 66 be maintained at substantially the same temperature. This requirement is more easily met in a third variant of the second embodiment wherein the elements 62, 66, and 247 are thermally coupled by way of elements 62 and 66 being affixed to element 247.

Figure 2F:
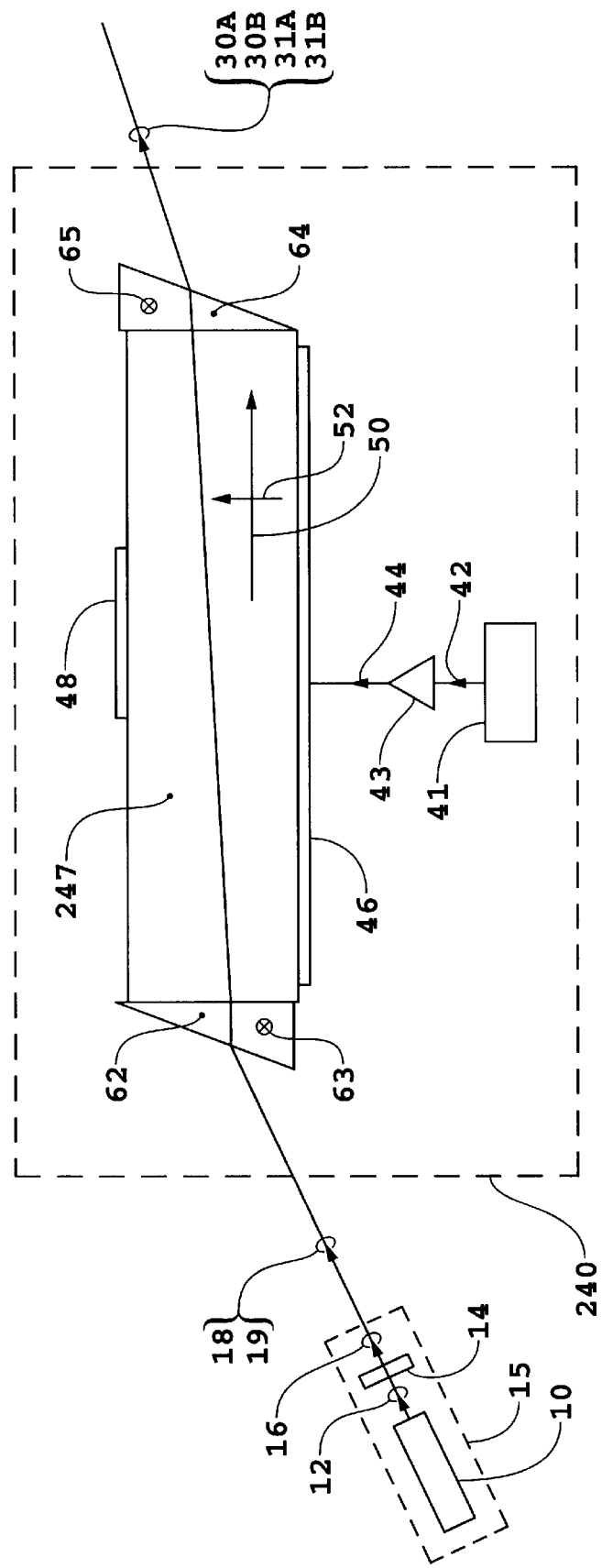
FIG. 2f illustrates, in diagrammatic form, the presently preferred third variant of the second embodiment of the instant invention with FIG. 2f showing source 15 and the optical paths between source 15 and acousto-optical apparatus 240.

A third variant of the second preferred embodiment is depicted in FIG. 2f where prism 62 and prism 66 are affixed to acousto-optical crystal 247, similar elements of the third variant of the second embodiment performing like operations as like denoted elements in the second variant of the second embodiment depicted in FIGS. 2d–2e. The remainder of the description for the third variant of the second embodiment is substantially the same as corresponding portions of the description for the second variant of the second embodiment illustrated in FIGS. 2d–2e.

Figure 3:
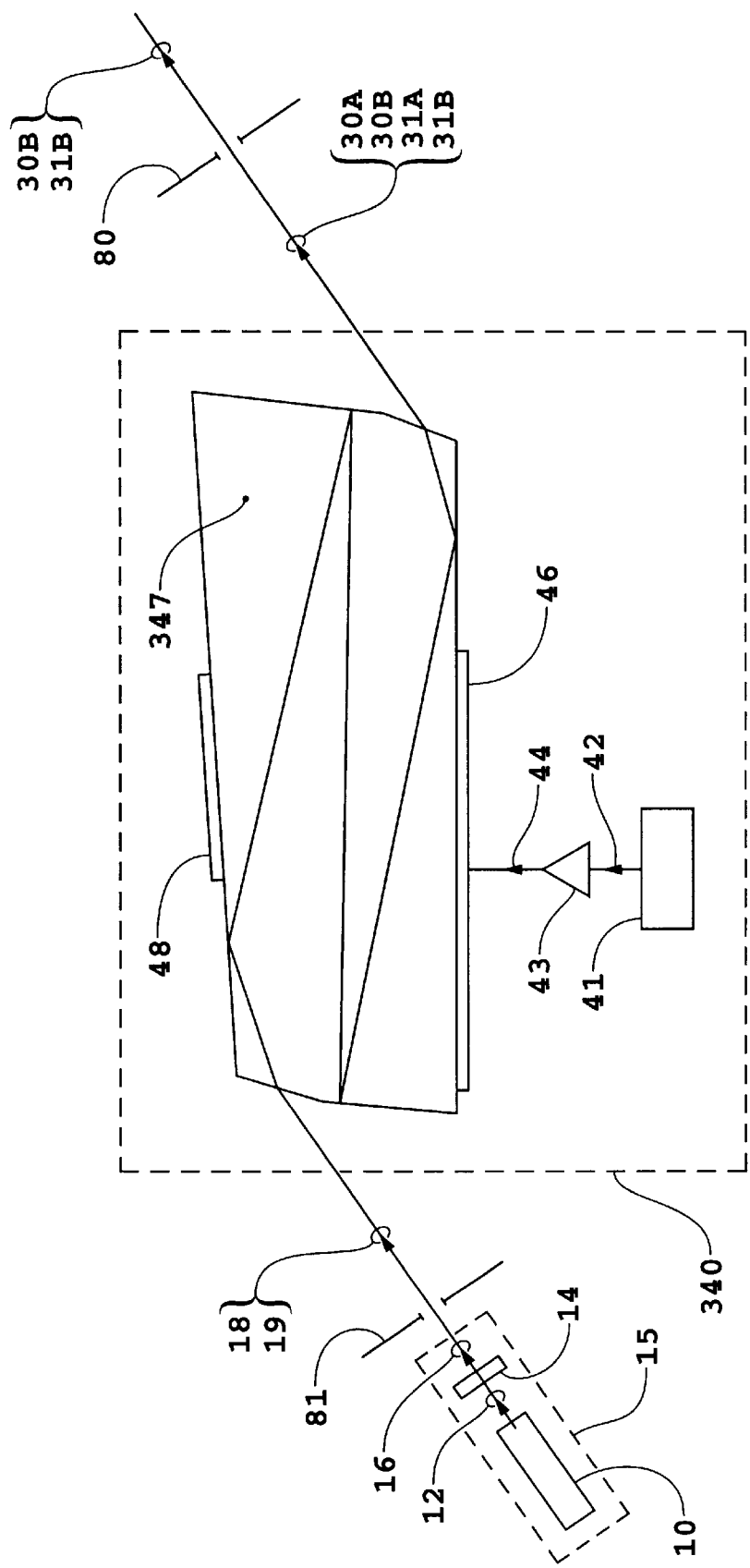
FIG. 3 illustrates, in diagrammatic form, the presently preferred third embodiment of the instant invention showing source 15 and the optical paths between source 15, acousto-optical apparatus 340, and opaque stops 80 and 81.

FIG. 3 shows in diagrammatic form a third preferred embodiment of the present invention. As shown in FIG. 3, the third embodiment comprises the same elements as the first preferred embodiment except for the addition of a spatial filters 80 and 81. Like reference numerals are used in FIG. 3 for like elements previously described with reference to FIGS. 1a–1c. The third embodiment employs an acousto-optical apparatus 340, similar to 40 of the first embodiment, in a mode of operation which supports the use of spatial filtering to discriminate against secondary beams so that they are not deleterious to downstream applications or to the laser source.

By way of example, beams 30A and 31A are spurious secondary output beams which are orthogonally polarized with frequencies the same as the frequency of beam 16. The directions of propagation of beams 30A and 31A deviate from the direction of propagation of the principal output beams 30B and 31B by approximately $n_o\epsilon$ and $-n_o\epsilon$, respectively. The intensities of beams 30A and 31A preferably have nominal values of 0% of the intensities of beams 30B and 31B, respectively, a consequence of the adjustment of the electrical output 44 of the power amplifier 43 so that intensity of either principal output beam 30B relative to the intensity of the input beam 18 or principal output beam 31B relative to the intensity of the input beam 19 is some preselected nominal value between 0% and 100%, preferably 100%.

Secondary output beams 30A and 31A, having directions of propagation different from principal output beams 30B and 31B, are eliminated in the third embodiment by opaque stop 80. The function of blocking secondary output beams 30A and 31A could, alternatively, be performed using a conventional pinhole spatial filter arrangement. In summary, the elimination of the secondary output beams 30A and 31A is achieved by two independent mechanisms operating concurrently in the third embodiment: the isolation mechanism described for the first preferred embodiment based on reduction in intensity in transmission through the acousto-optical crystal 47 and the isolation mechanism described for the third preferred embodiment based on spatial filtering.

The remainder of the description for the third embodiment depicted in FIG. 3 is substantially the same as corresponding portions of the description for the first embodiment illustrated in of FIGS. 1a–1c.

A spatial filter 81 may also be used in the third embodiment in a mode of operation which supports the use spatial filtering to increase the isolation of laser beam source 15 with respect to return beams, the return beams being back-scattered and/or reflected portions of the principal output beams 30B and 31B and secondary output beams 30A and 31A passing back through the inventive apparatus and entering laser beam source 15.

The acousto-optical apparatus 340 in this mode of operation transforms the components of the return beam in a manner analogous to the transformations experienced by input beams 18 and 19 except for the direction of frequency shifts which are reversed (cf. R. W. Dixon, ibid.). Consequently, the primary components of the return beam that emerge from the acousto-optical apparatus 340 in a direction opposite to and substantially parallel to input beams 18 and 19 will be frequency shifted with respect to the frequency of source 10 by either $\pm f_0$ or $\pm 2f_0$ depending on the progenitors of the respective components of the return beam and on the direction of propagation of the respective components of the return beam on entering the acousto-optical apparatus 340. The spatial filter 81 eliminates the portion of the primary return beam components that are frequency-shifted by $\pm f_0$ and $\pm 2f_0$ and have directions of propagation different from the reverse direction of propagation of beam 16. The spatial filter 81 will also eliminate the portion of a secondary return beam component that is not frequency-shifted by $\pm f_0$ and $\pm 2f_0$ and has a direction of propagation different from the reverse direction of propagation of beam 16. The secondary return beam component has substantially reduced intensity as described in corresponding portion of description for the first preferred embodiment. In summary, the isolation of laser beam source 15 is achieved by two independent mechanisms operating concurrently in the fifth embodiment: the isolation mechanism described for the first embodiment based on reduction in intensity in transmission through the acousto-optical crystal 47 and the isolation mechanism described for the fifth embodiment based on spatial filtering.

The remainder of the description for the third embodiment depicted in FIG. 3 is substantially the same as the corresponding portions of the description for the first embodiment illustrated in FIGS. 1a–1c.

It will be apparent to those skilled in the art that the spatial filtering described in connection with the third embodiment may be employed simultaneously or separately at either the input or output ends of the acousto-optical apparatus without departing from the spirit and the scope of the invention.

In accordance with the fourth preferred embodiment of the present invention, an acousto-optical apparatus is provided that is capable of transforming a single frequency beam comprised of two linearly-orthogonally polarized input beams into an output beam comprised of two principal and two spurious secondary output beams. The transformation by the acousto-optical apparatus has improved diffraction efficiency with respect to power of an acoustic beam through exploitation of multiple passes of optical beams through the acousto-optical interaction region of the acousto-optical apparatus. The principal output beams are linearly-orthogonally polarized, preferably have the same directions of propagation, and preferably have coextensive energy flux profiles. The frequencies of the principal output beams are different one from the other and different from the frequency of the input beams. The intensities of the principal output beams are substantially equal and the combined intensities of the principal output beams is substantially equal to the combined intensities of the input beams. In addition, thermal compensation is incorporated through the exploitation of the principles of symmetry and a series of internal reflections in the acousto-optical apparatus wherein the thermal compensation is with respect to the relative phase of the output beam components.

Figure 4A:
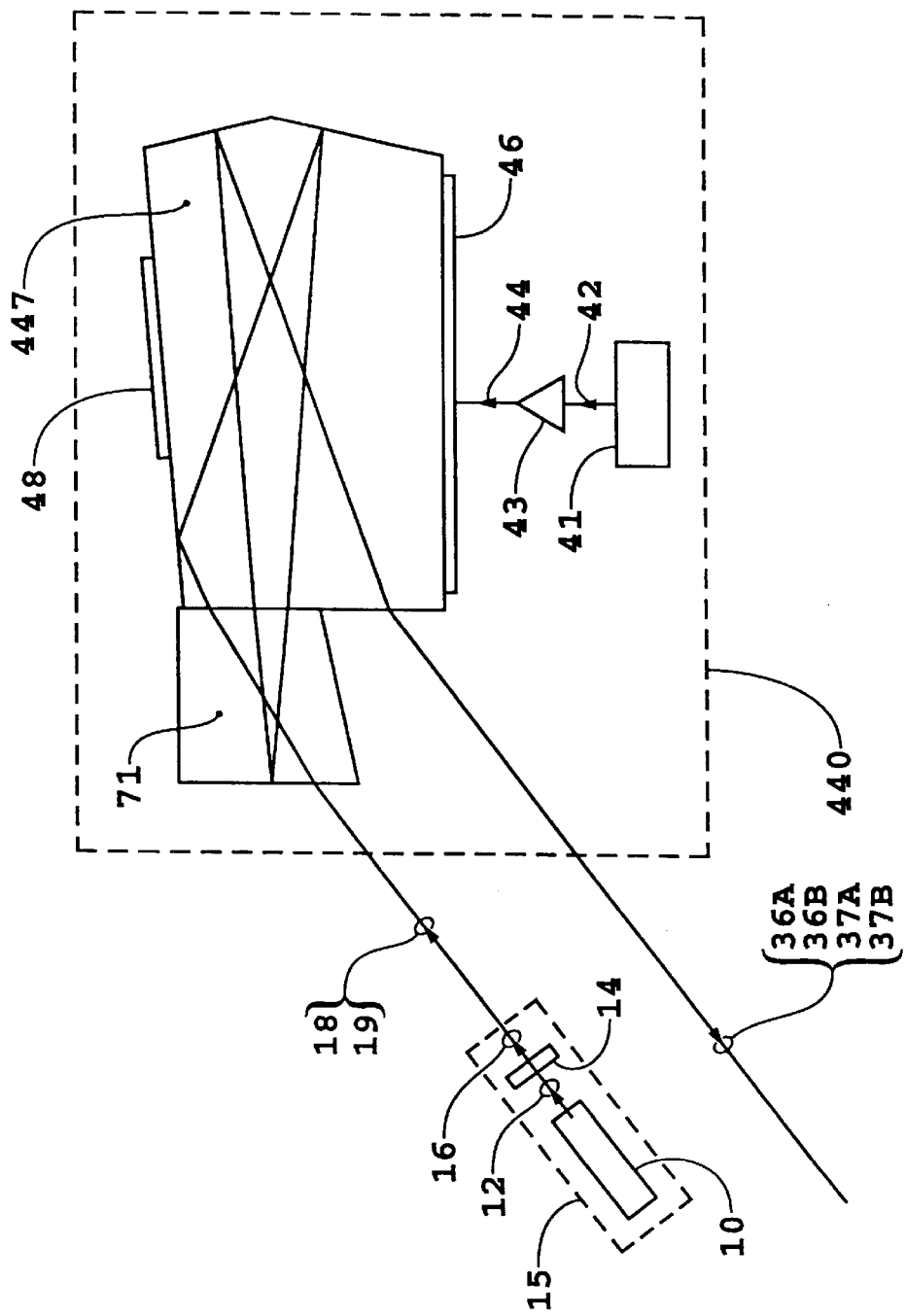
FIGS. 4a–4c illustrate, in diagrammatic form, the presently preferred fourth embodiment of the instant invention with FIG. 4a showing source 15 and the optical paths between source 15 and acousto-optical apparatus 440.
Figure 4B:
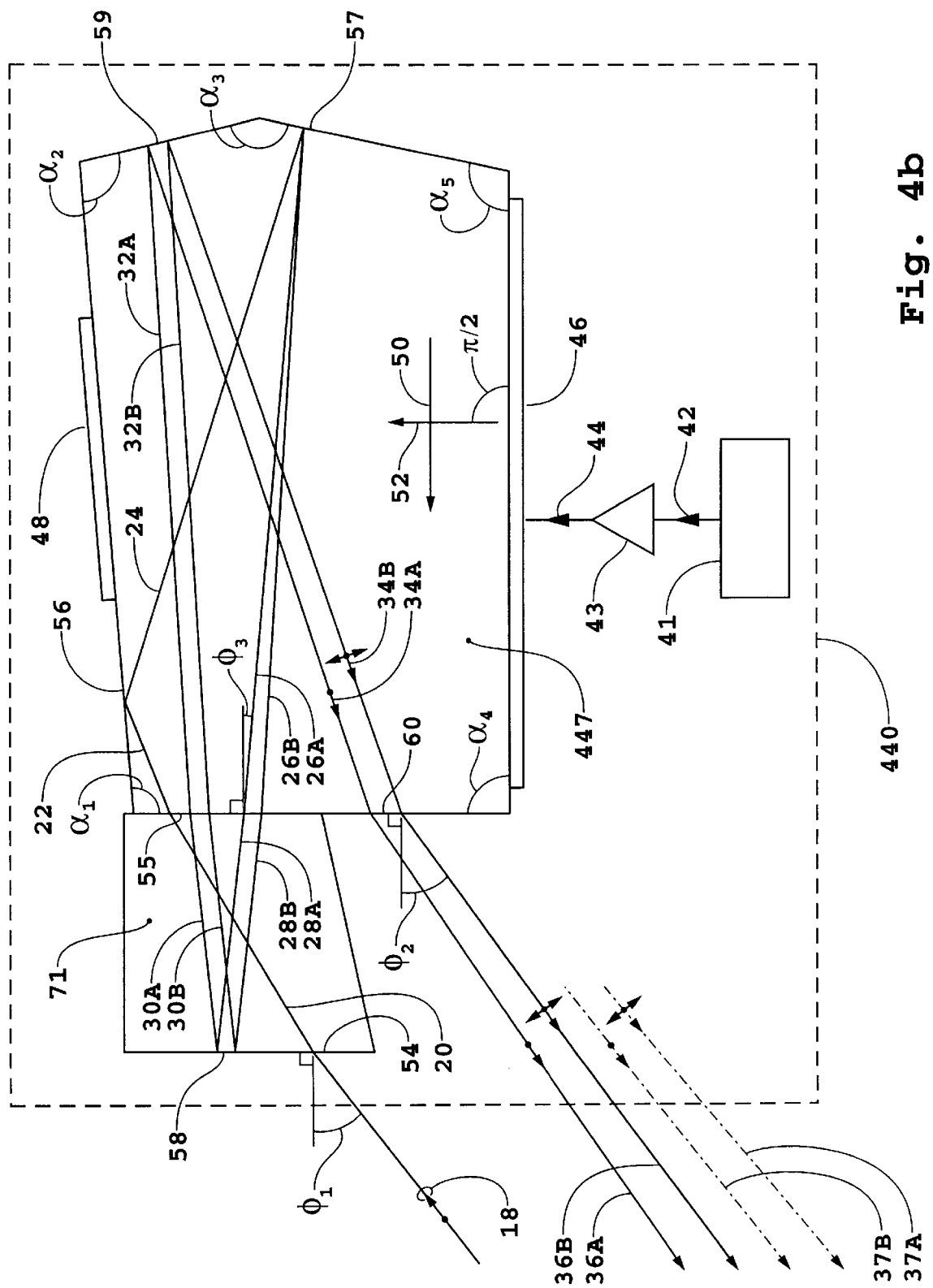
Figure 4C:
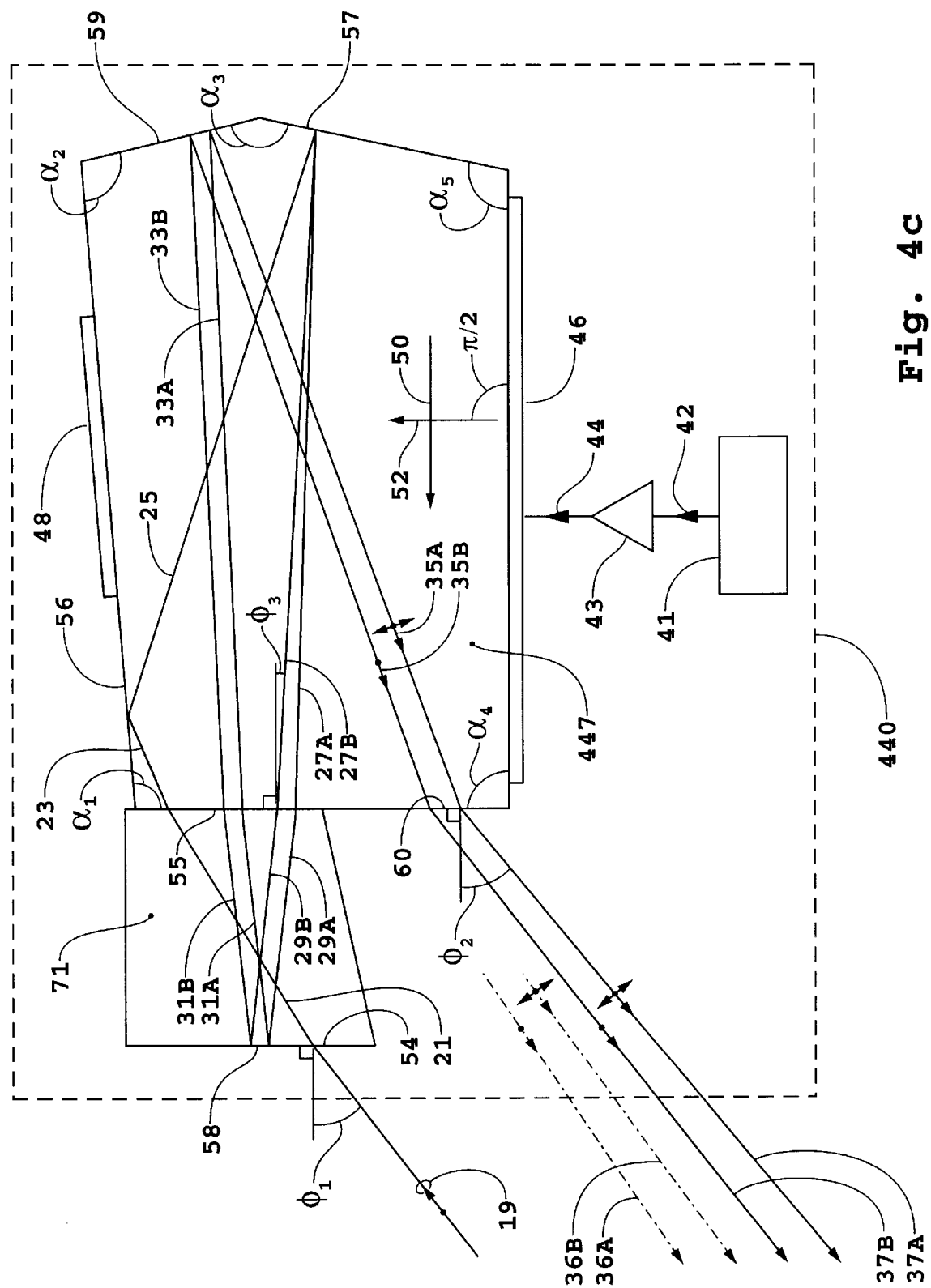

FIGS. 4a–4c depict in diagammatic form the fourth embodiment of the present invention. The fourth embodiment incorporates a double pass of the optical beams through the acousto-optical interaction region in a acousto-optical apparatus to improve diffraction efficiency of the acousto-optical apparatus with respect to the power of an acoustic beam.

The source of input beams 18 and 19 as shown in FIG. 4a comprises the elements in dashed box 15 which are the same as described for dashed box 15 in FIG. 1a of the first preferred embodiment. Like reference numerals are used in FIGS. 4a–4c for similar elements previously described with reference to FIGS. 1a–1b. Beams 18 and 19 are incident on acousto-optical apparatus 440. The paths of beams in acousto-optical apparatus 440 originating from beams 18 and 19 are shown in FIGS. 4b and 4c, respectively. The descriptions of elements 41, 42, 43, 44, 46, and 48 of the fourth embodiment, shown in FIGS. 4b and 4c, are the same as the description presented for like numbered elements of the first embodiment shown in FIG. 1b.

The presently preferred acousto-optical crystal 447 of the fourth embodiment is made of a uniaxial crystal (e.g., $LiNbO_3$) having an optical axis 50 in the plane of FIGS. 4b and 4c which makes an angle φ (c.f. FIG. 5) with the direction of propagation 52 of the acoustic beam generated by the piezoelectric transducer 46. The diagrammatic illustration in FIGS. 4b and 4c is for an acousto-optical crystal 447 comprised of a negative uniaxial crystal.

Input beam 18, such as illustrated in FIG. 4b, enters optical element 71, preferably a non-birefringent optical material, at surface 54 becoming beam 20. Beam 20 exits optical element 71 and enters acousto-optical crystal 447 at surface 55 becoming an ordinarily polarized beam 22. Beam 22 is reflected by surface 56 becoming an ordinarily polarized beam 24. Beam 24 is reflected by surface 57 becoming ordinarily polarized incident beam 26A. Due to the photoelastic interaction of incident beam 26A with the acoustic beam 52 (cf. R. W. Dixon, ibid.; A. Yariv and P. Yeh, ibid.), an extraordinarily polarized beam, diffracted beam 26B, is generated by small angle Bragg diffraction when the relationships given by Eqs. (1) and (2) are satisfied.

Diffracted beam 26B propagates at a small angle to that of the non-diffracted incident beam 26A, the polarization of diffracted beam 26B being orthogonal to that of incident beam 26A. In addition, the frequency of beam 26B is $f_L - f_0$ while the frequency of beam 26A is $f_L$.

Beams 26A and 26B exit acousto-optical crystal 447 at surface 55 and enter optical element 71 as beams 28A and 28B, respectively. Beams 28A and 28B represent the results of a first pass through acousto-optical crystal 447 wherein the conditions expressed by Eqs. (1) and (2) are satisfied.

Beams 28A and 28B are reflected by surface 58 of optical element 71 as beams 30A and 30B, respectively. Beams 30A and 30B exit optical element 71 and enter acousto-optical crystal 447 at surface 55 as beams 32A and 32B, respectively. Due to the photoelastic interaction of beams 32A and 32B with the acoustic beam 52, i.e. small angle Bragg diffraction, the relative amplitudes of beams 32A and 32B are transformed in transit through acousto-optical crystal 447 when the relationships given by Eqs. (1) and (2) are satisfied.

Upon reflection at surface 58, beams 28A and 28B suffer a relative phase shift, a first phase shift of π radians. The first π phase shift occurs in beams 28A and 28B without a corresponding π phase shift being introduced in the phase of the acoustic beam after the photoelastic interaction. This type of phase shift will be referenced as a relative acousto-optical phase shift between two optical beams relative to the phase of the acoustic beam. To understand the impact of the first π phase shift, consider, for example, the simple case of the surfaces 55 and 58 being in contact. In this case, the amplitude of beam 32B would be nominally zero at surface 59: as a result of the first phase shift, the effects of the small angle Bragg diffraction resulting from the first pass through the acousto-optical crystal 447 are substantially offset by the effects of the small angle Bragg diffraction generated on the second pass through the acousto-optical crystal 447. However, a second π phase shift, a relative acousto-optical phase shift of π radians, between beams 32A and 32B relative to the phase of the acoustic beam after the photoelastic interaction of the first pass and introduced before the photoelastic interaction of the second pass will cause the amplitudes of beams 32A and 32B to evolve on transit through the acousto-optical crystal 447 substantially as though the second pass through acoustic beam 52 were simply a direct continuation of the photoelastic interaction path of the first pass.

In the fourth embodiment, the preferred means to effect the second π phase shift is to introduce a displacement of beams 32A and 32B relative to beams 28A and 28B at surface 55 while essentially not altering the actual relative optical phase of beams 32A and 32B. For the case of surface 55 being orthogonal to optical axis 50, the second π phase shift is introduced between the relative phase of beams 32A and 32B relative to the phase of the acoustic beam in between the first and second passes modulus 2π to a high level of accuracy when $$2d\left\{\tan\left[\sin^{-1}\left(\frac{n_o}{n'}\sin\phi_3\right)\right] - \frac{\lambda_0}{2n'\Lambda}\right\} = \left(\frac{2p+1}{2}\right)\Lambda, \quad (19)$$
$$p = 0, 1, 2, \ldots,$$

where d is the distance between surfaces 55 and 58, n' is the index of refraction of non birefringent optical element 71, and $\phi_3$ is the angle of incidence of beam 26A at surface 55 defined in FIG. 4b. It will be apparent to those skilled in the art that the surface 55 can be orientated at an angle other than at 90 degrees with respect to the optical axis 50 as other wise required without departing from the spirit and scope of the fourth embodiment.

Beams 32A and 32B are reflected by surface 59 as beams 34A and 34B, respectively, and beams 34A and 34B exit acousto-optical crystal 47 at face 60 as beams 36A and 36B, respectively.

The input beam 19, such as illustrated in FIG. 4c, preferably enters optical element 71 at surface 54 with an angle of incidence $\phi_1$ becoming beam 21. Beam 21 exits optical element 71 at surface 55 and enters acousto-optical crystal 447, becoming extraordinarily polarized beam 23. Beam 23 is reflected by surface 56 becoming an extraordinarily polarized beam 25. Beam 25 is reflected by surface 57 becoming extraordinarily polarized incident beam 27A. Due to the photoelastic interaction of incident beam 27A with the acoustic beam 52, an ordinarily polarized beam, diffracted beam 27B, is generated by small angle Bragg diffraction when the relationships given by Eqs. (1) and (2) are satisfied.

Diffracted beam 27B propagates at a small angle to that of non-diffracted incident beam 27A, the polarization of diffracted beam 27B being orthogonal to that of incident beam 27A. In addition, the frequency of beam 27B is $f_L + f_0$ while the frequency of beam 27A is $f_L$.

Beams 27A and 27B exit acousto-optical crystal 447 at surface 55 and enter optical element 71 as beams 29A and 29B, respectively. Beams 29A and 29B represent the results of a first pass through acousto-optical crystal 447 wherein the conditions expressed by Eqs. (1) and (2) are satisfied.

Beams 29A and 29B are reflected by surface 58 of optical element 71 as beams 31A and 31B, respectively. Beams 31A and 31B exit optical element 71 and enter acousto-optical crystal 447 at surface 55 as beams 33A and 33B, respectively. Due to the photoelastic interaction of beams 33A and 33B with the acoustic beam 52, i.e. small angle Bragg diffraction, the relative amplitudes of beams 33A and 33B are transformed in transit through acousto-optical crystal 447 when the relationships given by Eqs. (1) and (2) are satisfied.

Upon reflection at surface 58, beams 29A and 29B suffer a relative acousto-optical phase shift, a third π phase shift. The third π phase shift must be offset by introducing a relative acousto-optical phase shift of π radians, a fourth π phase shift, for the same reason the corresponding first π phase shift incurred by beams 28A and 28B had to be offset by the second π phase shift. The fourth π phase shift for beams 33A and 33B is automatically introduced in the process of effecting the second π phase shift for beams originating from beam 18 after completion of the first pass and before initiating the second pass.

Beams 33A and 33B are reflected by surface 59 as beams 35A and 35B, respectively, and beams 35A and 35B exit acousto-optical crystal 447 at face 60 as beams 37A and 37B, respectively.

The respective angles of incidence and refraction for beam components 18 and 19 and beams 20 and 21 at surface 54; the respective angles of incidence and refraction for beams 20, 21, 22, and 23 at surface 55; the respective angles of incidence and reflection for beams 22, 23, 24, and 25 at surface 56; and the respective angles of incidence and reflection for beams 24, 25, 26A, 26B, 27A, and 27B at surface 57 are chosen such that the angle of deviation between beams 26B and 27B is ϵ–δ where ϵ is a small angle, preferably ϵ≅δ and δ is specified by the Eq. (4). The angle of deviation between beams 26A and 26B is δ, the angle of deviation between beams 27A and 27B is –δ, and the angle of deviation between beams 26A and 27A is δ+68 . These conditions with respect to relative directions of propagation of beams 26A, 26B, 27A, and 27B are obtained by choosing the apex angles $\alpha_1$, $\alpha_2$, and $\alpha_3$ defined in FIGS. 7b and 7b to satisfy the equation $$\delta + \varepsilon = \left[ (\alpha_3 + \alpha_2 - \pi) - \alpha_1 + \sin^{-1}\left(\frac{\sin\phi_1}{n_o}\right)\right] - \quad (20)$$
$$\sin^{-1}\left[\left[\frac{n_{3e}}{n'_{3e}}\sin\left(\left((\alpha_3 + \alpha_2 - \pi) - \right.\right.\right.\right.$$
$$\left.\left.\left.\left.\sin^{-1}\left\{\frac{n_{2e}}{n'_{2e}}\sin\left[\alpha_1 - \sin^{-1}\left(\frac{\sin\phi_1}{n'_{1e}}\right)\right]\right\}\right)\right]\right]\right]$$

where $n'_{1e}=n_{2e}$ are the indices of refraction for beam 23 at surfaces 55 and 56, respectively, $n'_{2e}=n_{3e}$ are the indices of refraction for beam 25 at surfaces 56 and 57, respectively, and $n'_{3e}$ is the index of refraction for beam 27A at surface 57.

The respective angles of incidence and reflection for beams 32A, 32B, 33A, 33B, 34A, 34B, 35A, and 35B at surface 59 and the respective angles of incidence and refraction for beams 34A, 34B, 35A, 35B 36A, 36B, 37A, and 37B at surface 60 are chosen such that beams 36B and 37B preferably are parallel. The energy flux profiles of beams 36B and 37B preferably are coextensive. The conditions with respect to the relative directions of propagation of beams 36B and 37B are obtained by choosing the apex angles $\alpha_3$, $\alpha_4$, and $\alpha_5$ consistent with the condition expressed by Eq. (20) such that $$\delta - \varepsilon = \left[ (\alpha_3 + \alpha_5 + \alpha_4 - 2\pi) + \sin^{-1}\left(\frac{\sin\phi_2}{n_o}\right)\right] - \quad (21)$$
$$\sin^{-1}\left\{\frac{n_{5e}}{n'_{5e}}\sin\left[(\alpha_3 + \alpha_5 + \alpha_4 - 2\pi) + \sin^{-1}\left(\frac{\sin\phi_2}{n'_{4e}}\right)\right]\right\}$$

where $\alpha_3$, $\alpha_4$ and $\alpha_5$ are defined in FIGS. 4b and 4c, $n'_{4e}=n_{5e}$ are the indices of refraction for beam 34B at surfaces 60 and 59, respectively, and $n'_{6e}$ is the index of refraction for beam 32B at surface 59. When it is desired to have beams 36B and 37B be not parallel, i.e. $\phi_2$ for beam 36B not the same as $\phi_2$ for beam 37B, then the values of the parameters of Eqs. (20) and (21) may be chosen so that beams 36B and 37B have a predetermined angle of divergence or convergence between them. The output beam is comprised of principal output beams 36B and 37B and spurious output beams 36A and 37A. In addition, it is clear that when it is desired to have the beams 18 and 19 be not parallel, i.e. $\phi_1$ for beam 18 not the same as $\phi_1$ for beam 19, then the values of the parameters of Eqs. (20) and (21) may also be chosen so that beams 18 and 19 have a predetermined angle of divergence or convergence between them.

Beams 36A and 37A are spurious secondary output beams, and beams 36B and 37B comprise principal output beams. The spatial displacements between beams 36A, 36B, 37A, and 37B preferably are only small fractions of the beam diameters. If desired, however, it is clear that principal output beams 36B and 37B may be separated or partially separated for example through the separation or partial separation, respectively, of input beams 18 and 19. For purposes of illustration, these displacements are shown greatly exaggerated in FIG. 1b.

The fraction of the intensity $I_{incident}$ of the input beam transformed into the intensity $I_{diffracted}$ of the diffracted beam is given by $$\frac{I_{diffracted}}{I_{incident}} = \sin^2 \kappa L, \quad (22)$$

where L is the photoelastic interaction path length and κ is a coupling constant which is a function of the square root of the acoustic beam intensity and of the photoelastic interaction coefficient (cf. A. Yariv and P. Yeh, ibid.). Thus, the fourth embodiment with its double pass feature has increased diffraction efficiency with respect to the acoustic power in comparison to the diffraction efficiency of the first preferred embodiment. For example, in the case of κL<<1, the diffraction efficiency of the fourth embodiment is a factor of 4 times larger than the diffraction efficiency of the first embodiment, the acoustic beam power being the same in the two embodiments. Alternatively, the acoustic beam power may be decreased by a factor of 4 in the fourth embodiment relative to the acoustic beam power in the first embodiment for the two embodiments operating at the same diffraction efficiency.

The remainder of the description of the fourth embodiment depicted in FIGS. 4a–4c is substantially the same as the corresponding portions of the description for the first embodiment illustrated in FIGS. 1a–1c.

An unusual and inventive characteristic of the acousto-optical apparatus of the fourth embodiment is the use of multiple passes of the optical beams through the acoustic beam to increase the diffraction efficiency of the acousto-optical apparatus. Multiple passes of the acoustic beam in the acousto-optical crystal referred to in the literature as "folding the acoustic beam" has been used to increase the diffraction efficiency of an acousto-optical apparatus. See, for example, the article entitled "An Improved Read-In Technique for Optical Delay Line Correlators" by M. P. Wenkoff and M. Katchky, *Appl. Opt.*, 9, 135–147 (1970) and the article entitled "Opto-Acoustic Processing of Large Time-Bandwidth Signals" by M. Gottlieb, J. I. Conroy, and T. Foster, *Appl. Opt.*, 11, 1068–1077 (1972). However, the use of multiple passes of an optical beam in the acousto-optical apparatus is believed to be taught herein for the first time.

Figure 4D:
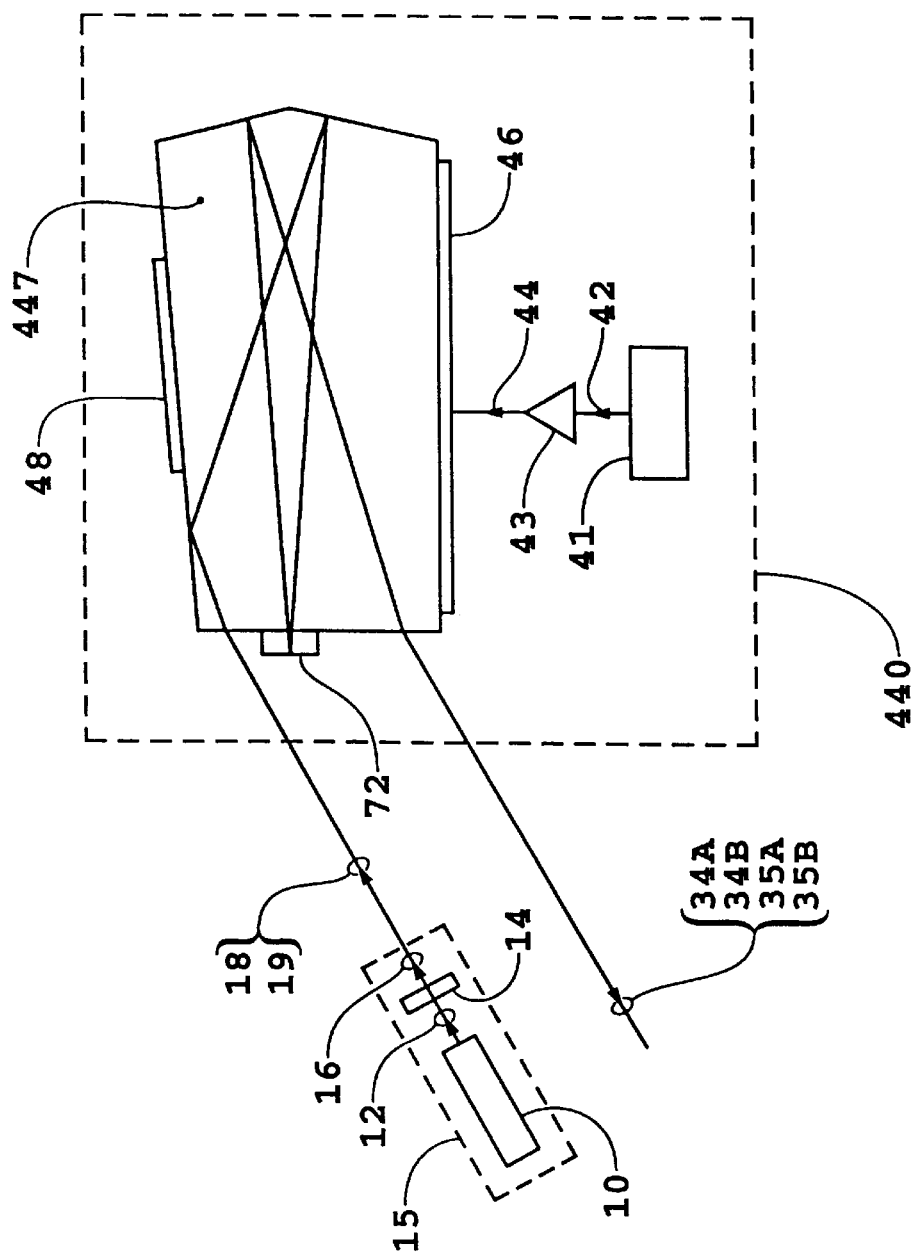
FIGS. 4d–4f illustrate, in diagrammatic form, the presently preferred first variant of the fourth embodiment of the instant invention with FIG. 4d showing source 15 and the optical paths between source 15 and acousto-optical apparatus 440.
Figure 4E:
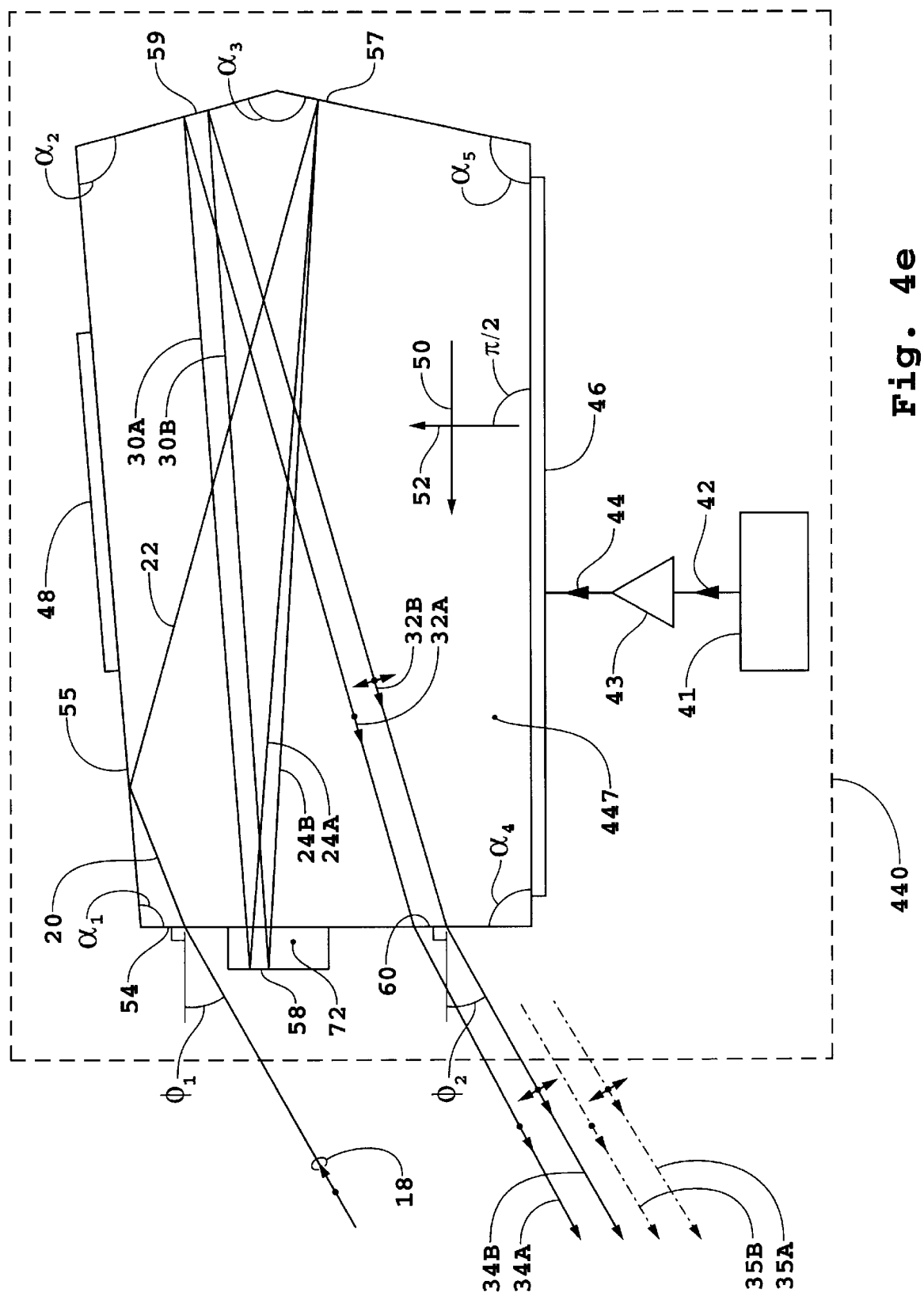
Figure 4F:
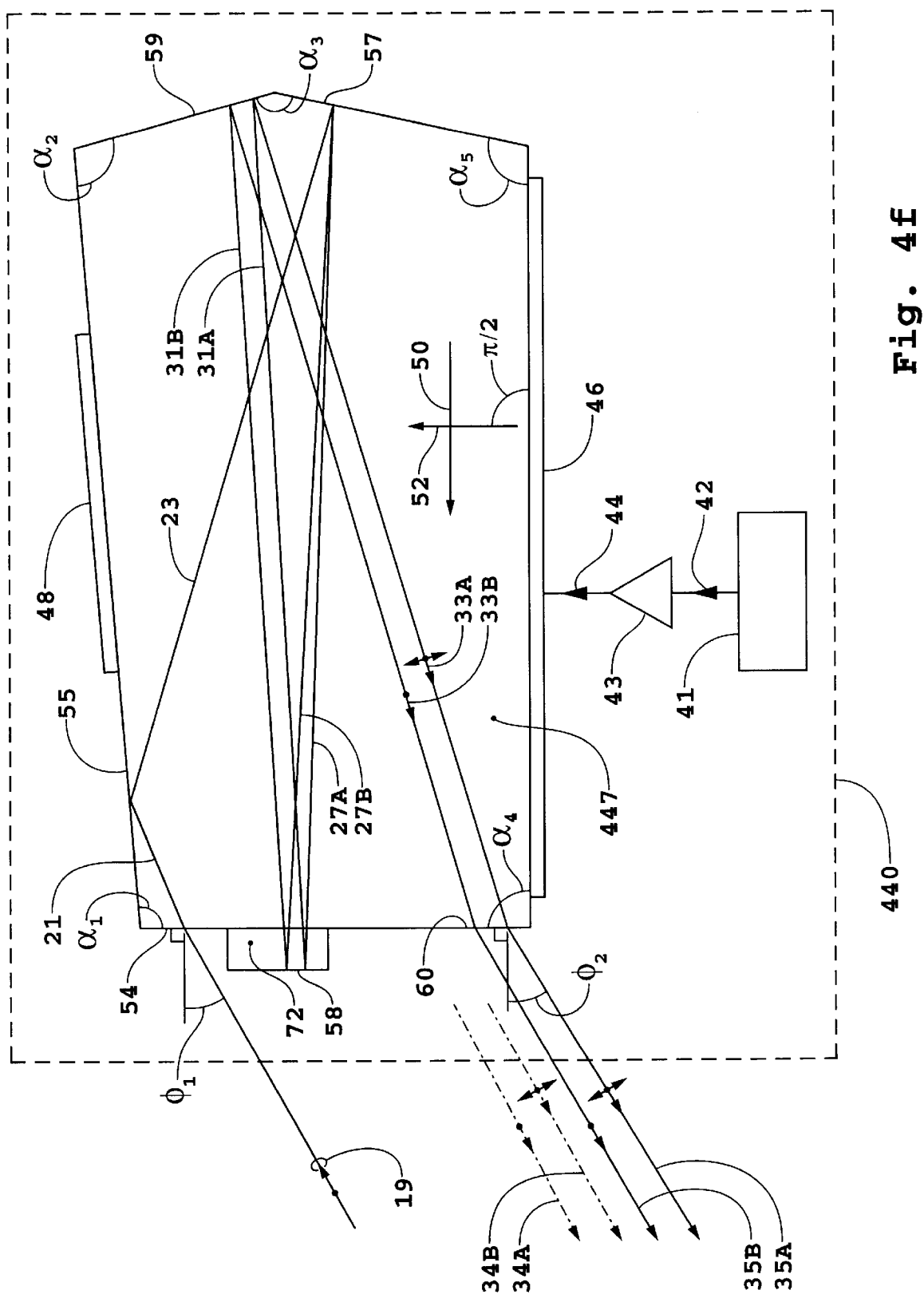

FIGS. 4d–4f depict in diagrammatic form a first variant of the fourth preferred embodiment of the present invention. As shown in FIGS. 4e–4f, the first variant of the fourth embodiment comprises the same elements as the fourth embodiment except for the means used to introduce the second and fourth π phase shifts. Like reference numerals are used in FIGS. 4d–4f for like elements previously described with reference to FIGS. 4a–4c. As shown in FIG. 4e, the second and fourth π phase shifts are introduced with an optical element 72, preferably a quarter-wave phase retardation plate. The quarter-wave phase retardation plate is preferably made of the same birefringent material as acousto-optical crystal 447 and orientated so that beams 30A, 30B, 31A, and 31B have the correct orientation to satisfy Eqs. (1) and (2). The optical axis of optical element 72 is orientated so as to not cause mixing of the progenitors of beams 30A, 30B, 31A, and 31B. The thickness $d_R$ of the phase retardation plate 72 required to introduce the second phase π shift modulus 2π when the optical axis of optical element 72 for example is orthogonal to the planes of FIGS. 4e and 4f is given by the equation $$d_R = \frac{\lambda - 0}{4(n_o - n_e)}(2p+1), \quad p = 0, 1, 2, \ldots \quad (23)$$

The fourth π phase shift is automatically introduced in the process of effecting the second π phase shift for beams originating from beam 18 after completion of the first pass and before initiating the second pass. The output beam is comprised of principal output beams 34B and 35B and spurious secondary output beams 34A and 35A.

The remainder of the description for the first variant of the fourth embodiment depicted in FIGS. 4d–4f is substantially the same as corresponding portions of the description for the fourth embodiment illustrated in FIGS. 4a–4c.

Figure 4G:
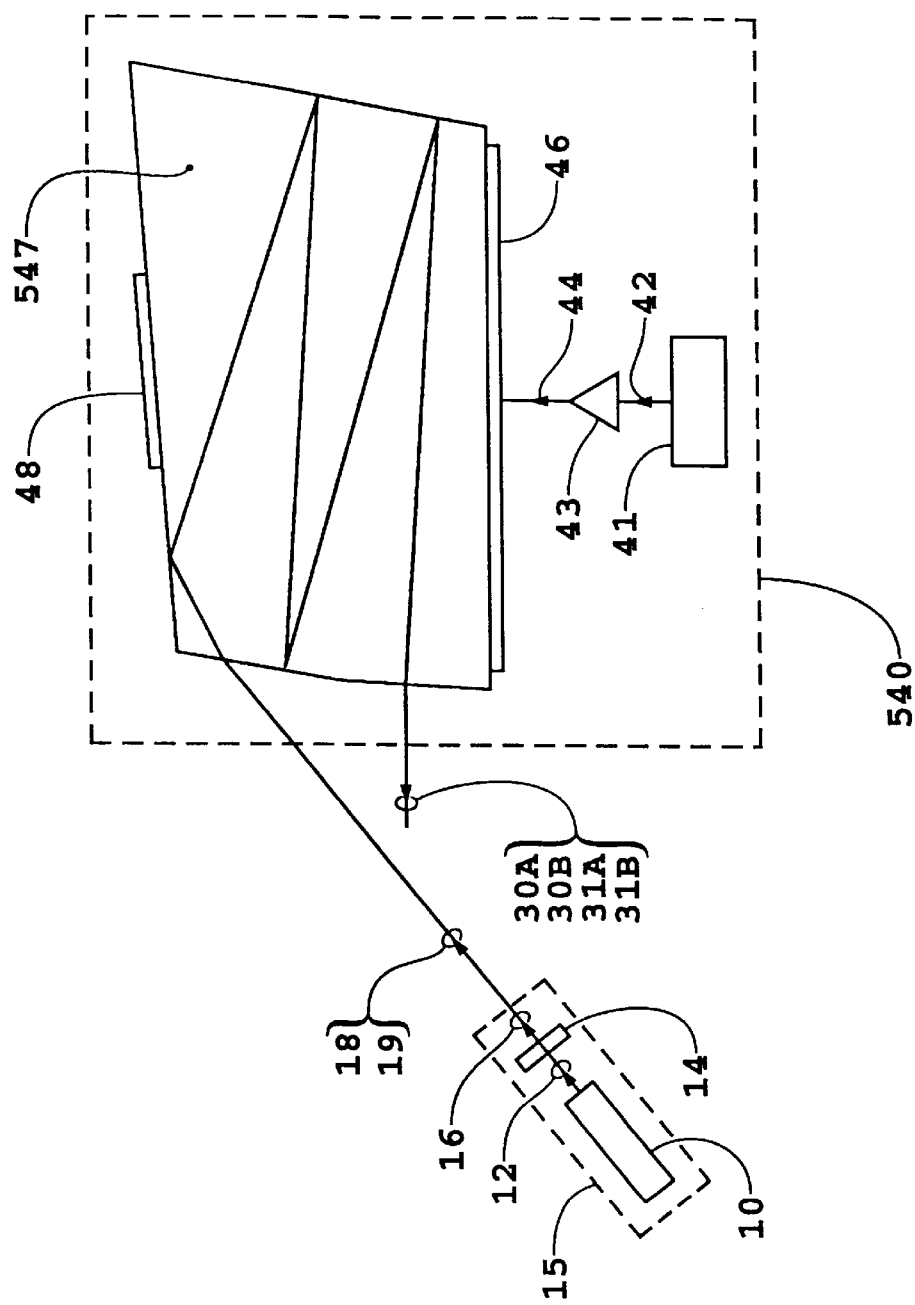
FIGS. 4g–4h illustrate, in diagrammatic form, the presently preferred second variant of the fourth embodiment of the instant invention with FIG. 4g showing source 15 and the optical paths between source 15 and acousto-optical apparatus 540.
Figure 4H:
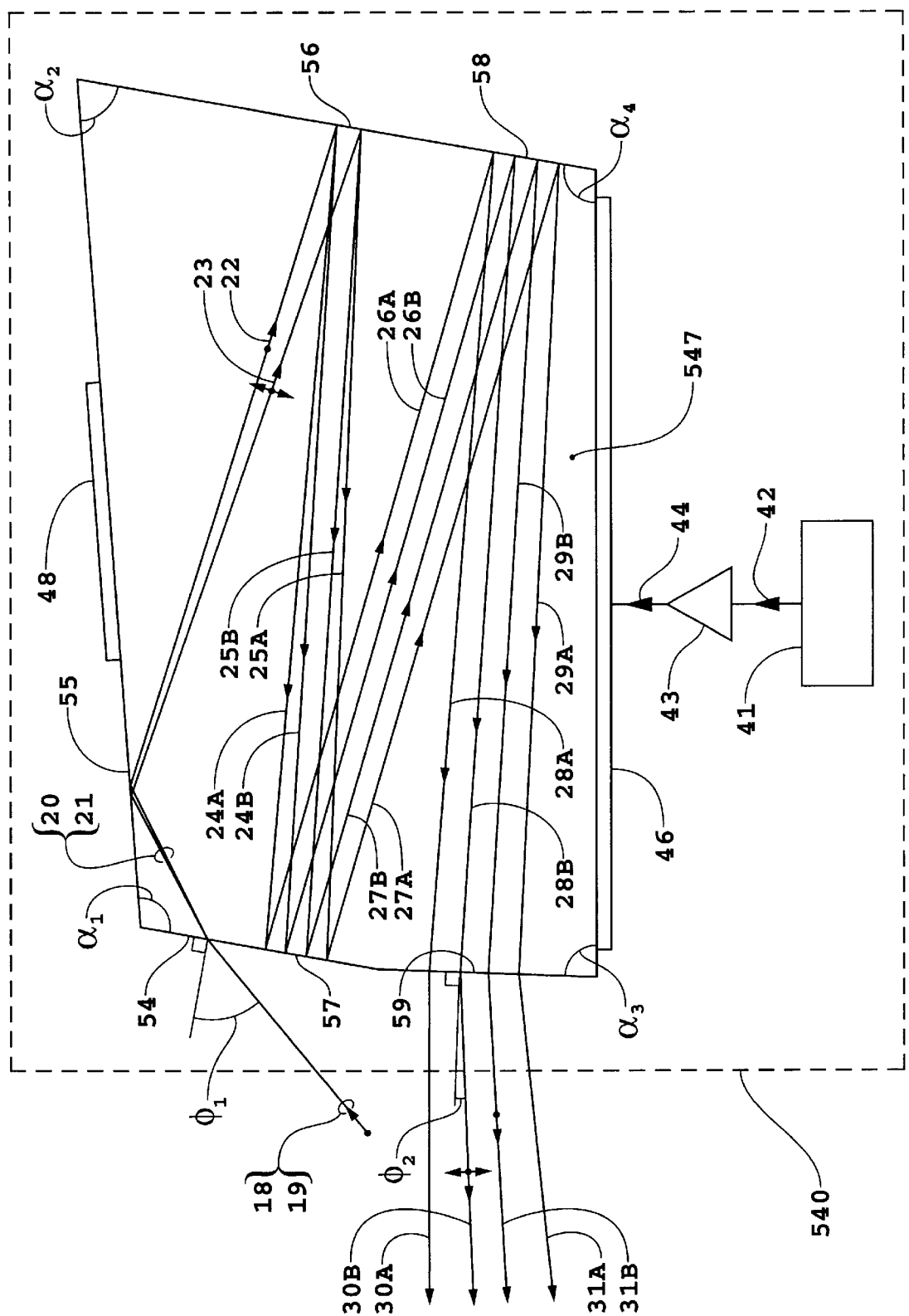

FIGS. 4g–4h depict in diagrammatic form a second variant of the fourth preferred embodiment of the present invention designated at 540. As shown in FIGS. 4g–4h, the second variant of the fourth embodiment comprises the same elements as the fourth embodiment except for the means used to introduce the second and fourth π phase shifts. Like reference numerals are used in FIGS. 4g–4h for like elements previously described with reference to FIGS. 4a–4c. Referring to FIG. 4h, the second π phase shift is introduced in the transit of ordinarily polarized beam 26A and extraordinarily polarized beam 26B across an acousto-optical crystal 547, the transit of beams 26A and 26B across acousto-optical crystal 547 representing an additional pass of optical beams through the acousto-optical crystal 547 with respective directions of propagation such that Eqs. (1) and (2) are not satisfied. The two sections of paths comprising the first and second passes in acousto-optical crystal 547 for which the photoelastic interaction is effective, i.e. Eqs. (1) and (2) are satisfied, are those paths of beams 24A and 24B and beams 28A and 28B, respectively. The orientations of the paths of beams 26A and 26B which introduce the second phase π shift modulus 2π are given by the equation $$n_i \sec\theta'_i [1 - (\tan\theta'_i - \tan\theta'_d)\tan\theta'_i] - n'_d \sec\theta'_d = +\frac{\lambda_0}{\Lambda}\tan\theta'_i + \frac{\lambda_0}{x}p, \quad (24)$$
$$p = 1, 2, \ldots,$$

where $\theta'_i$ and $\theta'_d$ are the directions of propagation of beams 26A and 26B, respectively, $n_i$ and $n'_d$ are the indices of refraction for beams 26A and 26B, respectively, and x is the width of acousto-optical crystal 547 in the direction of the optical axis 50 between the reflection points of beam 26A on surfaces 57 and 58.

The fourth π phase shift is automatically introduced in the process of effecting the second π phase shift for beams originating from beam 18 after completion of the first pass and before initiating the second pass. The output beam is comprised of spurious secondary output beams 30A and 31A and principal output beams 30B and 31B.

The remainder of the description for the second variant of the fourth embodiment depicted in FIGS. 4g–4h is the same as corresponding portions of the description for the fourth embodiment illustrated in FIGS. 4a–4c.

Figure 4I:
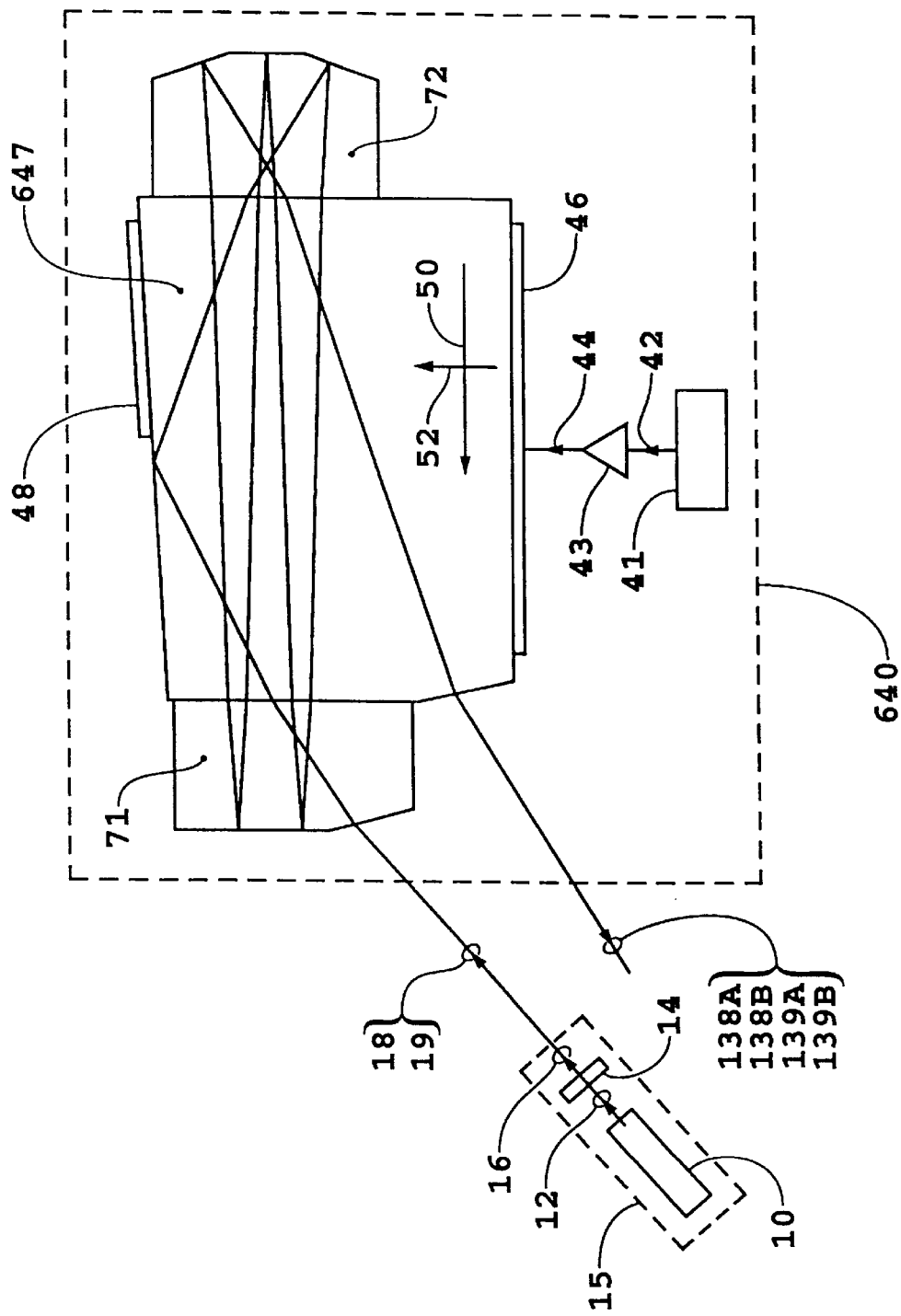
FIG. 4i illustrates, in diagrammatic form, the presently preferred third variant of the fourth embodiment of the instant invention showing source 15 and the optical paths between source 15 and acousto-optical apparatus 640.

It will be apparent to those skilled in the art that the technique of the fourth embodiment and variants thereof can be applied to expand the number of passes of the optical beam through an acousto-optical crystal to three, four or more times wherein Eqs. (1) and (2) are satisfied without departing from the spirit and scope of the seventh embodiment and first and second variants thereof. For an example, FIG. 4i depicts in diagrammatic form a third variant of the fourth embodiment wherein the third variant of the fourth embodiment, designated generally as 640, uses the double pass technique of the fourth embodiment twice, operating in tandem, in the acousto-optical apparatus 640 to effect a quadruple pass of the optical beams through an acousto-optical crystal 647 wherein Eqs. (1) and (2) are satisfied to obtain a higher diffraction efficiency for a given acoustic beam power. The second double pass is arranged principally through the addition of the non-birefringent element 72 as illustrated in FIG. 4i.

It will be apparent to those skilled in the art that the spatial filtering techniques previously described may either be employed singly or simultaneously with the fourth preferred embodiment and variants thereof without departing from the spirit and the scope of the invention.

There is a limitation on the values of ε and on the length of the acousto-optical interaction region that can be effectively used. This limitation may also impact on the number of passes of the optical beams through an acousto-optical crystal at orientations satisfying Eqs. (1) and (2) that can be effectively used. This limitation arises from a condition imposed by the inventive apparatus wherein the progenitors of the output beam components with frequencies $v_L \pm f_0$ are required to have directions of propagation in the acousto-optical crystal which differ by δ–ε in those path sections where Eqs. (1) and (2) are satisfied. The photoelastic interaction coupling coefficient κ will remain effective as long as the total length $L_{total}$ satisfies the condition $$L_{total} \ll \left(\frac{n_o \Lambda^2}{\lambda_0}\right)\left(\frac{\delta}{\varepsilon}\right) = \left(\frac{n_o v^2}{\lambda_0}\right)\left(\frac{\delta}{\varepsilon}\right)\frac{1}{f_0^2} \quad (25)$$

where $L_{total}$ is comprised of the lengths of the first and last passes through the acousto-optical crystal for which the photoelastic interaction is operative and the length of all path sections in between.

It is evident from Eq. (25) that operation of the preferred embodiments and variants disclosed herein with a preferred value for ε being as large as ε≅δ can lead to a significant reduction in the value of $L_{total}$, whether operating a single pass or multiple pass embodiment or variant thereof. This reduction in $L_{total}$ may be partially ameliorated by operating at lower acoustic frequencies as demonstrated by Eq. (25) where $L_{total}$ is proportional to $(1/f_0)^2$.

An unusual and inventive characteristic of the acousto-optical apparatus of the fourth embodiment and variants thereof is the ability to significantly increase the value for $L_{total}$ beyond that given by Eq. (25) for a given value of ε by having the effective average values of $d\theta_i/d\theta$ and $d\theta_d/d\theta$, the average of respective quantities over a set of multiple passes, be different from the values of $d\theta_i/d\theta$ and $d\theta_d/d\theta$ specific to the optical path sections for which the conditions for Bragg diffraction are satisfied. It is generally desirable in optical path sections for which the conditions for Bragg diffraction are satisfied to have $$\frac{d\theta_i}{d\theta} \cong \frac{d\theta_d}{d\theta} \cong 1 \quad (26)$$

in order to maintain high diffraction efficiency as the angle of an input beam and/or of an acoustic beam is changed by a small amount.

The efficiency of Bragg diffraction is reduced when a momentum matching condition is not maintained for a change in the angle $\theta_i$ of an incident beam, e.g. beam 24A of the first preferred embodiment, and/or a change in the direction of propagation of the acoustic beam (52) according to subsequently set fourth Eq. (28). For an acousto-optical modulator, it is also preferable that the variation in $\theta_d$ within the diffracted beam, e.g. beam 24B of the first preferred embodiment, not be substantially different from the variation in $\theta_i$ within the incident beam 24A. From the derivative with respect to $\theta_i$ of sin $\delta$ given by Eq. (4) and noting that $\delta = \theta_i + \theta_d$, cf. FIG. 8, an equation for the ratio of the differential change in $\theta_d$ required to match a differential change in $\theta_i$ can be obtained with the result $$\frac{d\theta_d}{d\theta_i} = -\frac{1}{1+\tan\delta\tan\theta_d}. \tag{27}$$

It is evident from Eq. (27) that $|d\theta_d/d\theta_i| \cong 1$ in general for small angle Bragg diffraction where $\theta_i$ is small, such as is the case for the inventive apparatus disclosed herein, and $\delta < 1$. With respect to the condition that $\delta < 1$, consider the example of an acoustic beam shear wave propagating in an acousto-optical crystal made of $LiNbO_3$, $\lambda_0 = 0.633$ $\mu$m, and $f_0 = 20$ Mhz wherein $\delta = 1.12 \times 10^{-3}$ radians. Thus, the preferred operating condition where the variation in $\theta_d$ within the diffracted beam 24B is not substantially different from the variation in $\theta_i$ within the incident beam 24A is available for the first preferred embodiment of the present invention, with the same property with respect to $(d\theta_d/d\theta_i)$ existing for subsequently described embodiments and variants thereof which are all based on small angle Bragg diffraction.

Another unusual and inventive characteristic of the acousto-optical apparatus of the fourth embodiment is the improved maximum diffraction efficiency that can be achieved for a given photoelastic interaction length. A momentum mismatch between the momentum of the incident and diffracted optical beams and the acoustic beam limits the maximum diffraction efficiency for a single pass to $$\frac{I_d}{I_i} = \frac{\kappa^2}{\kappa^2 + \left(\frac{1}{2}K\Delta\theta\right)^2} \tag{28}$$

where $K\Delta\theta$ is the momentum mismatch in the direction of propagation of the optical beams and $\kappa$ is the magnitude of the coupling constant [c.f. A. Yariv and P. Yeh, Optical Waves in Crystals (Wiley, New York), Section 9.5.1 entitled "Small-Angle Bragg Diffraction"].

When the angle between the direction of propagation of the light beam and the acoustic wavefront is small, the interaction length L is the width of the acoustic beam. Consequently, the optical mode amplitudes $A_1$ and $A_2$ are functions of z only, because z measures the depth of penetration in this interaction configuration. The development of the amplitudes $A_1$ and $A_2$ during transit through the photoelastic interaction region are governed by the coupled differential equations $$\frac{dA_1}{dz} = -\kappa_{12} A_2 e^{i\Delta\alpha z}, \tag{29}$$

$$\frac{dA_2}{dz} = -\kappa_{12}^* A_1 e^{-i\Delta\alpha z},$$

where $\kappa_{12}$ is the coupling constant (c.f. Yariv and Yeh, ibid.). The general solution to Eqs. (29) is given by $$\begin{pmatrix} A_1(z_b) \\ A_2(z_b) \end{pmatrix} = C(z_b, z_a, \Delta\alpha) \begin{pmatrix} A_1(z_a) \\ A_2(z_a) \end{pmatrix} \tag{30}$$

where $z_a$ and $z_b$ are the bounds of the acoustic beam in the z direction and the matrix elements $C_{ij}$ of matrix $C(z_b, z_a, \Delta\alpha)$ are given by the equations $$C = \begin{pmatrix} C_{11} & C_{12} \\ C_{21} & C_{22} \end{pmatrix}, \tag{31}$$

$$C_{11}(z_b, z_a, \Delta\alpha) = \left[\cos s(z_b - z_a) - i\left(\frac{\Delta\alpha}{2s}\right)\sin s(z_b - z_a)\right] \times \tag{32}$$
$$\exp\left[i\left(\frac{\Delta\alpha}{2}\right)(z_b - z_a)\right],$$

$$C_{12}(z_b, z_a, \Delta\alpha) = -i\left[\frac{\kappa_{12}(z_a)}{s}\right]\sin s(z_b - z_a)\exp\left[i\left(\frac{\Delta\alpha}{2}\right)(z_b - z_a)\right], \tag{33}$$

$$C_{21}(z_b, z_a, \Delta\alpha) = -i\left[\frac{\kappa_{12}^*(z_a)}{s}\right]\sin s(z_b - z_a)\exp\left[-i\left(\frac{\Delta\alpha}{2}\right)(z_b - z_a)\right], \tag{34}$$

$$C_{22}(z_b, z_a, \Delta\alpha) = \left[\cos s(z_b - z_a) + i\left(\frac{\Delta\alpha}{2s}\right)\sin s(z_b - z_a)\right] \times \tag{35}$$
$$\exp\left[-i\left(\frac{\Delta\alpha}{2}\right)(z_b - z_a)\right],$$

$$\kappa^2 = \kappa_{12}\kappa_{12}^*, \tag{36}$$

$$\Delta\alpha = K\Delta\theta, \tag{37}$$

$$s^2 = \kappa^2 + \left(\frac{\Delta\alpha}{2}\right)^2 = k^2 + \left(\frac{K\Delta\theta}{2}\right)^2, \tag{38}$$

and for the pth pass, $$\kappa_{12}(z_{p-1}) = \kappa_{12}(z_0) e^{i\Delta\alpha(z_{p-1} - z_{p-2})\cos^2(p\pi/2)}. \tag{39}$$

Those skilled in the art will appreciate that when the amplitude of the acoustic beam is not uniform in z over the interval $z_a$ to $z_b$, the resulting mathematical expression for matrix $C(z_b, z_a, \Delta\alpha)$ is more complicated than that given Eqs. (31), (32), (33), (34), and (35). However, the important features relevant to the present discussion are retained in the case for which the amplitude of the acoustic beam is uniform in z over the interval $z_a$ to $z_b$.

A momentum mismatch can be caused by a change in the direction of propagation of either the acoustic beam or the optical beam with respect to the optical axis of the Bragg cell. For a single pass acousto-optical apparatus, the effect of either of the two causes of a momentum mismatch are the same and given by Eqs. (30), (31), (32), (33), (34), and (35). However, for the multiple pass acousto-optical apparatus of the seventh embodiment, the effects of the momentum mismatch are different for the two causes. A momentum mismatch $\Delta\alpha$ on the first pass produced by a change in the direction of the acoustic beam will be manifested in the second pass as a momentum mismatch $-\Delta\alpha$. A momentum mismatch $\Delta\alpha$ on the first pass produced by a change in the direction of the optical beam is characterized by the same momentum mismatch $\Delta\alpha$ on the second pass but with the relative phases of the two optical beams shifted with respect to the phase of the acoustic beam, the relative phase shift depending on the technique used to introduce the second $\pi$ phase shift.

The diffraction efficiency is given by the equation $$\frac{I_d}{I_i} = C_{21}C_{21}^*. \quad (40)$$

Single Pass

The effect of a change in acoustic beam direction by $\Delta\theta$ or a change in optical beam direction by $-\Delta\theta$ is given by Eq. (34) as $$C_{21}(L, 0, \Delta\alpha) = \left(\frac{i\kappa_{12}^*}{s}\right)\sin sL\exp\left[-i\left(\frac{\Delta\alpha L}{2}\right)\right] \quad (41)$$

where it has been assumed that $z_a = 0$ and $z_b = L$. The maximum value of $C_{21}C^*_{21}$ is $$(C_{21}C^*_{21})_{Max} = (\kappa^2/s^2) \quad (42)$$

for $$sL = (\pi/2). \quad (43)$$

The result expressed by Eq. (42) is the same as that given by Eq. (28). Thus, the maximum diffraction for a single pass is in general less than one for a finite value of $\Delta\alpha$.

The Effect of a Change in Acoustic Beam Direction for Multiple Pass Configuration Double Pass The solution for the mode amplitudes when there is a change in acoustic beam direction by $\Delta\theta$ in a double pass configuration is $$\begin{pmatrix} A_1(z_2) \\ A_2(z_2) \end{pmatrix} = C(z_2, z_1, -\Delta\alpha)\begin{pmatrix} A_1(z_1) \\ A_2(z_1) \end{pmatrix}, \quad (44)$$

$$\begin{pmatrix} A_1(z_2) \\ A_2(z_2) \end{pmatrix} = C(z_2, z_1, -\Delta\alpha)C(z_1, z_0, \Delta\alpha)\begin{pmatrix} A_1(z_1) \\ A_2(z_1) \end{pmatrix}. \quad (45)$$

The second row, first column matrix element of matrix $C(z_2, z_1, -\Delta\alpha)C(z_1, z_0, \Delta\alpha)$ is $$[C(z_2, z_1, -\Delta\alpha)C(z_1, z_0, \Delta\alpha)]_{21} = \quad (46)$$
$$-i\left(\frac{\kappa_{12}^*}{s}\right)\exp\left[i\left(\frac{\Delta\alpha}{2}\right)(z_2 - 2z_1)\right] \times [\sin sz_2 -$$
$$i2(\Delta\alpha/2s)\sin sz_1 \sin s(z_2 - z_1)].$$

The ratio of the intensity of the diffracted beam to the intensity of the input beam is given by the magnitude squared of the matrix element $[C(z_2,z_1,-\Delta\alpha)C(z_1,z_0,\Delta\alpha)]_{21}$ as expressed by Eq. (40). For the case of $(z_2-z_1)=(z_1-z_0)$, the maximum value of $|[C(z_2,z_1,-\Delta\alpha)C(z_1,z_0,\Delta\alpha)]_{21}|^2$ is $$|[C(z_2, z_1, -\Delta\alpha)C(z_1, z_0, \Delta\alpha)]_{21}|^2_{Max} = 1 \quad (47)$$

for $$\sin^2 s(z_1 - z_0) = \frac{\sin^2[(1/2)(\pi/2)]}{[1 - (\Delta\alpha/2s)^2]}. \quad (48)$$

Thus, the maximum diffraction efficiency for a double pass can be 1 for a finite value of $\Delta\alpha$.

Triple Pass

The solution for the mode amplitudes when there is a change in acoustic beam direction by $\Delta\theta$ in a triple pass configuration is $$\begin{pmatrix} A_1(z_3) \\ A_2(z_3) \end{pmatrix} = C(z_3, z_2, \Delta\alpha)\begin{pmatrix} A_1(z_2) \\ A_2(z_2) \end{pmatrix} \quad (49)$$

where $A_1(z_2)$ and $A_2(z_2)$ are given by Eq. (45). The second row, first column matrix element of matrix $C(z_3,z_2,\Delta\alpha)C(z_2,z_1,-\Delta\alpha)C(z_1,z_0,\Delta\alpha)$ is $$[C(z_3, z_2, \Delta\alpha)C(z_2, z_1, -\Delta\alpha)C(z_1, z_0, \Delta\alpha)]_{21} = -i\left(\frac{\kappa_{12}^*}{s}\right)\exp\left[i\left(\frac{\Delta\alpha}{2}\right)(z_3 - 2z_1)\right] \times \quad (50)$$
$$\left\{ \begin{array}{l} [\sin sz_3 + 4(\Delta\alpha/2s)^2 \sin s(z_3 - z_2)\sin s(z_2 - z_1)\sin sz_1] + \\ i(\Delta\alpha/2s)\left[\begin{array}{l}\sin s(z_3 - z_2)\sin s(z_2 - 2z_1) + \sin s(z_3 - z_2)\sin sz_2 - \\ -2\cos s(z_3 - z_2)\sin s(z_2 - z_1)\sin sz_1\end{array}\right] \end{array} \right\}.$$

The ratio of the intensity of the diffracted beam to the intensity of the input beam is given by the magnitude squared of the matrix element $[C(z_3,z_2,\Delta\alpha)C(z_2,z_1,-\Delta\alpha)C(z_1,z_0,\Delta\alpha)]_{21}$ as expressed by Eq. (40). For the case of $(z_3-z_2)=(z_2-z_1)$ and $(z_2-z_1)=(z_1-z_0)$, the maximum value of $|[C(z_3,z_2,\Delta\alpha)C(z_2,z_1,-\Delta\alpha)C(z_1,z_0,\Delta\alpha)]_{21}|^2$ is $$|[C(z_3, z_2, \Delta\alpha)C(z_2, z_1, -\Delta\alpha)C(z_1, z_0, \Delta\alpha)]_{21}|^2_{Max} = 1 \quad (51)$$

for $$\sin^2 s(z_1 - z_0) = \frac{\sin^2[(1/3)(\pi/2)]}{[1 - (\Delta\alpha/2s)^2]}. \quad (52)$$

Thus, the maximum diffraction efficiency for a triple pass can be 1 for a finite value of $\Delta\alpha$.

Quadruple Pass

The solution for the mode amplitudes when there is a change in acoustic beam direction by $\Delta\theta$ in a quadruple pass configuration is $$\begin{pmatrix} A_1(z_4) \\ A_2(z_4) \end{pmatrix} = C(z_4, z_3, -\Delta\alpha)\begin{pmatrix} A_1(z_3) \\ A_2(z_3) \end{pmatrix} \quad (53)$$

where $A_1(z_3)$ and $A_2(z_3)$ are given by Eq. (49). The second row, first column matrix element of matrix $C(z_4,z_3,-\Delta\alpha)C(z_3,z_2,\Delta\alpha)C(z_2,z_1,-\Delta\alpha)C(z_1,z_0\Delta\alpha)$ is $$[C(z_4, z_3, -\Delta\alpha)C(z_3, z_2, \Delta\alpha)C(z_2, z_1, -\Delta\alpha)C(z_1, z_0, \Delta\alpha)]_{21} = -i\left(\frac{\kappa_{12}^*}{s}\right) \quad (54)$$

$$\exp\left[i\left(\frac{\Delta\alpha}{2}\right)(z_4 - 4z_1)\right] \times \left\{ \begin{array}{l} \sin s z_4 + \\ (\Delta\alpha/2s)^2 \begin{bmatrix} 2\sin s(z_4 - z_3)\sin s(z_3 - z_2)\sin s(z_2 - z_0) + \\ 4\cos s(z_4 - z_3)\sin s(z_3 - z_2) \times \\ \sin s(z_2 - z_1)\sin s(z_1 - z_0) \end{bmatrix} + \\ i(\Delta\alpha/2s)\sin s(z_4 - z_3) \times \\ \begin{bmatrix} -\sin s(z_3 - z_2)\cos s(z_2 - z_0) + \sin s(z_3 - z_0) + \\ 2\sin s(z_3 - z_2)\sin s(z_2 - z_1)\sin s(z_1 - z_0) \end{bmatrix} \end{array} \right\}.$$

The ratio of the intensity of the diffracted beam to the intensity of the input beam is given by the magnitude squared of the matrix element $[C(z_4,z_3,-\Delta\alpha)C(z_3,z_2,\Delta\alpha)C(z_2,z_1,-\Delta\alpha)C(z_1,z_0,\Delta\alpha)]_{21}$ as expressed by Eq. (40). For the case of $(z_4-z_3)=(z_3-z_2)$, $(z_3-z_2)=(z_2-z_1)$, and $(z_2-z_1)=(z_1-z_0)$, the maximum value of $|[C(z_4,z_3,-\Delta\alpha)C(z_3,z_2,)C(z_2,z_1,-\Delta\alpha)C(z_1,z_0,\Delta\alpha)]_{21}|^2$ is $$|[C(z_4, z_3, -\Delta\alpha)C(z_3, z_2, \Delta\alpha)C(z_2, z_1, -\Delta\alpha)C(z_1, z_0, \Delta\alpha)]_{21}|^2_{Max} = 1 \quad (55)$$

for $$\sin^2 s(z_1 - z_0) = \frac{\sin^2[(1/4)(\pi/2)]}{[1 - (\Delta\alpha/2s)^2]}. \quad (56)$$

Thus, the maximum diffraction efficiency for a quadruple pass can be 1 for a finite value of $\Delta\alpha$.

Fifth and Higher Order Multiple Pass

The results for the second, triple, and quadruple pass configurations each can have a maximum diffraction efficiency of 1 for a finite value of $\Delta\alpha$ when $$\sin^2 s(z_1 - z_0) = \frac{\sin^2[(1/q)(\pi/2)]}{[1 - (\Delta\alpha/2s)^2]} \quad (57)$$

where the parameter q is the number of passes. The obvious extrapolation of these properties is that the maximum diffraction efficiency for a finite value of $\Delta\alpha$ can be 1 for configurations with multiple passes of $q \geq 5$ when Eq. (57) is satisfied.

The Effect of a Change in Optical Beam Direction for Multiple Pass Configuration Double Pass The solution for the mode amplitudes when there is a change in optical beam direction by $\Delta\theta$ in a double pass configuration is $$\begin{pmatrix} A_1(z_2) \\ A_2(z_2) \end{pmatrix} = C(z_2, z_1, \Delta\alpha) \begin{pmatrix} A_1(z_2) \\ A_2(z_2) \end{pmatrix}, \quad (58)$$

$$\begin{pmatrix} A_1(z_2) \\ A_2(z_2) \end{pmatrix} = C(z_2, z_1, \Delta\alpha)R(\beta)C(z_1, z_0, \Delta\alpha) \begin{pmatrix} A_1(z_0) \\ A_2(z_0) \end{pmatrix}. \quad (59)$$

where matrix $R(\beta)$ introduces the phase shift $2\beta$ between the two orthogonally polarized incident and diffracted optical beams relative to the phase of the acoustic beam during period of the first and second passes through the acousto-optical crystal by the respective optical beams. The phase shift $\beta$ is given by the expression $$\beta = \left(\frac{n_0}{n'}\right) d \Delta\alpha \quad (60)$$

and the matrix $R(\beta)$ is $$R(\beta) \equiv \begin{pmatrix} e^{i\beta} & 0 \\ 0 & e^{-i\beta} \end{pmatrix}. \quad (61)$$

The coupling constant for the pth pass is $$\kappa_{12}(z_{p-1}) = \kappa_{12}(z_0) e^{i\Delta\alpha(z_p - z_0)}. \quad (62)$$

The ratio of the intensity of the diffracted beam to the intensity of the input beam is given by the magnitude squared of the matrix element $[C(z_2,z_1,\Delta\alpha)R(\beta)C(z_1,z_0,\Delta\alpha)]_{21}$ as expressed by Eq. (40). For the case of $(z_2-z_1)=(z_1-z_0)$, the maximum value of $|[C(z_2,z_1,\Delta\alpha)R(\beta)C(z_1,z_0,\Delta\alpha)]_{21}|^2$ is $$|[C(z_2,z_1, \Delta\alpha)R(\beta)C(z_1, z_0, \Delta\alpha)]_{21}|^2_{Max} = 1 \quad (63)$$

for $$\tan(2\beta) = [\Delta\alpha(z_1 - z_0)] \left[\frac{\tan s(z_1 - z_0)}{s(z_1 - z_0)}\right] \times \left[1 - \left(\frac{\Delta\alpha}{2s}\right)^2 \tan^2 s(z_1 - z_0)\right]^{-1} \quad (64)$$

and $$\sin^2 s(z_1 - z_0) = \frac{\sin^2[(1/2)(\pi/2)]}{[1 - (\Delta\alpha/2s)^2]}. \quad (65)$$

Thus, the maximum diffraction efficiency for a double pass can be 1 for a finite value of $\Delta\alpha$.

Triple and Quadruple Pass

Results obtained for triple and quadruple pass configurations are similar to the results obtained for the double pass configuration: the maximum diffraction efficiency for a triple and quadruple pass can be 1 for a finite value of $\Delta\alpha$ when Eqs. (52) and (56), respectively, are satisfied and $\beta$ satisfies Eq. (64).

Fifth and Higher Order Multiple Pass

The results for the second, triple, and quadruple pass configurations each can have a maximum diffraction efficiency for a finite value of $\Delta\alpha$ when Eq. (57) is satisfied and $\beta$ satisfies Eq. (64). The obvious extrapolation of these properties is that the maximum diffraction efficiency for a finite value of $\Delta\alpha$ can be 1 for configurations with multiple passes of $q \geq 5$ when Eq. (57) is satisfied and $\beta$ satisfies Eq. (64).

Having now described several embodiments of the invention, it will be clear the sum of its principal advantages are that the apparatus: is comprised of a single crystal with a piezoelectric transducer bonded directly to the crystal or comprised of a single crystal with piezoelectric transducer bonded directly to the crystal and an external element or elements in a compact size, has high diffraction efficiency, generally has no requirement for external beam stops, has efficiency of nominally 100% for conversion of input intensity into intensities of two orthogonally polarized exit beam components, and the intensity of each of two orthogonally polarized exit beam components may be adjusted to nominally 50% of the input intensity. The apparatus of the present invention also exhibits reduced polarization mixing and has a compact size because of the use of anisotropic Bragg diffraction and generally through the use of internal reflections in an anisotropic crystal. The apparatus of the present invention can produce high diffraction efficiency with reduced acoustic power levels by the use of multiple passes of the optical beams through the acoustic beam at conditions for which the photo-elastic interaction is effective. Furthermore, the angular displacement between orthogonally polarized exit beam components has reduced sensitivity to changes in the temperature or to temperature gradients of the apparatus due in part to the use of anisotropic Bragg diffraction. Changes in the relative phase shift between the output beams and the acoustic beam may be compensated for changes in temperature of the apparatus of the present invention by a symmetrical treatment of the propagation of the output beam components in the anisotropic crystal. The lateral displacement between the components of the output beam may be reduced or compensated in the apparatus of the present invention also by a symmetrical treatment of the propagation of the output beam components in the anisotropic crystal. In addition, the output beams may be parallel or not. There are also no multiple elements of the type to create misalignment of directions of the components of the output beam.

While the invention has been described with reference to particular embodiments thereof, those skilled in the art will be able to make the various modifications to the described embodiments of the invention without departing from the true spirit and scope of the present invention. For example, it will be apparent that biaxial crystals, which are another species of anistropic crystal, except with two optic axes, can be adapted to beneficial use according to the teachings and principles of the present invention. Moreover, either ordinarily or extraordinarily linearized light may be adopted to serve as the input with the conversion being to the opposite to that adopted for the input state. Also, antireflection coatings may be used on facets where ever appropriate to improve coupling efficiency. Therefore, it is intended that all equivalent combinations of elements and steps which perform substantially the same function in substantially the same way to achieve the same result be within the scope of the present invention.

What is claimed is:

1. Apparatus for generating at least a pair of linearly-orthogonally polarized beam components of different frequency, said apparatus comprising:

a multifaceted, anisotropic optical crystal having an optic axis, z, said anisotropic optical crystal having a first facet that is nominally parallel to said optic axis;

transducer means affixed to said first facet for generating an acoustic beam and directing it into said anisotropic optical crystal so that it propagates generally perpendicular to said optic axis to provide an interactive region within said anisotropic optical crystal where the width of said interactive region is generally coextensive with the width of said acoustic beam;

means for driving said transducer to generate said acoustic beam at a predetermined frequency, $f_0$;

means for providing at least two linearly-orthogonally polarized input beams of illumination each with a predetermined frequency, $f_L$; and means for introducing said linearly-orthogonally polarized input beams into said multifaceted, anisotropic optical crystal so that each propagate through said interaction region at least once with a predetermined portion of each of said linearly-orthogonally polarized input beams being converted by small-angle Bragg diffraction to a second beam, orthogonally polarized with respect its associated input beam and altered in frequency by said acoustic beam frequency, $f_0$, the remainder of each of said input beams and said second beams continuing to propagate through said anisotropic optical crystal along a path as slightly diverging emergent beams, said multifaceted, anisotropic optical crystal having at least one facet configured and arranged to at least partially control said emergent beams so that they are available outside of said multifaceted, anisotropic optical crystal as two external beams each comprising two linearly-orthogonally polarized components for subsequent downstream use, selected ones of said linearly-orthogonally polarized components of said external beams having between them a predetermined angle of divergence, predetermined relative intensities, and a predetermined spatial separation between their respective energy flux profiles.

2. The apparatus of claim 1 wherein the power level of said means for driving said transducer means is set so that one component of each of said external beams is nominally 100 per cent that of its corresponding input beam to provide a pair of principal beams for subsequent downstream use while the remaining component of each of said external beams has nominally zero intensity compared with its corresponding input beam thereby being rendered spurious.

3. The apparatus of claim 1 wherein said means for providing said linearly-orthogonally polarized input beams comprises a laser and wherein any beams reflected back into the cavity of said laser and having said emergent beams as a progenitor are both reduced in intensity and/or changed in frequency so that they have substantially no deleterious effects on the lasing action of said laser.

4. The apparatus of claim 2 wherein said anisotropic optical crystal further includes an entrance facet through which said input beams enter said anisotropic optical crystal, the angle of incidence of said input beams with respect to said entrance facet, the angles of said entrance facet and said at least one facet being set so that said principal beams travel parallel to one another after emerging from said anisotropic optical crystal.

5. The apparatus of claim 4 wherein said multifaceted, anisotropic optical crystal comprises at least one other facet that operates in conjunction with said entrance facet and at least one facet to control said emergent beams.

6. The apparatus of claim 2 wherein said facets of said anisotropic optical crystal are arranged with respect to one another so that the optical paths over which light beams travel through said anisotropic optical crystal prior to and after said interaction region are disposed to be substantially symmetric with respect to a longitudinal axis through said anisotropic optical crystal to render the relative phase between said principal beams relative to the phase of said acoustic beam insensitive to temperature changes.

7. The apparatus of claim 2 wherein said predetermined angle of divergence between said principal beams is substantially zero so that said principal beams travel parallel to one another.

8. The apparatus of claim 1 wherein said at least one facet operates by reflection to control said emergent beams.

9. The apparatus of claim 1 wherein said at least one facet operates by refraction to control said emergent beams.

10. The apparatus of claim 1 wherein said multifaceted, anisotropic optical crystal comprises at least one other facet that operates in conjunction with said at least one facet to control said emergent beams.

11. The apparatus of claim 10 wherein said other facet operates by reflection to control said emergent beams.

12. The apparatus of claim 10 wherein said other facet operates by refraction to control said emergent beams.

13. The apparatus of claim 1 further including external means located outside of said multifaceted, anisotropic optical for operating in conjunction with said at least one facet to control said emergent beams.

14. The apparatus of claim 13 wherein said external means comprises a birefringent prism.

15. The apparatus of claim 2 wherein said principal beams have energy flux profiles that are more or less coextensive.

16. The apparatus of claim 1 wherein the degree of coextensiveness of the energy flux profiles of selected ones of said linearly-orthogonally polarized components of said external beams vary substantially in accordance with the birefringence and acoustical and optical properties of said anisotropic optical crystal, the physical path length over which said emergent beams travel, and the value of said predetermined driving frequency, $f_0$.

17. The apparatus of claim 16 wherein said energy flux profiles of said selected ones of said linearly-orthogonally polarized components of said external beams are spatially separated.

18. The apparatus of claim 16 wherein said energy flux profiles of said selected ones of said linearly-orthogonally polarized components of said external beams substantially overlap one another.

19. The apparatus of claim 18 wherein said selected ones of said linearly-orthogonally polarized components of said external beams are parallel.

20. The apparatus of claim 1 wherein said acoustic beam comprises a shear wave.

21. The apparatus of claim 1 wherein said transducer comprises a piezoelectric transducer bonded to said first facet.

22. The apparatus of claim 21 wherein said driving means comprises a stabilized electrical oscillator for generating an electrical signal at said predetermined frequency, $f_0$, and a power amplifier for receiving said electrical signal, amplifying it, and supplying power to said transducer.

23. The apparatus of claim 1 wherein said driving means is structured to selectively control the portion of said input beams that is converted to respective ones of said second beams.

24. The apparatus of claim 23 wherein said portion of said input beams that is converted to respective ones of said second beams is substantially one-hundred (100%) percent.

25. The apparatus of claim 1 wherein selected ones of said input beams enter and exit said interactive region as an ordinarily polarized beam and its associated said second beam is extraordinarily polarized or vice versa.

26. The apparatus of claim 1 wherein said anisotropic optical crystal comprises a uniaxial optical crystal.

27. The apparatus of claim 26 wherein said anisotropic optical crystal is selected from the group comprising lithium niobate and KDP.

28. The apparatus of claim 1 wherein selected ones of said facets of said anisotropic optical crystal are provided with absorbing material to absorb any acoustic power impinging on them.

29. The apparatus of claim 1 wherein selected ones of the facets of said multifaceted anisotropic optical crystal are antireflection coated to improve the coupling efficiency of beams entering and exiting said anisotropic optical crystal.

30. The apparatus of claim 1 wherein one of the facets of said anisotropic optical crystal serves as an entrance facet for coupling said input beams into said anisotropic optical crystal.

31. The apparatus of claim 30 wherein said entrance facet is antireflection coated.

32. The apparatus of claim 1 wherein said anisotropic optical crystal comprises four internal reflecting facets and two integral refracting facets to render selected ones of said diverging emergent beams coextensive and parallel as they emerge from said anisotropic optical crystal through one of said refracting facets.

33. The apparatus of claim 1 further including a nonbirefringent prism external to said anisotropic optical crystal and wherein said anisotropic optical crystal comprises three internal reflecting surfaces and two integral refracting surfaces that operate in conjunction with said external nonbirefringent prism to render selected ones of said diverging emergent beams coextensive and parallel as they emerge from said anisotropic optical crystal through said nonbirefringent prism.

34. The apparatus of claim 1 wherein said anisotropic optical crystal internal surfaces are arranged to facilitate said input beams undergoing a plurality of passes through said interaction region to increase the diffraction efficiency for a given acoustic power.

35. The apparatus of claim 34 further including a non-birefringent optical element that operates in conjunction with said internal surfaces to provide said plurality of passes through said interaction region to increase the diffraction efficiency for a given acoustic power.

36. Apparatus for generating at least a pair of parallel, linearly-orthogonally polarized beams of different frequency, said apparatus comprising:

a multifaceted, anisotropic optical crystal having an optic axis, z, said crystal having a first facet that is nominally parallel to said optic axis;

transducer means affixed to said first facet for generating an acoustic beam and directing it into said anisotropic optical crystal so that it propagates generally perpendicular to said optic axis to provide an interactive region within said anisotropic optical crystal where the width of said interactive region is generally coextensive with the width of said acoustic beam;

means for driving said transducer to generate said acoustic beam at a predetermined frequency, $f_0$;

means for providing at least two linearly-orthogonally polarized input beams of illumination each with a predetermined frequency, $f_L$; and means for introducing said linearly polarized input beams into said anisotropic optical crystal so that each propagates through said interaction region at least once with a predetermined portion of each being converted by small-angle Bragg diffraction to a second beam, orthogonally polarized with respect to its associated input beam and altered in frequency by said acoustic beam frequency, $f_0$, the remainder of said input beams and said second beams continuing to propagate through said anisotropic optical crystal along a path of travel as orthogonally polarized emergent beams, said anisotropic optical crystal having at least one other facet structured to fold the optical path for beams traveling through said anisotropic optical crystal while controlling their angular divergence outside of said interaction region so that said emergent beams are available outside of said anisotropic crystal as two external beams each comprising two linearly-orthogonally polarized components for subsequent downstream use, two of said linearly-orthogonally polarized components being selected as principal beams.

37. The apparatus of claim 36 wherein the power level of said means for driving said transducer means is set so that one component of each of said external beams is nominally 100 per cent that of its corresponding input beam to provide said pair of principal beams for subsequent downstream use while the remaining component of each of said external beams has nominally zero intensity compared with its corresponding input beam thereby being rendered spurious.

38. The apparatus of claim 37 wherein said facets of said anisotropic optical crystal are arranged with respect to one another so that the optical paths over which light beams travel through said anisotropic optical crystal prior to and after said interaction region are disposed to be substantially symmetric with respect to a longitudinal axis through said anisotropic optical crystal to render the relative phase between said principal beams relative to the phase of said acoustic beam insensitive to temperature changes.

39. The apparatus of claim 36 wherein said transducer comprises a piezoelectric transducer bonded to said first facet.

40. The apparatus of claim 39 wherein said driving means comprises a stabilized electrical oscillator for generating an electrical signal at said predetermined frequency, $f_o$, and a power amplifier for receiving said electrical signal, amplifying it, and supplying power to said transducer.

41. The apparatus of claim 36 wherein said driving means is structured to selectively control the portion of said input beams that is converted to said second beams.

42. The apparatus of claim 41 wherein said portion of said input beams that is converted to said second beams is substantially one-hundred (100%) percent.

43. The apparatus of claim 36 wherein selected ones of said input beams enter and exit said interactive region as an ordinarily polarized beam and its corresponding second beam is extraordinarily polarized or vice versa.

44. The apparatus of claim 36 wherein said anisotropic optical crystal comprises a uniaxial optical crystal.

45. The apparatus of 44 wherein said anisotropic optical crystal is selected from the group comprising lithium niobate and KDP.

46. The apparatus of claim 36 wherein selected ones of said the facets of said anisotropic optical crystal are provided with absorbing material to absorb any acoustic power impinging on them.

47. The apparatus of claim 36 wherein one of the facets of said anisotropic optical crystal serves as an entrance facet for coupling said input beams into said anisotropic optical crystal.

48. The apparatus of claim 36 wherein said at least one other facet is adapted to operate by reflection.

49. The apparatus of claim 36 wherein the path over which beams travel inside of said anisotropic crystal is folded at least twice prior to their exiting said anisotropic optical crystal.

50. The apparatus of claim 36 wherein said linearly-orthogonally polarized principal beams have energy flux profiles that are more or less coextensive.

51. The apparatus of claim 50 wherein the degree of coextensiveness of the energy flux profiles of said principal beams varies substantially in accordance with the birefringence and acoustical and optical properties of said anisotropic optical crystal, the physical path length over which said emergent beams travel, the angle of said at least one other facet, and the value of said predetermined driving frequency, $f_o$.

52. The apparatus of claim 51 wherein said energy flux profiles of said principal beams are spatially separated.

53. The apparatus of claim 51 wherein said energy flux profiles of said principal beams substantially overlap one another.

54. The apparatus of claim 36 wherein said acoustic beam comprises a shear wave.

55. Apparatus for generating at least a pair of parallel, linearly-orthogonally polarized beams of different frequency, said apparatus comprising:

a multifaceted, anisotropic optical crystal having an optic axis, z, said crystal having a first facet that is nominally parallel to said optic axis;

transducer means affixed to said first facet for generating an acoustic beam and directing it into said anisotropic optical crystal so that it propagates generally perpendicular to said optic axis to provide an interactive region within said anisotropic optical crystal where the width of said interactive region is generally coextensive with the width of said acoustic beam;

means for driving said transducer to generate said acoustic beam at a predetermined frequency, $f_o$;

means for providing at least two linearly-orthogonally polarized input beams of illumination each with a predetermined frequency, $f_L$;

means for introducing said linearly polarized input beams into said anisotropic optical crystal so that each propagates through said interaction region at least once with a predetermined portion of each being converted by small-angle Bragg diffraction to a second beam, orthogonally polarized with respect to a corresponding one of aid input beams and altered in frequency by said acoustic beam frequency, $f_o$, the remainder of said input beams and said second beams continuing to propagate through said anisotropic optical crystal along a path of travel as emergent beams, said emergent beams exiting from said anisotropic optical crystal through an exit facet thereof; and external means for intercepting at least one of said input beams or said diverging emergent beams and controlling them to provide a pair of parallel, principal linear-orthogonally polarized beams available outside of said anisotropic optical crystal for subsequent downstream use.

56. The apparatus of claim 55 wherein said external means for intercepting at least one of said input or at least one of said divergent emergent beams comprises a birefringent prism means.

57. The apparatus of claim 56 wherein said birefringent prism means comprises two birefringent prisms for intercepting at least one of said input beams.

58. The apparatus of claim 56 wherein said birefringent means comprises two birefringent prisms one for intercepting at least one of said input beams and one for intercepting at least one of said emergent beams after they exit said anisotropic optical crystal.

59. The apparatus of claim 55 wherein said transducer comprises a piezoelectric transducer bonded to said first facet.

60. The apparatus of claim 59 wherein said driving means comprises a stabilized electrical oscillator for generating an electrical signal at said predetermined frequency, $f_o$, and a power amplifier for receiving said electrical signal, amplifying it, and supplying power to said transducer.

61. The apparatus of claim 55 wherein said driving means is structured to selectively control the portion of said input beams that is converted to said second beams.

62. The apparatus of claim 61 wherein said portion of said input beams that is converted to said second beams is substantially one-hundred (100%) percent.

63. The apparatus of claim 55 wherein selected ones of said input beams enter and exit said interactive region as an ordinarily polarized beam and the corresponding one of its said second beam is extraordinarily polarized or vice versa.

64. The apparatus of claim 55 wherein said orthogonally polarized principal beams have energy flux profiles that are more or less coextensive.

65. The apparatus of claim 64 wherein the degree of coextensiveness of the energy flux profiles of said orthogonally polarized principal beams varies substantially in accordance with the birefringence and acoustical and optical properties of said anisotropic optical crystal, the physical path length over which said emergent beams travel, and the value of said predetermined driving frequency, $f_o$.

66. The apparatus of claim 65 wherein said energy flux profiles of said orthogonally polarized principal beams are spatially separated.

67. The apparatus of claim 65 wherein said energy flux profiles of said orthogonally polarized principal beams substantially overlap one another.

68. The apparatus of claim 55 wherein said acoustic beam comprises a shear wave.

69. The apparatus of claim 1 wherein said anisotropic optical crystal is selected from the group comprising lithium niobate and KDP.

70. The apparatus of claim 69 wherein said anisotropic optical crystal comprises lithium niobate.

71. Apparatus for generating a pair of parallel, linearly-orthogonally polarized beams of different frequency, said apparatus comprising:

a multifaceted, anisotropic optical crystal having an optic axis, z, said crystal having a first facet that is nominally parallel to said optic axis;

transducer means affixed to said first facet for generating an acoustic beam and directing it into said anisotropic optical crystal so that it propagates generally perpendicular to said optic axis to provide an interactive region within said anisotropic optical crystal;

means for driving said transducer to generate said acoustic beam at a predetermined frequency, $f_o$;

means for providing at least two linearly-orthogonally polarized input beams of illumination each with a predetermined frequency, $f_L$; and means for introducing said linearly-orthogonally polarized input beams into said anisotropic optical crystal at predetermined angles of incidence so that each propagates through said interaction region at least twice with a predetermined portion of each converted by small-angle Bragg diffraction to a second beam, orthogonally polarized with respect to a corresponding input beam and altered in frequency by said acoustic beam frequency, $f_o$, the remainder of said input beams and said second beams continuing to propagate through said anisotropic optical crystal along a path of travel as orthogonally polarized emergent beams, said input beams passing through said interactive region at least twice to make relatively more efficient use of acoustic power and experiencing phase shifts with respect to said acoustic beam upon passing through said interactive region, said anisotropic optical crystal having at least one other facet structured and arranged to at least partially control said emergent beams, so that they are available outside of said anisotropic optical crystal as two external beams available for subsequent downstream use, each of said external beams comprising two linearly-orthogonally polarized components and selected ones of said linearly-orthogonally polarized components being parallel, having predetermined relative intensities and spatial separation between their respective energy flux profiles; and means for controlling the phase of beams with respect to the phase of said acoustic beam as the beams propagate through said anisotropic optical crystal.

72. The apparatus of claim 71 wherein the power level of said means for driving said transducer means is set so that one component of each of said external beams is nominally 100 per cent that of its corresponding input beam to provide a pair of principal beams for subsequent downstream use while the remaining component of each of said external beams has nominally zero intensity compared with its corresponding input beam thereby being rendered spurious.

73. The apparatus of claim 71 wherein said means for providing said linearly-orthogonally polarized input beams comprises a laser and wherein any beams reflected back into the cavity of said laser and having said emergent beams as a progenitor are both reduced in intensity and/or changed in frequency so that they have substantially no deleterious effects on the lasing action of said laser.

74. The apparatus of claim 72 wherein said anisotropic optical crystal further includes an entrance facet through which said input beams enter said anisotropic optical crystal, the angle of incidence of said input beams with respect to said entrance facet, the angles of said entrance facet and said at least one facet being set so that said principal beams travel parallel to one another after emerging from said anisotropic optical crystal.

75. The apparatus of claim 74 wherein said multifaceted, anisotropic optical crystal comprises at least one other facet that operates in conjunction with said entrance facet and at least one facet to control said emergent beams.

76. The apparatus of claim 72 wherein said facets of said anisotropic optical crystal are arranged with respect to one another so that the optical paths over which light beams travel through said anisotropic optical crystal prior to and after said interaction region are disposed to be substantially symmetric with respect to a longitudinal axis through said anisotropic optical crystal to render the relative phase between said principal beams insensitive to temperature changes.

77. The apparatus of claim 71 wherein said transducer comprises a piezoelectric transducer bonded to said first facet.

78. The apparatus of claim 77 wherein said driving means comprises a stabilized electrical oscillator for generating an electrical signal at said predetermined frequency, $f_o$, and a power amplifier for receiving said electrical signal, amplifying it, and supplying power to said transducer.

79. The apparatus of claim 77 wherein said driving means is structured to selectively control the portion of said input beams that is converted to said second beams.

80. The apparatus of claim 79 wherein said portion of said input beams that is converted to said second beams is substantially one-hundred (100%) percent.

81. The apparatus of claim 71 wherein selected ones of said input beams enter and exit said interactive region as an ordinarily polarized beam and its corresponding second beam is extraordinarily polarized or vice versa.

82. The apparatus of claim 71 wherein said anisotropic optical crystal comprises a uniaxial optical crystal.

83. The apparatus of 82 wherein said anisotropic optical crystal is selected from the group comprising lithium niobate and KDP.

84. The apparatus of claim 71 wherein selected ones of said the facets of said anisotropic optical crystal are provided with absorbing material to absorb any acoustic power impinging on them.

85. The apparatus of claim 71 wherein one of the facets of said anisotropic optical crystal serves as an entrance facet for coupling said input beam into said anisotropic optical crystal.

86. The apparatus of claim 71 wherein said other facet is adapted to operate by reflection.

87. The apparatus of claim 71 wherein said path over which said diverging emergent beams travel inside of said anisotropic crystal is folded at least twice prior to their exiting said anisotropic optical crystal.

88. The apparatus of claim 71 wherein said means for controlling phase comprises at least one non-birefringent optical element located outside of said anisotropic optical crystal.

89. The apparatus of claim 71 wherein said phase control means comprises at least one phase retardation plate located external to said anisotropic optical crystal.

90. The apparatus of claim 71 wherein said anisotropic optical crystal comprises three internal reflecting facets and at least one integral refracting facet to at least partially render said emergent beams coextensive and parallel as they emerge from said anisotropic optical crystal through said refracting facet.

91. The apparatus of claim 71 wherein said anisotropic optical crystal comprises one internal reflecting facets and at least two integral refracting facets to at least partially render said emergent beams coextensive and parallel as they emerge from said anisotropic optical crystal through one of said integral refracting facets.

92. The apparatus of claim 71 wherein said anisotropic optical crystal internal facets are arranged to facilitate said input beams undergoing a plurality of passes through said interaction region to increase the diffraction efficiency for a given acoustic power.

93. The apparatus of claim 92 further including a non-birefringent element that operates in conjunction with said internal surfaces to provide said plurality of passes through said interaction region to increase the diffraction efficiency for a given acoustic power.

* * * * *